(12) United States Patent
Kang

(10) Patent No.: US 10,203,086 B2
(45) Date of Patent: Feb. 12, 2019

(54) OPTICAL LENS, LIGHT EMITTING MODULE, AND LIGHT UNIT INCLUDING THE SAME

(71) Applicant: LG INNOTEK CO., LTD., Seoul (KR)

(72) Inventor: Min Soo Kang, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 33 days.

(21) Appl. No.: 15/433,714

(22) Filed: Feb. 15, 2017

(65) Prior Publication Data

US 2017/0234507 A1    Aug. 17, 2017

(30) Foreign Application Priority Data

Feb. 16, 2016   (KR) .................... 10-2016-0017677
Sep. 30, 2016   (KR) .................... 10-2016-0126649

(51) Int. Cl.

| F21V 1/00 | (2006.01) |
|---|---|
| F21V 11/00 | (2015.01) |
| F21V 5/04 | (2006.01) |
| F21V 5/00 | (2018.01) |
| G02B 19/00 | (2006.01) |

(Continued)

(52) U.S. Cl.
CPC .............. *F21V 5/046* (2013.01); *F21V 5/007* (2013.01); *F21V 5/048* (2013.01); *G02B 19/0014* (2013.01); *G02B 19/0061* (2013.01); *F21V 9/16* (2013.01); *F21V 9/30* (2018.02); *F21Y 2103/10* (2016.08); *F21Y 2115/10* (2016.08)

(58) Field of Classification Search
CPC .......... F21V 5/007; F21V 5/046; F21V 5/048; F21V 9/16; F21V 9/30; F21Y 2103/10; F21Y 2115/10; G02B 19/0014; G02B 19/0061

USPC ......................................................... 362/237
See application file for complete search history.

(56) References Cited

U.S. PATENT DOCUMENTS 8,651,707 B1   2/2014 Tang et al.
9,080,739 B1   7/2015 Sayers (Continued)

FOREIGN PATENT DOCUMENTS

| CN | 102840544 | 1/2015 |
| EP | 2 221 891 | 8/2010 |

(Continued)

OTHER PUBLICATIONS

European Search Report dated Mar. 30, 2017 issued in Application No. 17156224.2.

*Primary Examiner* — Tsion Tumebo
(74) *Attorney, Agent, or Firm* — KED & Associates, LLP

(57) ABSTRACT

An optical lens is provided. The optical lens may include a bottom surface, a concave recess provided in a center region of the bottom surface, a first light exit surface having a convexly curved surface on a side opposite to the bottom surface and the recess, and a second light exit surface between the bottom surface and the first light exit surface. A length in a first axis direction on the bottom surface is D1, and a length in a second axis direction perpendicular to the first axis direction is D2, a length in the first axis direction on the bottom of the recess is D3, and a length in the second axis direction on the bottom of the recess is D4, where a length of the bottom surface may have a relationship of D1<D2, and a bottom length of the recess may have a relationship of D3>D4.

20 Claims, 47 Drawing Sheets

(51) Int. Cl.
   *F21V 9/30* (2018.01)
   *F21V 9/16* (2006.01)
   *F21Y 103/10* (2016.01)
   *F21Y 115/10* (2016.01)

(56) References Cited

U.S. PATENT DOCUMENTS

| | | | |
|---|---|---|---|
| 2010/0207143 A1 | 8/2010 | Tsai et al. | |
| 2010/0302785 A1 | 12/2010 | Zhou | |
| 2011/0317432 A1 | 12/2011 | Lee | |
| 2012/0057354 A1 | 3/2012 | Lee et al. | |
| 2013/0114022 A1* | 5/2013 | Iiyama | G02B 19/0014 349/64 |
| 2014/0177235 A1* | 6/2014 | Lin | F21V 5/04 362/311.02 |
| 2014/0254134 A1* | 9/2014 | Pelka | F25D 27/00 362/92 |
| 2014/0301085 A1 | 10/2014 | Hwang et al. | |
| 2014/0328062 A1* | 11/2014 | Ikeda | G02B 19/0066 362/237 |

FOREIGN PATENT DOCUMENTS

| | | |
|---|---|---|
| EP | 2 426 521 | 3/2012 |
| KR | 10-2011-0080708 | 7/2011 |
| KR | 10-2011-0128434 | 11/2011 |
| KR | 10-2013-0073328 | 7/2013 |

\* cited by examiner

FIG. 28
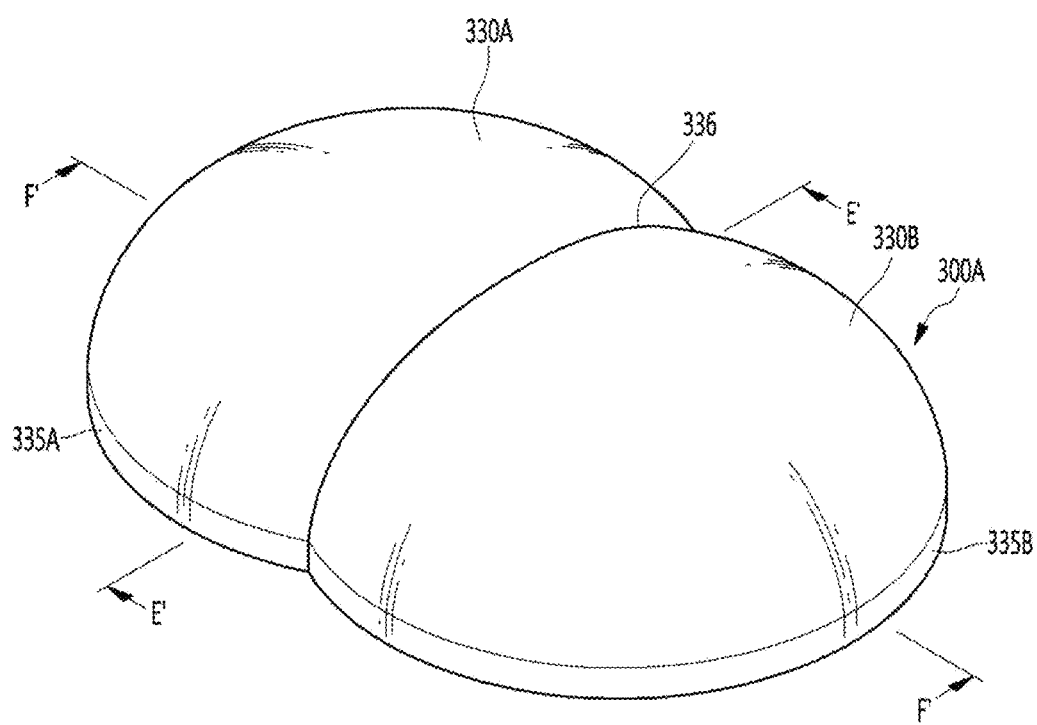
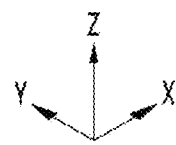

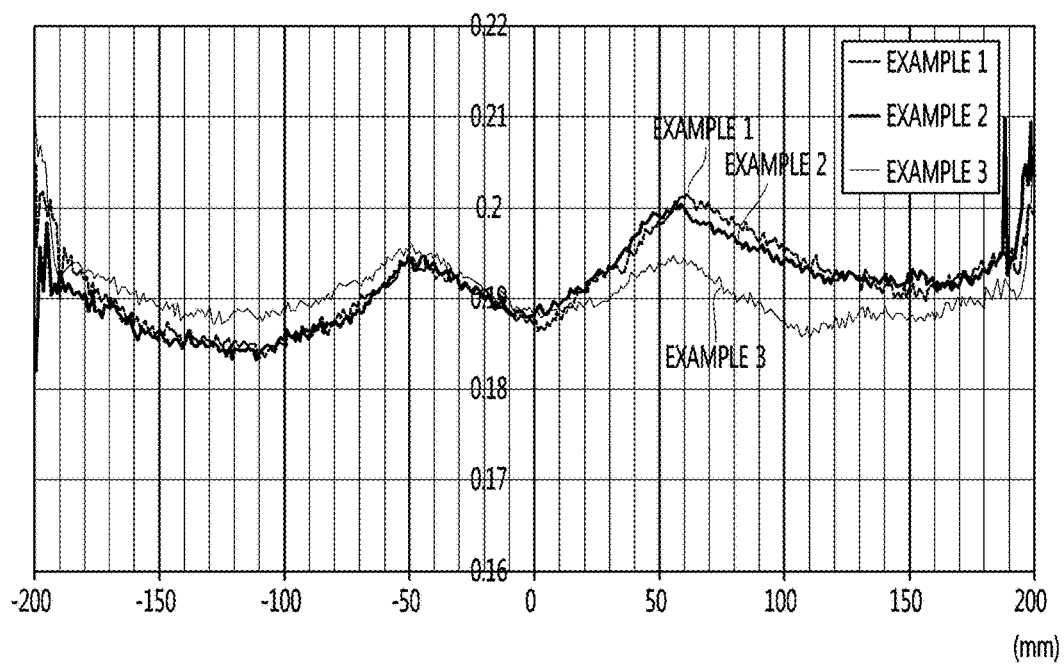

OPTICAL LENS, LIGHT EMITTING MODULE, AND LIGHT UNIT INCLUDING THE SAME

CROSS-REFERENCE TO RELATED APPLICATIONS

This application claims priority under 35 U.S.C. § 119 to Korean Patent Application Nos. 10-2016-0017677 filed on Feb. 16, 2016, and 10-2016-0126649 filed on Sep. 30, 2016, whose entire disclosures are incorporated herein by reference.

BACKGROUND

1. Field

Embodiments relate to an optical lens, a light emitting module in which an optical lens is provided on a light emitting device, and a light unit including a light emitting module.

2. Background

A light emitting device, for example, a light emitting diode, may be a type of a semiconductor device which converts electrical energy into light. The light emitting diode may replace existing fluorescent lamps, incandescent lamps, or the like and may be considered as a next-generation light source. Since the light emitting diode generates light by using a semiconductor element, the light emitting diode may consume very low amounts of power, as compared to an incandescent lamp, which generates light by heating tungsten or a fluorescent lamp, which generates light by colliding ultraviolet rays generated through high pressure discharge with a phosphor.

Since the light emitting diode generates light by using a potential gap of the semiconductor element, the light emitting diode may have a long lifespan, a fast response time, and environment-friendly characteristics, as compared to existing light sources. Accordingly, much research has been conducted to replace existing light sources with a light emitting diode. The light emitting diode may be increasingly used as a light source of lighting apparatuses, such as, e.g., various lamps used indoors and outdoors, a display device, an electronic board, and a streetlamp.

BRIEF DESCRIPTION OF THE DRAWINGS

The embodiments will be described in detail with reference to the following drawings in which like reference numerals refer to like elements wherein:

FIG. 28 is a perspective view of an optical lens according to another embodiment;

FIG. 50 is a view illustrating a color difference distribution in a second axis direction according to a change in a depth of a recess of the optical lens of FIG. 1;

DETAILED DESCRIPTION

Figure 1:
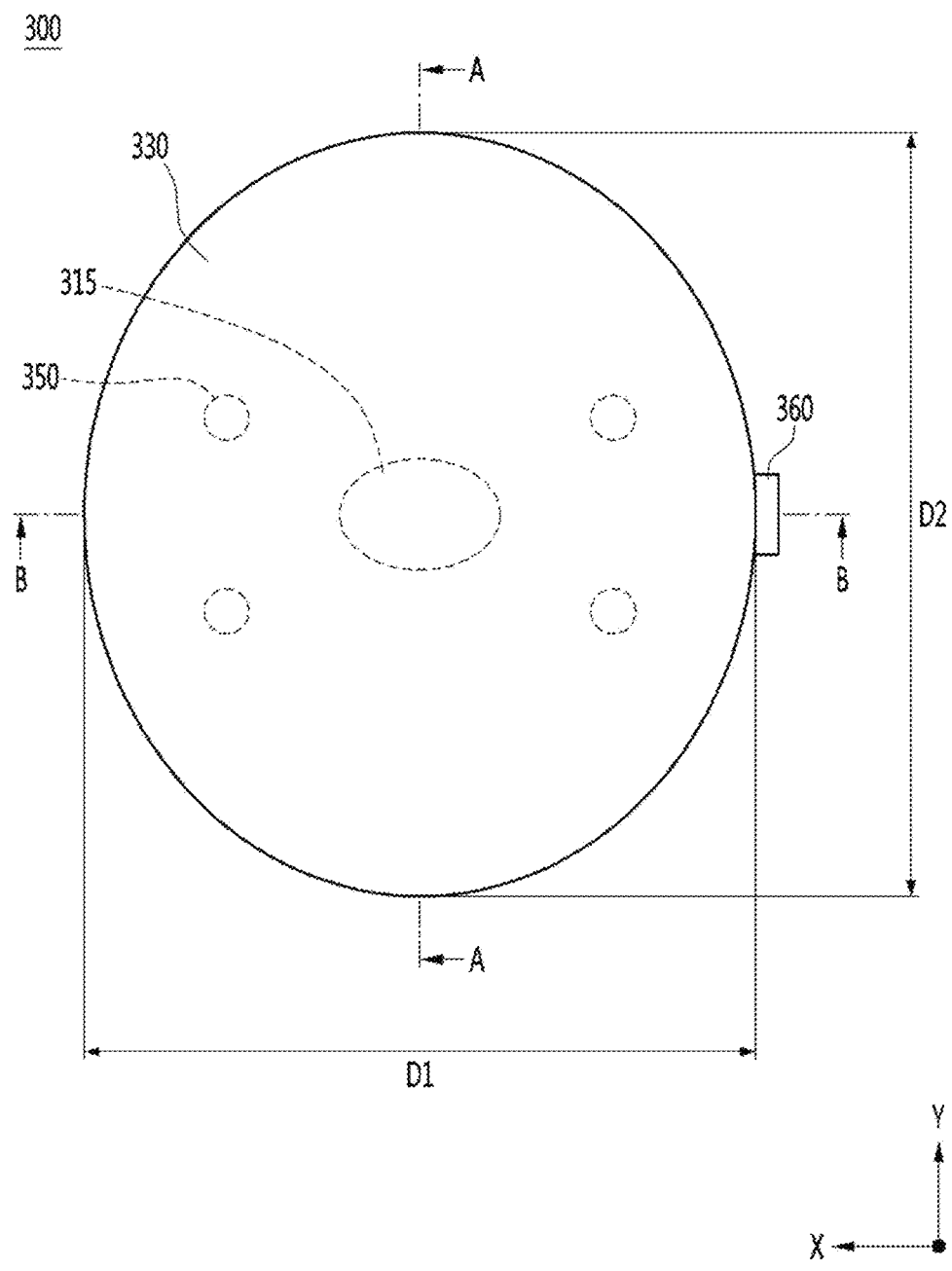
FIG. 1 is a plan view of an optical lens according to an embodiment.

Referring to FIGS. 1 to 6, an optical lens 300 may include a bottom surface 310, a recess 315 which is concave in a center region of the bottom surface 310, and a first light exit surface 330 which has a curved surface on the bottom surface 310 and the recess 315. In the optical lens 300, a surface of the recess 315 may be a light incidence surface 320.

In the optical lens 300, a first length D1 in a first axis (X-axis) direction may be different from a second length D2 in a second axis (Y-axis) direction. The first axis direction may be perpendicular to the second axis direction, and a third axis (Z-axis) direction may be perpendicular to the first and second axis directions. The first length D1 is a maximum length in the X-axis direction and may be an interval between opposite surfaces in the X-axis direction. The second length D2 is a maximum length in the Y-axis direction and may be an interval between opposite surfaces in the Y-axis direction. In the optical lens 300, the first length D1 and the second length D2 may be respectively maximum lengths in the X-axis direction and the Y-axis direction. In the optical lens 300, the first length D1 and the second length D2 may be respectively lengths of the bottom surface 310 in the X-axis direction and the Y-axis direction. In the optical lens 300, the first length D1 and the second length D2 may be respectively maximum lengths of the first light exit surface 330 in the X-axis direction and the Y-axis direction.

The first length D1 is a maximum length of a second light exit surface 335 except for a lateral protrusion 360 in the X-axis direction. The first length D1 and the second length D2 may have a relationship of D1<D2. A difference between the first length D1 and the second length D2 may be 0.5 mm or more, for example, 1 mm or more. A difference between the first length D1 and the second length D2 may be 1 mm or more, for example, in a range of 1 mm to 3.5 mm. A difference between the first length D1 and the second length D2 may be 3.5 mm or less. A difference between the first length D1 and the second length D2 may be 10% or less of the second length D2. When a difference between the first length D1 and the second length D2 is less than 1 mm, a difference of luminance distributions in the X-axis direction and the Y-axis direction is slight. When a difference between the first length D1 and the second length D2 is greater than 3.5 mm, a difference of luminance distributions in the two axis directions is excessively great, or the luminance distribution in one of the two axis directions is excessively lowered. In the optical lens 300 according to the embodiment, since the length D2 in the Y-axis direction is longer than the length D1 in the X-axis direction, a light exit area in the X-axis direction may be further increased on a Y-axis basis.

The optical lens 300 may include a light-transmitting material. The optical lens 300 may include at least one of polycarbonate (PC), poly(methylmethacrylate) (PMMA), a silicon or epoxy resin, and glass. The optical lens 300 may include a light-transmitting material which has a refractive index of 1.7 or less, for example, in a range of 1.4 to 1.7. The optical lens 300 may include a lens body made of a light-transmitting material.

The bottom surface 310 of the optical lens 300 may be a bottom of the lens body. The bottom surface 310 may be a surface opposite to the first light exit surface 330. An area of the bottom surface 310 may be smaller than a surface area of the first light exit surface 330. The length D1 in the X-axis direction and the length D2 on the Y-axis direction in the bottom surface 310 may have a relationship of D1<D2. A length ratio D1:D2 on the bottom surface 310 may be in a range of 1:1.01 to 1:1.1. An outer shape of the bottom surface 310 may be an oval shape. An outer line shape of the bottom surface 310 may be symmetrical with respect to the X-axis direction passing through a bottom center P0 and may be symmetrical with respect to the Y-axis direction. A first straight line parallel to the first axis direction X with respect to the bottom center P0 may be referred to as X0, and a second straight line parallel to the second axis direction Y may be referred to as Y0. The bottom center P0 may be an intersection point of the straights X0 and Y0. The bottom view shapes of the bottom surface 310 and the recess 315 may be different oval shapes, for example, oval shapes in which lengths in different axis directions are long.

The optical lens 300 may include the recess 315 which is concave at a lower center. The bottom surface 310 may include the recess 315 which is concave in a center region. The surface of the recess 315 may be the light incidence surface 320. In the optical lens 300, the Z-axis direction perpendicular to the bottom center P0 of the recess 315 may be defined as a central axis Z0. The bottom center P0 of the recess 315 may be the lower center of the optical lens 300 or the center of the bottom surface 310 and may be defined as a reference point. The bottom surface 310 may be provided around the recess 315.

The bottom surface 310 may include either or both of an inclined surface and a curves surface with respect to the first straight line X0 parallel in the X-axis direction based on the bottom center P0 and the second straight line Y0 parallel to the Y-axis direction. In the bottom surface 310, a region adjacent to the recess 315 may be flat, and a region adjacent to an outer edge may have an inclined surface. The bottom surface 310 may include an inclined surface or a curved surface. The inclined surface or the curved surface may become gradually higher from the recess 315 or the bottom center P0 to the outer edge. The recess 315 is concave or dented upward from the center region of the bottom surface 310. The recess 315 may be a region concave toward the first light exit surface 330.

The bottom surface 310 of the optical lens 300 includes a first edge 23 adjacent to the recess 315 and a second edge 25 adjacent to the second light exit surface 335. The first edge 23 is a boundary region between the light incidence surface 320 and the bottom surface 310 and may include a low point region of the optical lens 300. The first edge 23 may include the lowest point in the region of the bottom surface 310. A position of the first edge 23 may be provided to be lower than a position of the second edge 25 with respect to a first straight line X0 and a second straight line Y0 parallel thereto. The first edge 23 may cover a lower circumference of the light incidence surface 320. The second edge 25 may be an outer region of the bottom surface 310 or a lower region of the second light exit surface 335. The second edge 25 may be a boundary region between the bottom surface 310 and the second light exit surface 335.

The first edge 23 may be an inner region of the bottom surface 310 or a boundary line with the light incidence surface 320. The second edge 25 may be an outer region of the bottom surface 310 or a boundary line with the second light exit surface 335. The first edge 23 may include an inner corner or a curved surface. The second edge 25 may include an outer corner or a curved surface. The first edge 23 and the second edge 25 may be both ends of the bottom surface 310. A bottom view shape of the first edge 23 may be a circular shape or an oval shape, and a bottom view shape of the second edge 25 may be a circular shape or an oval shape.

As a distance to the first edge 23 on the bottom surface 310 is closer, an interval between the first straight line X0 and the second straight line Y0 parallel thereto may be gradually reduced. As a distance to the first edge 23 on the bottom surface 310 is farther away, an interval between the first straight line X0 and the second straight line Y0 parallel thereto may be gradually increased. On the bottom surface 310, the second edge 25 may be a maximum interval between the first straight line X0 and the second straight line Y0, and the first edge 23 may be a minimum interval between the first straight line X0 and the second straight line Y0. The bottom surface 310 may include either or both of an inclined surface and a curved surface between the first edge 23 and the second edge 25. As a distance is gradually farther away toward the outside with respect to the first straight line X0 and the second straight line Y0, the bottom surface 310 may be a total reflection surface when viewed from the recess 315. For example, when an arbitrary light source is provided on the bottom of the recess 315, the bottom surface 310 may provide an inclined surface. Since the bottom surface 310 reflects light incident through the recess 315, light loss can be reduced. Also, it is possible to remove light directly incident through the bottom surface 310 without passing through the light incidence surface 320. The optical lens 300 may increase an amount of light incident on the bottom surface 310 through the light incidence surface 320, and an orientation angle distribution may be improved.

As a distance to the first edge 23 of the recess 315 is closer, the bottom surface 310 may become lower. The bottom surface 310 adjacent to the first edge 23 may be gradually closer to the first straight line X0 and the second straight line Y0. Accordingly, an area of the bottom surface 310 may be increased, as compared to the flat bottom. An area of the light incidence surface 320 of the recess 315 may be further widened by a lowered depth of the bottom surface 310. Since a depth (D8 of FIG. 5) of the recess 315 is a vertical height from the first edge 23, the depth D8 of the recess 315 may become deeper. Since the area of the bottom surface 310 is increased, a reflection area may be increased. Since the bottom of the recess 315 becomes lower, a bottom area may be increased.

The first edge 23 of the bottom surface 310 may be provided on the first straight line X0 and the second straight line Y0 parallel to the bottom of the recess 315, and the second edge 25 may be spaced apart from the first straight line X0 and the second straight line Y0 by a predetermined interval. The interval between the second edge 25 and the first straight line X0 or the second straight line Y0 may be a distance that can provide an inclined surface so as to reflect light incident on the lower region 22 of the light incidence surface 320. The lower region 22 of the light incidence surface 320 may be a region between the first edge 23 and the lower point of the light incidence surface 320 which intersects with a line parallel to the second edge 25.

The interval between the second edge 25 and the first straight line X0 or the second straight line Y0 may be 500 μm or less, for example, 450 μm or less. The interval between the second edge 25 and the first straight line X0 or the second straight line Y0 may be in a range of 200 μm to 450 μm. When the interval between the second edge 25 and the first straight line X0 or the second straight line Y0 is less than the above range, a low point position of the second light exit surface 335 is lowered, thus causing interference between light beams emitted from the second light exit surface 335. When the interval is greater than the above range, a high point position of the second light exit surface 335 is increased, thus causing a problem that a curvature of the first light exit surface 330 is changed and a thickness D5 of the optical lens 300 is increased.

The bottom surface 310 of the optical lens 300 may have a curved surface having a Bezier curve. The curve of the bottom surface 310 may be realized by spline, for example, cubic, B-spline, or T-spline. The curve of the bottom surface 310 may be realized by a Bezier curve. The bottom surface 310 of the optical lens 300 may include a plurality of support protrusions 350. The plurality of support protrusions 350 protrude downward from the bottom surface 310 of the optical lens 300 and support the optical lens 300.

Figure 2:
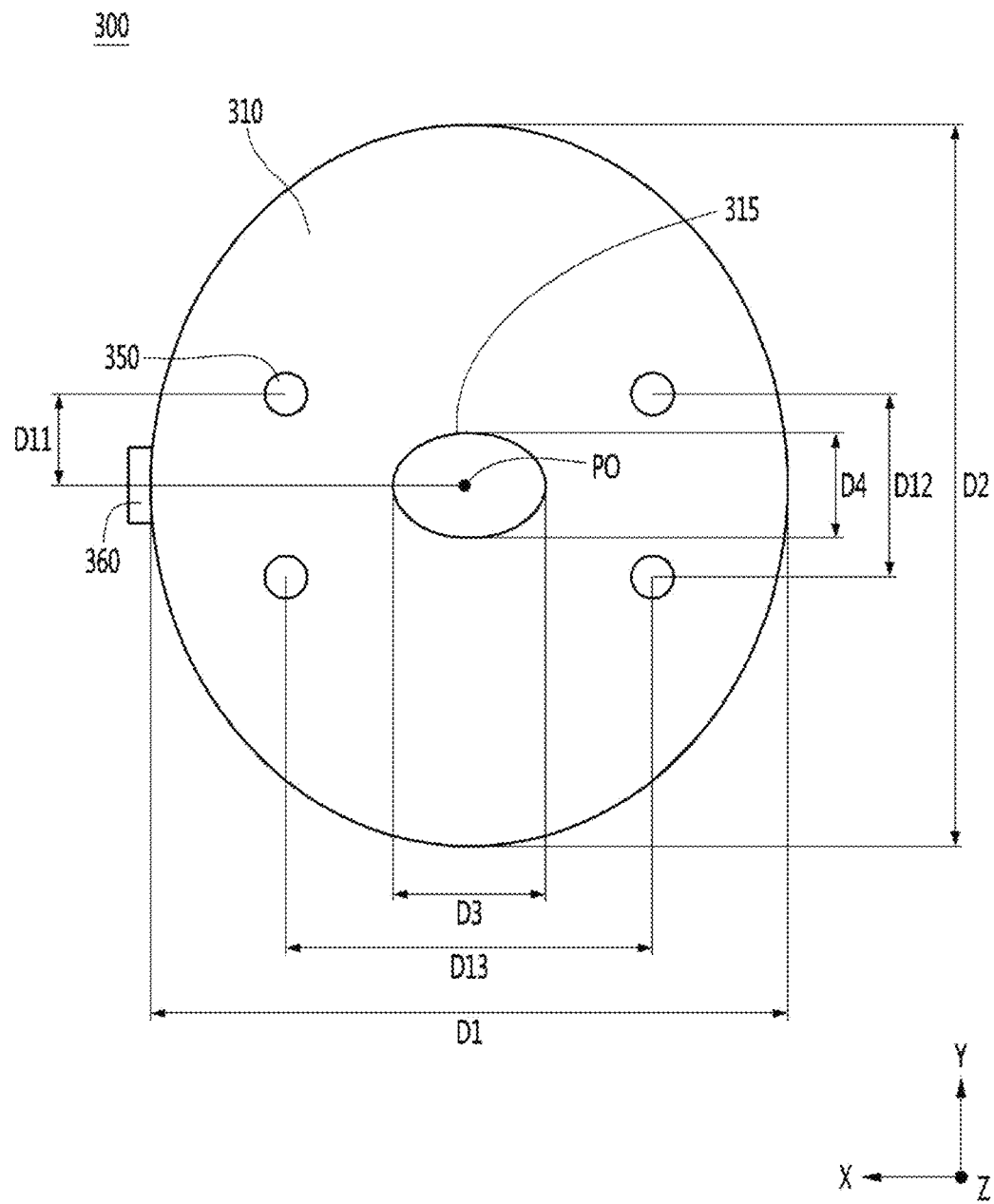
FIG. 2 is a bottom view of the optical lens of FIG. 1.

Referring to FIG. 2, the plurality of support protrusions 350 may be provided at the same distance from the bottom center P0. At least one of the plurality of support protrusions 350 may be provided at different distances from the bottom center P0. In the plurality of support protrusions 350, an interval D13 between the support protrusions provided in the X-axis direction may be greater than an interval D12 between the support protrusions provided in the second axis (Y-axis) direction. The interval D13 may be 1.5 times the interval D12, for example, twice the interval D12. In the plurality of support protrusions 350, since the interval D12 may be a width direction of a circuit board on which the optical lens is provided, the optical lens 300 may be stably supported without increasing the width of the circuit board.

As illustrated in FIG. 2, a bottom view shape of the bottom surface 310 may include an oval shape. Regarding the length of the bottom surface 310, a first length D1 in the X-axis direction may be different from a second length D2 in the Y-axis direction. The first length D1 may be a length of the bottom surface 310 in the X-axis direction, and the second length D2 may be a length of the bottom surface 310 in the Y-axis direction. The first length D1 may be a maximum length of the first light exit surface 330 in the X-axis direction, and the second length D2 may be a maximum length of the first light exit surface 330 in the Y-axis direction. The first length D1 may be a maximum length of the optical lens 300 in the X-axis direction, and the second length D2 may be a maximum length of the optical lens 300 in the Y-axis direction. The second length D2 and the first length D1 may have a relationship of D2>D1. A ratio of D2/D1 may be 101% or more, for example, in a range of 101% to 110%. The second distance D2 may be equal to or greater than the first length D1 by 0.5 mm or more, for example, 1 mm or more. The second length D2 may have a longer length than that of the first length D1 by 1 mm or more, for example, in a range of 1 mm to 3.5 mm. The length ratio D1:D2 may be in a range of 1:1.01 to 1:1.1. Since the first light exit surface 330 of the optical lens 300 has a maximum length in the Y-axis direction, it may be possible to increase a light emission surface in a diagonal direction or the X-axis direction perpendicular with respect to the Y-axis direction.

As illustrated in FIG. 2, the bottom shape of the recess 315 may include an oval shape. As illustrated in FIGS. 3 to 6, a side sectional shape of the recess 315 may include a bell shape, a shell shape, or an oval shape. The recess 315 may have a shape in which a width becomes narrower upward. The recess 315 may have a shape which gradually converges from the first edge 23 of the bottom circumference toward a first vertex 21 of an upper end. When the bottom view of the recess 315 is an oval shape, a diameter thereof may be gradually reduced toward the first vertex 21. The recess 315 may have a shape which is symmetrical in the X-axis direction or the Y-axis direction with respect to the central axis Z0. The first vertex 21 of the light incidence surface 320 may have a dot shape or a line shape.

Regarding the bottom length of the recess 315, a third length D3 in the X-axis direction may be different from a fourth length D4 in the Y-axis direction. For example, the third length D3 in the X-axis direction may be greater than the fourth length D4 in the Y-axis direction. The bottom length of the recess 315 may satisfy a relationship of D3>D4, and a difference therebetween may be in a range of 0.5 mm to 5 mm, for example, 1 mm to 2 mm. The third length D3 may be equal to or less than four times the fourth length D4, for example, twice the fourth length D4. A ratio D4:D3 on the bottom of the recess 315 may have a difference in a range of 1:1.1 to 1:2. Therefore, it is possible to improve a luminance distribution in the diagonal direction and the Y-axis direction perpendicular to the Y-axis length according to the ratio of the bottom length of the recess 315.

The third and fourth lengths D3 and D4 on the bottom of the recess 315 may have a width where a light source, that is, a light emitting device described later, can be inserted. The bottom lengths D3 and D4 of the recess 315 may be equal to or less than three times the width of the light emitting device, for example, equal to or less than 2.5 times the width of the light emitting device. The bottom lengths D3 and D4 of the recess 315 may be in a range of 1.2 to 2.5 times the width of the light emitting device or a length of one side thereof. When the bottom lengths D3 and D4 of the recess 315 are less than this range, the insertion of the light emitting device is not easy. When the bottom lengths D3 and D4 of the recess 315 are greater than this range, it is possible to reduce light loss or light interference through a region between the light emitting device and the first edge 23.

When the support protrusion 350 on the bottom surface 310 has a relationship of D12<D13, D12>D4 and D13>D3 may be satisfied. When a ratio of D12/D4 is g1 and a ratio of D13/D3 is g2, g1<g2 may be satisfied. In this case, the optical lens 300 provided in the X-axis direction may be stably fixed and supported on the circuit board and light loss may be reduced.

When the length ratio D2/D1 of the bottom surface 310 or the first light exit surface 330 is a and the length ratio D3:D4 of the recess 315 is b, the optical lens 300 according to the embodiment may have a relationship of a<b. The ratio of D2/D1 may be a ratio of a long length to a short length of the first light exit surface 330, and the ratio of D3/D4 may be a ratio of a long length to a short length of the bottom of the recess 315. b may be 110% or more of a, for example, in a range of 110% to 140%, or 120% to 160. b may be equal to or more than 1.1 times a, for example, in a range of 1.1 to 1.4 times a, or 1.2 to 1.6 times a. A difference between the length in the first axis direction and the length in the second axis direction on the bottom of the recess 315 may be equal to or different from a difference between the length in the first axis direction and the length in the second axis direction of the bottom surface 310 or the first light exit surface 330.

In the optical lens having such an asymmetrical shape, the area of the light incidence surface 320 of the recess 315 is wider in the X-axis direction than that of the lens having the symmetrical shape, thereby diffusing light more widely in the Y-axis direction. Due to the length difference in the outer shape, the optical lens 300 may secure a luminance distribution in the Y-axis direction, and the luminance distribution may be widely spread in the X-axis direction and toward the edge region by the recess 315. Therefore, the number of bars of the light emitting module on which the optical lens 300 is provided may be reduced to two or less, for example, one, and luminance distributions of upper/lower corners in a backlight unit may be improved.

Figure 5:
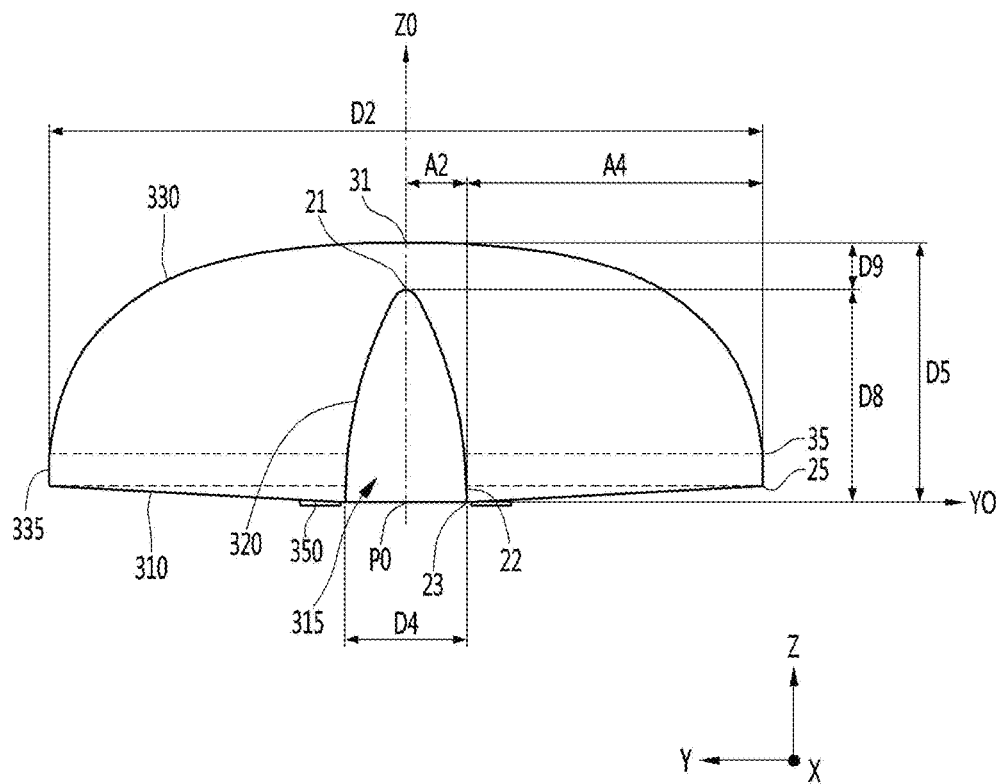
FIG. 5 is a sectional view of the optical lens, taken along line A-A of FIG. 1.
Figure 6:
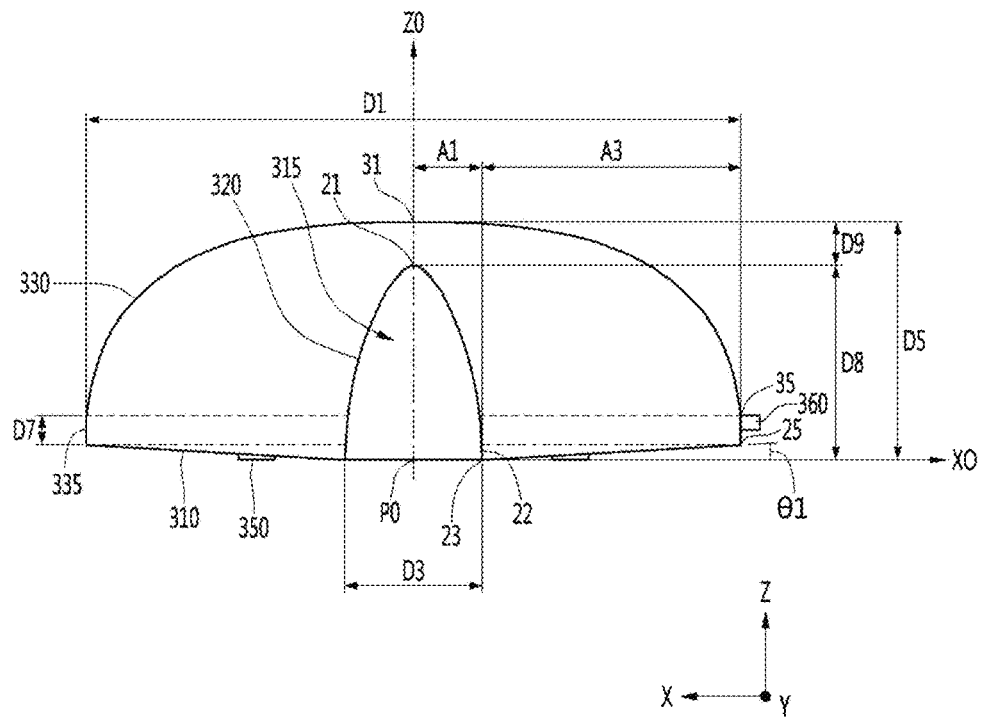
FIG. 6 is a sectional view of the optical lens, taken along line B-B of FIG. 1.

As illustrated in FIGS. 5 and 6, the light incidence surface 320 may have a curved surface which is convex upward from the center region of the bottom surface 310 and may be a circumferential surface or an inner surface of the recess 315. The light incidence surface 320 may be gradually farther away as a distance to the bottom center P0 of the recess 315 is vertically increased. Since the light incidence surface 320 has a convexly curved surface, the entire light incidence surface 320 may refract light. Since a lower region 22 of the light incidence surface 320 is provided at a lower position than the second light exit surface 335, the light incidence surface 320 may receive light directly or indirectly. The lower region 22 of the light incidence surface 320 may receive light reflected from the bottom of the recess 315. The light incidence surface 320 may be formed by a rotor having a Bezier curve. The curve of the light incidence surface 320 may be realized by spline, for example, cubic, B-spline, or T-spline. The curve of the light incidence surface 320 may be realized by a Bezier curve.

As illustrated in FIGS. 5 and 6, the optical lens 300 may include the first light exit surface 330. The first light exit surface 330 may be a surface opposite to the recess 315 and the bottom surface 310 with respect to the lens body. The first light exit surface 330 may be a surface opposite to the light incidence surface 320 and the bottom surface 310. The first light exit surface 330 may include a curved surface. A point corresponding to the central axis Z0 on the first light exit surface 330 may be a second vertex 31, and the second vertex 31 may be a vertex of the lens body. The first light exit surface 330 may include a curved surface which is convex upward. The entire first light exit surface 330 may have a curved surface, for example, a curved surface having different positive curvatures. The first light exit surface 330 may have a shape which have an axially symmetrical shape, for example, an X-axis or Y-axis symmetrical shape, with respect to the central axis Z0. First regions A1 and A2 close to the center and adjacent to the second vertex 31 on the second light exit surface 335 may not have a negative curvature. The first regions A1 and A2 adjacent to the second vertex 31 on the second light exit surface 335 may have different positive curvature radii.

Second regions A3 and A4, which are outer side regions of the first regions A1 and A2, may be curved surfaces having different curvature radii. The region A1 of the first regions A1 and A2 may be a region extending from the first light exit surface 330 in the Y-axis direction with respect to the central axis Z0 and overlapping the recess 315 in the Z-axis direction, and the region A2 may be a region extending from the first light exit surface 330 in the X-axis direction with respect to the central axis Z0 and overlapping the recess 315 in the Z-axis direction. The region A3 of the second regions A3 and A4 may be a region extending in the Y-axis direction and overlapping the bottom surface 310 in the Z-axis direction, and the region A4 may be a region extending from the first light exit surface 330 in the X-axis direction and overlapping the bottom surface 310 in the Z-axis direction. The first regions A1 and A2 may have a region width relationship of A1>A2, and the second regions A3 and A4 may have a region width relationship of A4>A3.

The first light exit surface 330 may be gradually increased as a distance to the bottom center P0 of the recess 315 is gradually farther away from the central axis Z0. As a distance to the central axis Z0, that is, the second vertex 31, on the first light exit surface 330 is reduced, there is no slope or a slight slope difference with respect to a horizontal axis. That is, the first regions A1 and A2 on the center of the first light exit surface 330 may include a gently curved surface or a parallel straight line. The first regions A1 and A2 of the first light exit surface 330 may include a region vertically overlapping the recess 315. The second regions A3 and A4 on the sides of the first light exit surface 330 may have a steeply curved surface, as compared with the first regions A1 and A2. Since the first light exit surface 330 and the light incidence surface 320 have a convexly curved surface, it is possible to diffuse light emitted from the bottom center P0 of the recess 315 in a lateral direction. The first light exit surface 330 and the light incidence surface 320 may increase a light refraction angle as a distance to the central axis Z0 is increased in an angle range of 70±4 degrees from the central axis Z0.

The curvature radii of the first regions A1 and A2 of the first light exit surface 330 may be greater than the curvature radius of the light incidence surface 320. The curvature radii of the first regions A1 and A2 of the first light exit surface 330 may be greater than the curvature radii of the second regions A3 and A4. The first regions A1 and A2 in the X-axis direction and the Y-axis direction may have the same curvature radius or different curvature radii, but are not limited thereto. The first regions A1 and A2 in the X-axis direction and the Y-axis direction may have the same curvature radius or different curvature radii, but are not limited thereto.

The slope of the first light exit surface 330 may be less than the slope of the light incidence surface 320. The first light exit surface 330 of the optical lens 300 monotonically increase as a distance to the central axis Z0 is increased within an orientation angle. The second light exit surface 335 includes a region deviated from the orientation angle distribution of light and monotonically increases as a distance to the central axis Z0 is increased.

The optical lens 300 may include a second light exit surface 335 between the first light exit surface 330 and the bottom surface 310. The second light exit surface 335 may be provided at a higher position than the first straight line X0 and the second straight line Y0 parallel to the bottom of the recess 315. The second light exit surface 335 may be a flat surface or an inclined surface and may be defined as a flange, but is not limited thereto. The second light exit surface 335 may be provided to be perpendicular or inclined with respect to the first straight line X0 and the second straight line Y0. The second light exit surface 335 may extend to be perpendicular or inclined from the outer line of the first light exit surface 330. The second light exit surface 335 may include a third edge 35 adjacent to the first light exit surface 330, and the third edge 35 may be provided at the same position as the outer line of the first light exit surface 330 or may be provided to be more inner or outer than the first light exit surface 330.

A straight line connecting the third edge 35 of the second light exit surface 335 and the central axis Z0 may be provided at an angle of 74±2 or less from the central axis Z0 with respect to the bottom center P0 of the recess 315. The third edge 35 of the second light exit surface 335 may be provided at an angle of 20 degrees or less, for example, an angle of 16±2 degrees, with respect to the first straight line X0 and the second straight line Y0 with respect to the bottom center P0 of the recess 315. The angle between the second edge 25 and the third edge 35 of the second light exit surface 335 with respect to the bottom center P0 of the recess 315 may be 16 degrees or less, for example, 13±2 degrees. The angle of the straight line passing through the third edge 35 of the second light exit surface 335 is an external angle of the optical lens 300. The second light exit surface 335 may refract and radiate light incident on a region spaced apart from the first straight line X0 and the second straight line Y0. The light refracted by the second light exit surface 335 may be radiated at an angle smaller than an angle before refraction with respect to the central axis Z0. Accordingly, the second light exit surface 335 may suppress the refracted light from being radiated in a horizontal axis or a direction below the horizontal axis and may prevent interference on the adjacent optical member or light loss.

A refraction angle of light at an interface between the first light exit surface 330 and the second light exit surface 335 may be reduced in an angle range of, for example, 2 degrees or less. Since a surface of the first light exit surface 330 close to the second light exit surface 335 is provided as a surface close to or perpendicular to a tangent line, the refraction angle of light may be gradually reduced.

An angle $\theta 1$ between the straight line passing through the central axis Z0 and the second edge 25 of the bottom surface 310 and the first straight line X0 or the second straight line Y0 may be 5 degrees or less, for example, in a range of 0.4 degrees to 4 degrees. The angle $\theta 1$ may be changed according to the distance to the central axis Z0 and the height of the second edge 25. When the angle $\theta 1$ is out of this range, the thickness of the optical lens may be changed and light loss may be increased. The second light exit surface 335 refracts light beams, which deviate from a half power angle, from the central axis Z0 with respect to the bottom center P0 of the recess 315, thereby reducing light loss.

The lengths D1 and D2 of the optical lens 300 may be greater than the thickness D5 thereof. The lengths D1 and D2 of the optical lens 300 may be equal to or greater than 2.5 times the thickness D5 thereof, for example, equal to or greater than three times the thickness D5 thereof. The first length D1 may be 15 mm or more, for example, in a range of 16 mm to 28 mm, and the second length D2 may be 16 mm or more, for example, in a range of 17 mm to 32 mm. The thickness D5 may be 6.5 mm or more, for example, in a range of 6.5 mm to 10 mm. When a ratio of D5/D1 is c and a ratio of D5/D2 is d, c and d may be 0.3 or more and have a relationship of c>d. Since the lengths D1 and D2 of the optical lens 300 are greater than the thickness D5 thereof, it is possible to provide a uniform luminance distribution to an entire region of the lighting apparatus or the light unit. Also, since a region covered in the light unit is improved, the number of optical lenses may be reduced and the thickness of the optical lens 300 may be reduced.

The depth D8 of the recess 315 has an interval from the bottom center P0 to the first vertex 21. The first vertex 21 may be a vertex of the light incidence surface 320 or an upper end point of the recess 315. The depth D8 of the recess 315 may be 5 mm or more, for example, 6 mm or more, and may be equal to or greater than 0.75 of the thickness D5 of the optical lens 300, for example, equal to or greater than 0.8 of the thickness D5 of the optical lens 300. The depth D8 of the recess 315 may be equal to or greater than 0.8 of the distance between the second vertex 31 of the first light exit surface 330 and the bottom center P0 or the first edge 23. When a ratio of D3/D8 is e and a ratio of D4/D8 is f, the recess 315 may have a relationship of e>f. Since the depth D8 of the recess 315 is deep, light may be diffused to a region adjacent to the first vertex 21 of the light incidence surface 320 in a lateral direction even though the center region of the first light exit surface 330 does not have a total reflection surface or a negative curvature. Since the recess 315 has a deep depth D8, the light incidence surface 320 may refract light incident from a region close to the second vertex 31 to a peripheral region of the first vertex 21 in a lateral direction.

A minimum distance D9 between the recess 315 and the first light exit surface 330 may be an interval between the first vertex 21 of the light incidence surface 320 and the second vertex 31 of the first light exit surface 330. The distance D9 may be 3 mm or less, for example, in a range of 0.6 mm to 3 mm, or 0.6 mm to 2 mm. When the distance D9 between the first vertex 21 of the light incidence surface 320 and the second vertex 31 of the first light exit surface 330 is 3 mm or more, a difference between an amount of light traveling toward the first regions A1 and A2 of the first light exit surface 330 and an amount of light traveling toward the second regions A3 and A4 may be increased and a light distribution may not be uniform.

When the distance D9 between the first vertex 21 of the light incidence surface 320 and the second vertex 31 of the first light exit surface 330 is less than 0.6 mm, the stiffness on the center of the optical lens 300 is weakened. By having the distance D9 between the recess 315 and the first light exit surface 330 in the above range, an optical path may be diffused in an outward direction even though the first regions A1 and A2 of the second light exit surface 335 do not have a total reflection surface or a negative curvature. As the first vertex 21 of the light incidence surface 320 is closer to the convex second vertex 31 of the first light exit surface 330, it may be possible to increase an amount of light traveling in a lateral direction of the first light exit surface 330 through the light incidence surface 320. Accordingly, it may be possible to increase an amount of light diffusing in a lateral direction of the optical lens 300.

The first vertex 21 of the light incidence surface 320 may be provided to be closer to the second vertex 31, which is the center of the first light exit surface 330, than the straight line horizontally extending from the third edge 35 of the second light exit surface 335. A width D7 of the second light exit surface 335 is a straight distance between the second edge 25 and the third edge 35 and may be less than the depth D8 (>D7) of the recess 315. A ratio of D8/D7 may be 3 or more, for example, 4 or more. A ratio of D5/D7 may be 4 or more, for example, 4.5 or more. The width D7 of the second light exit surface 335 may be in a range of, for example, 1.5 mm to 2.3 mm. When the width D7 of the second light exit surface 335 exceeds the above range, an amount of light emitted to the second light exit surface 335 is increased, and thus, a light distribution control is difficult. When the width D7 of the second light exit surface 335 is smaller than the above range, it may be difficult to secure a gate region when the lens body is manufactured.

As illustrated in FIGS. 5 and 6, the first regions A1 and A2 of the first light exit surface 330 are regions vertically overlapping the recess 315 and may be provided in a region of an angle of 20 degrees, for example, 14 degrees to 18 degrees, from the central axis Z0 with respect to the bottom center P0. When the first regions A1 and A2 of the first light exit surface 330 exceed the above angle range, the radius inside the recess 315 is further increased and a difference of an amount of light between the first regions A1 and A2 and the second regions A3 and A4 is increased. Also, when the first regions A1 and A2 of the first light exit surface 330 are smaller than the above angle range, the radius inside the recess 315 is further decreased. Thus, it may be difficult to insert the light source, and the light distribution of the first regions A1 and A2 and the second regions A3 and A4 of the first light exit surface 330 may not be uniform.

In the optical lens 300, the second light exit surface 335 may be provided around a lower circumference of the first light exit surface 330, and the bottom surface 310 may be provided to be lower than the second edge 25 of the second light exit surface 335. The bottom surface 310 may protrude more downward than the horizontal line of the second edge 25 of the second light exit surface 335. As another example of the optical lens 300, the second light exit surface 335 may have an uneven surface. The uneven surface may be a rough haze surface. The uneven surface may be a surface on which scattered particles are formed. As another example of the optical lens 300, the bottom surface 310 may have an uneven surface. The uneven surface of the bottom surface 310 may be a rough haze surface or a surface on which scattered particles are formed.

Figure 13:
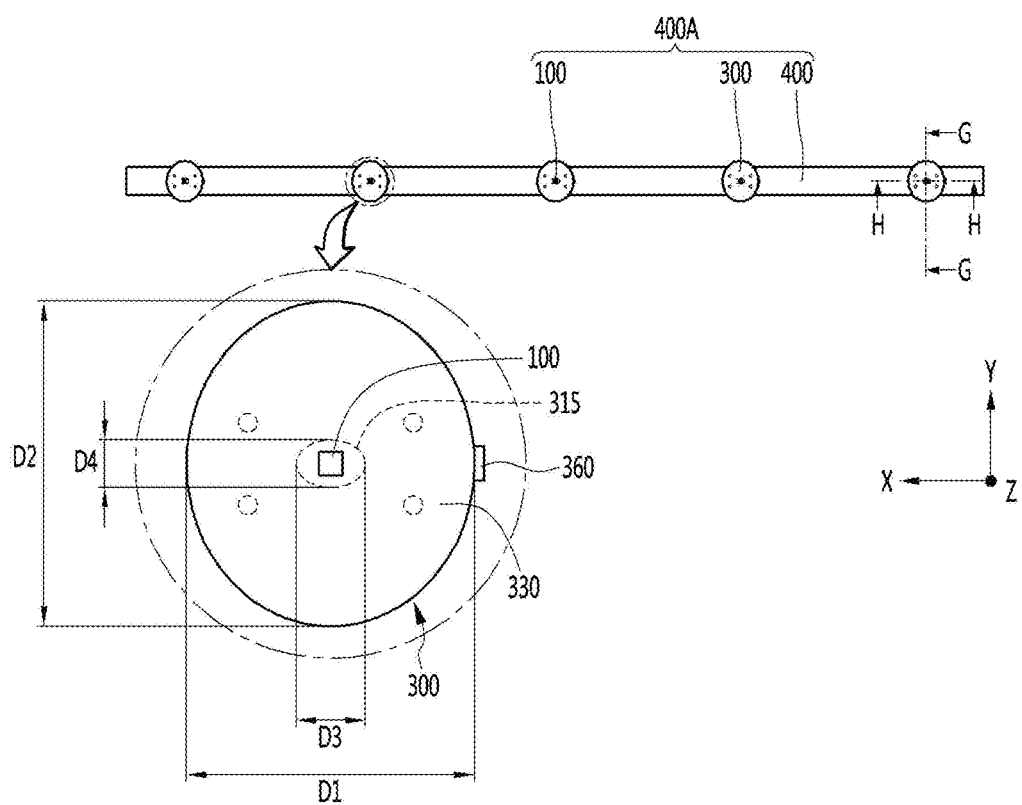
FIG. 13 is a view of a light emitting module including an optical lens, according to another embodiment.

As illustrated in FIG. 13, the optical lenses 300 according to the embodiment may be provided on the circuit board 400 in the X-axis direction by certain intervals. As illustrated in FIGS. 2, 5, and 6, these optical lenses 300 are provided in the X-axis direction where the length (D4<D3) of the recess 315 is wide. Thus, the number of optical lenses 300 may be reduced while widening the interval between the optical lenses 300. Also, due to the asymmetrical structure of the recess 315, the luminance distribution in the Y-axis direction or the X-Y diagonal direction may be improved.

Figure 14:
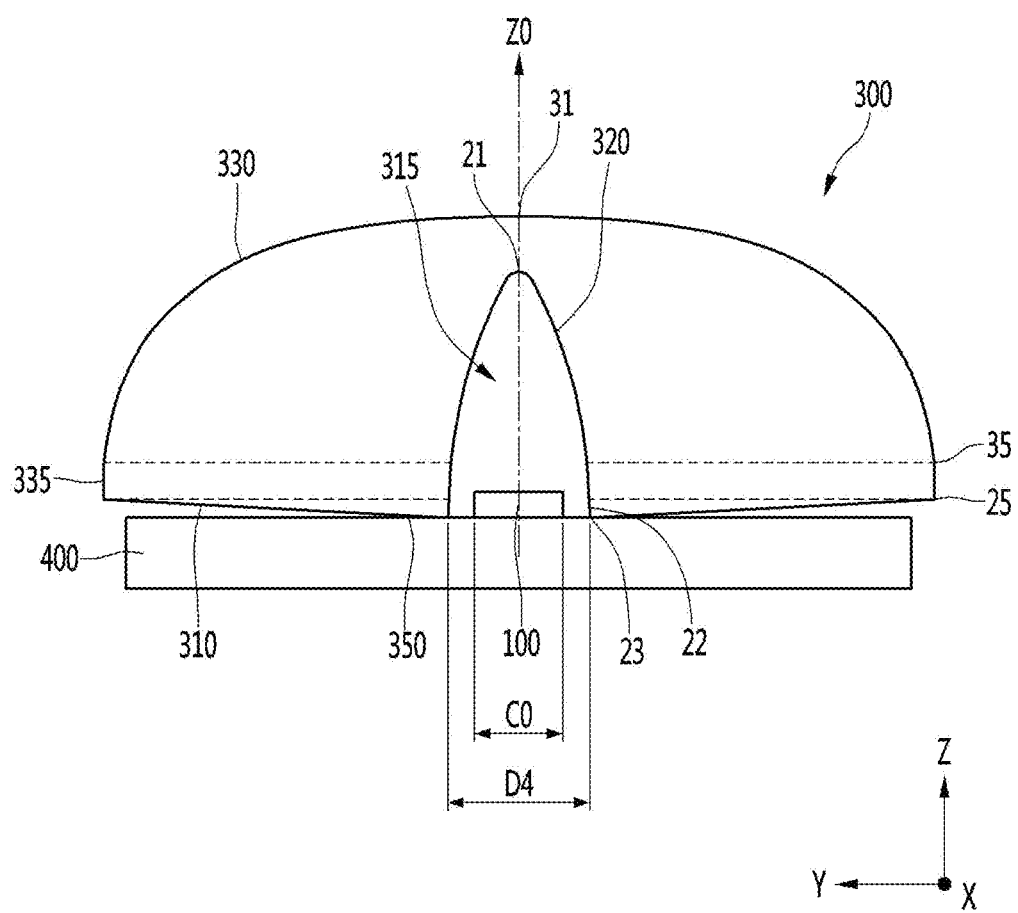
FIG. 14 is a sectional view of the light emitting module, taken along line G-G of FIG. 13.
Figure 15:
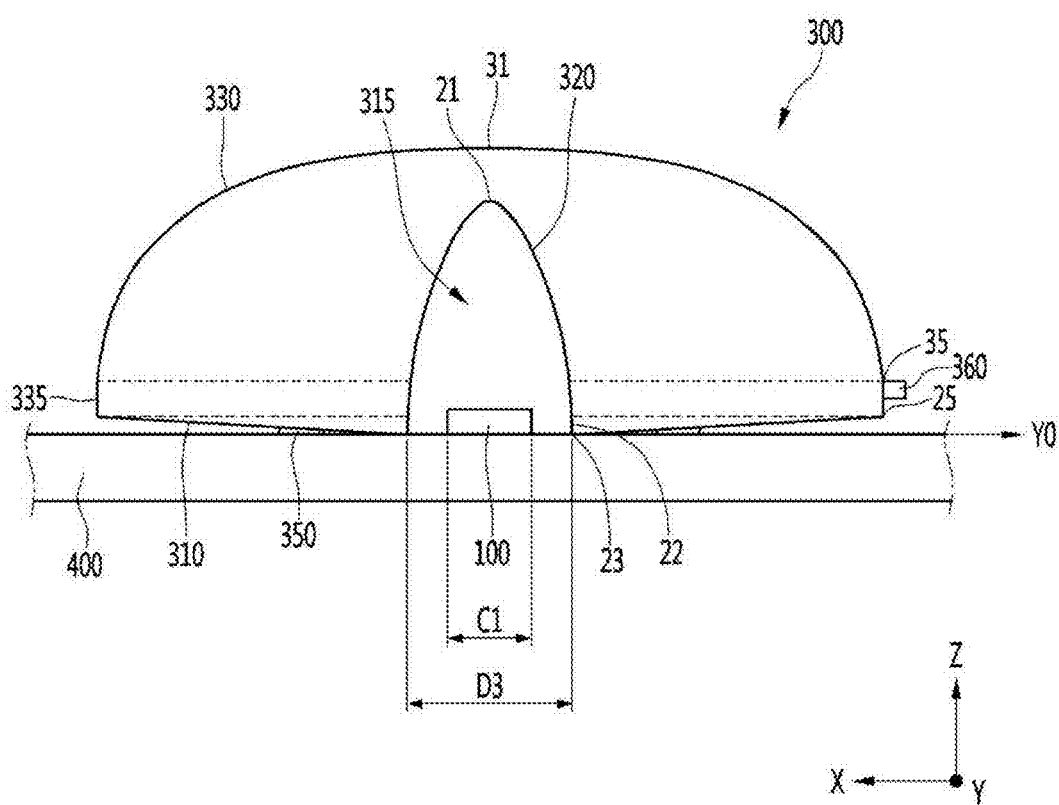
FIG. 15 is a sectional view of the light emitting module, taken along line H-H of FIG. 13.
Figure 36:
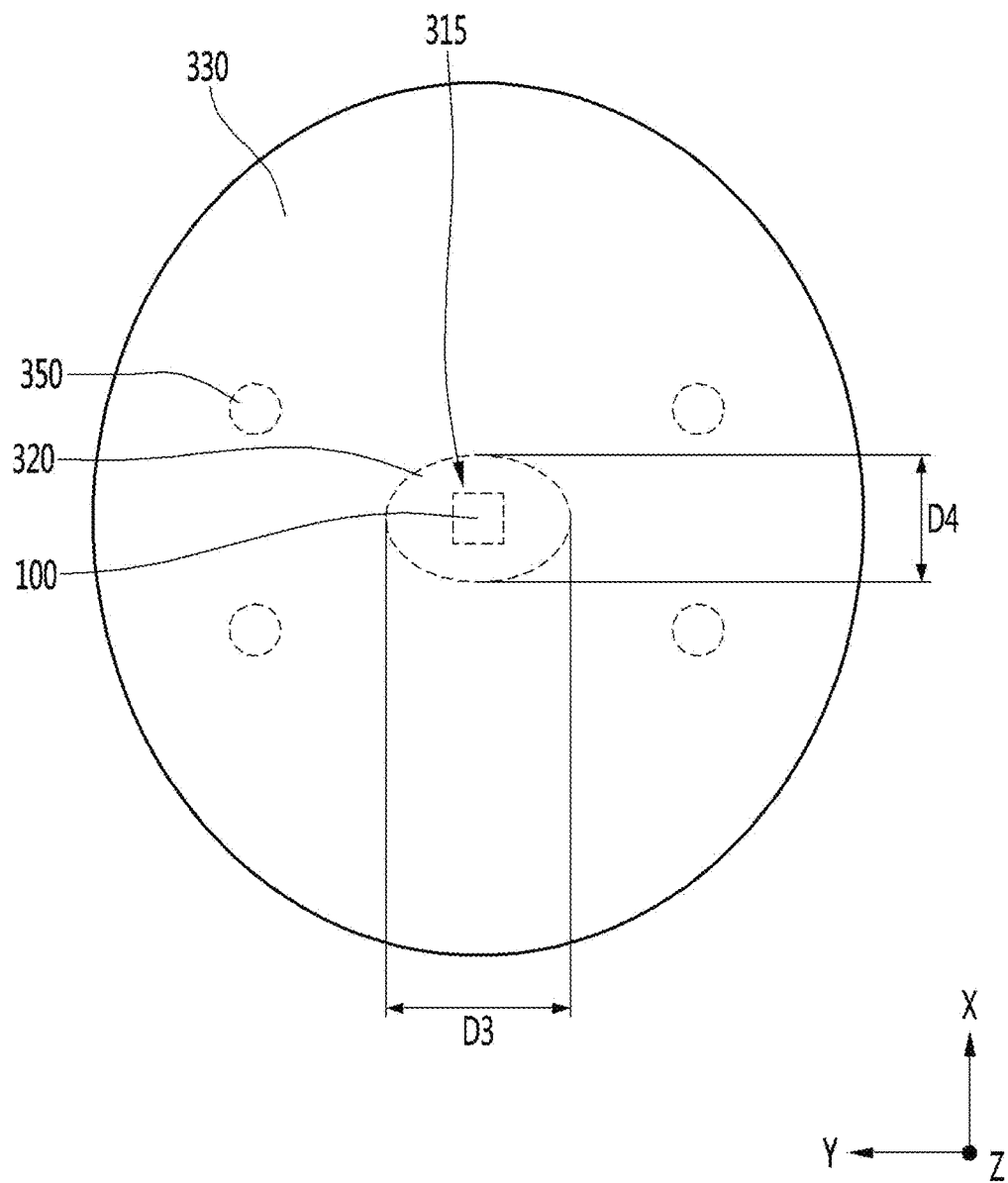
FIG. 36 is a view of a light emitting device provided in a recess of an optical lens, according to an embodiment.
Figure 37:
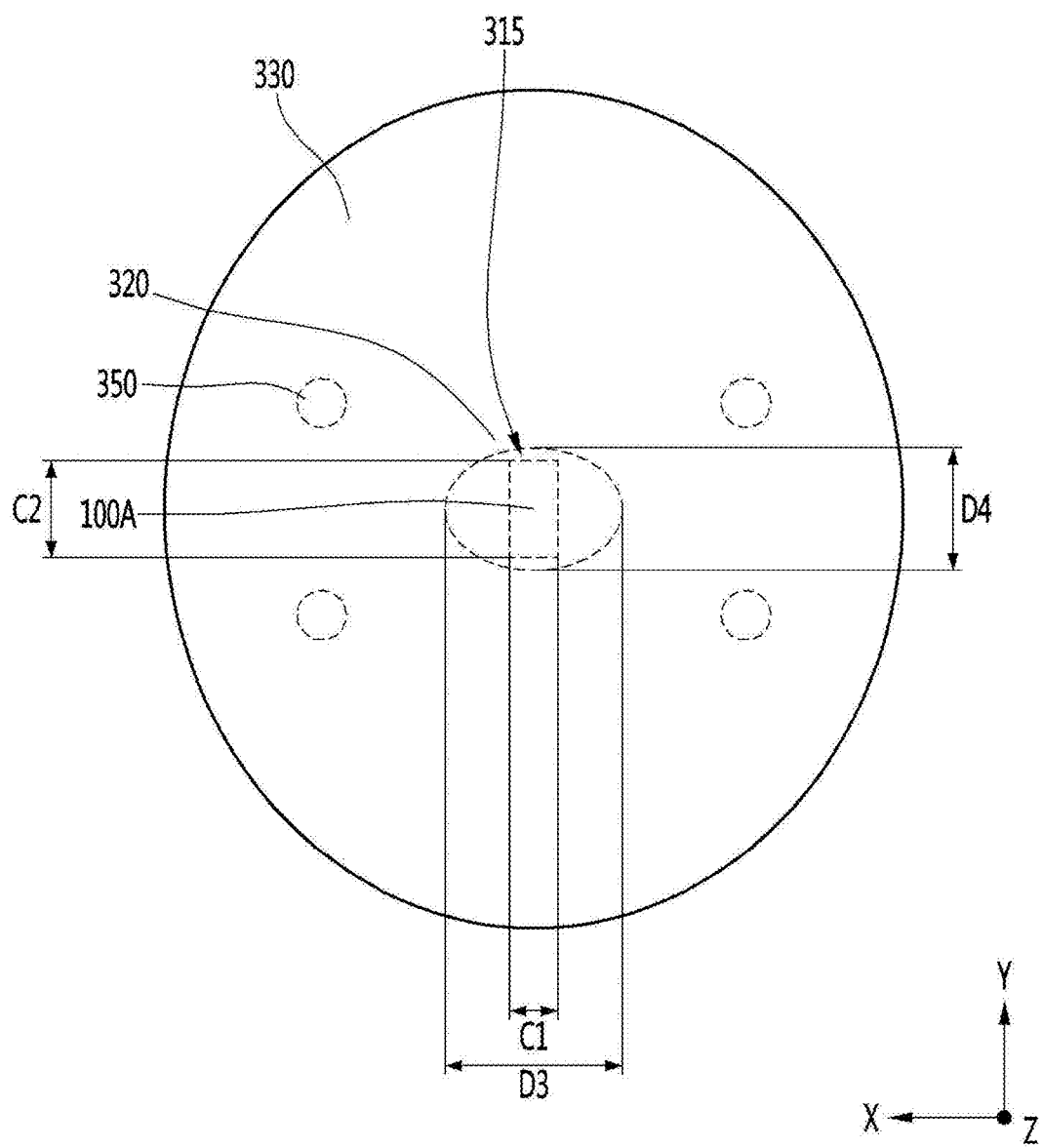
FIG. 37 is a view of another light emitting device provided in a recess of an optical lens, according to an embodiment.
Figure 38:
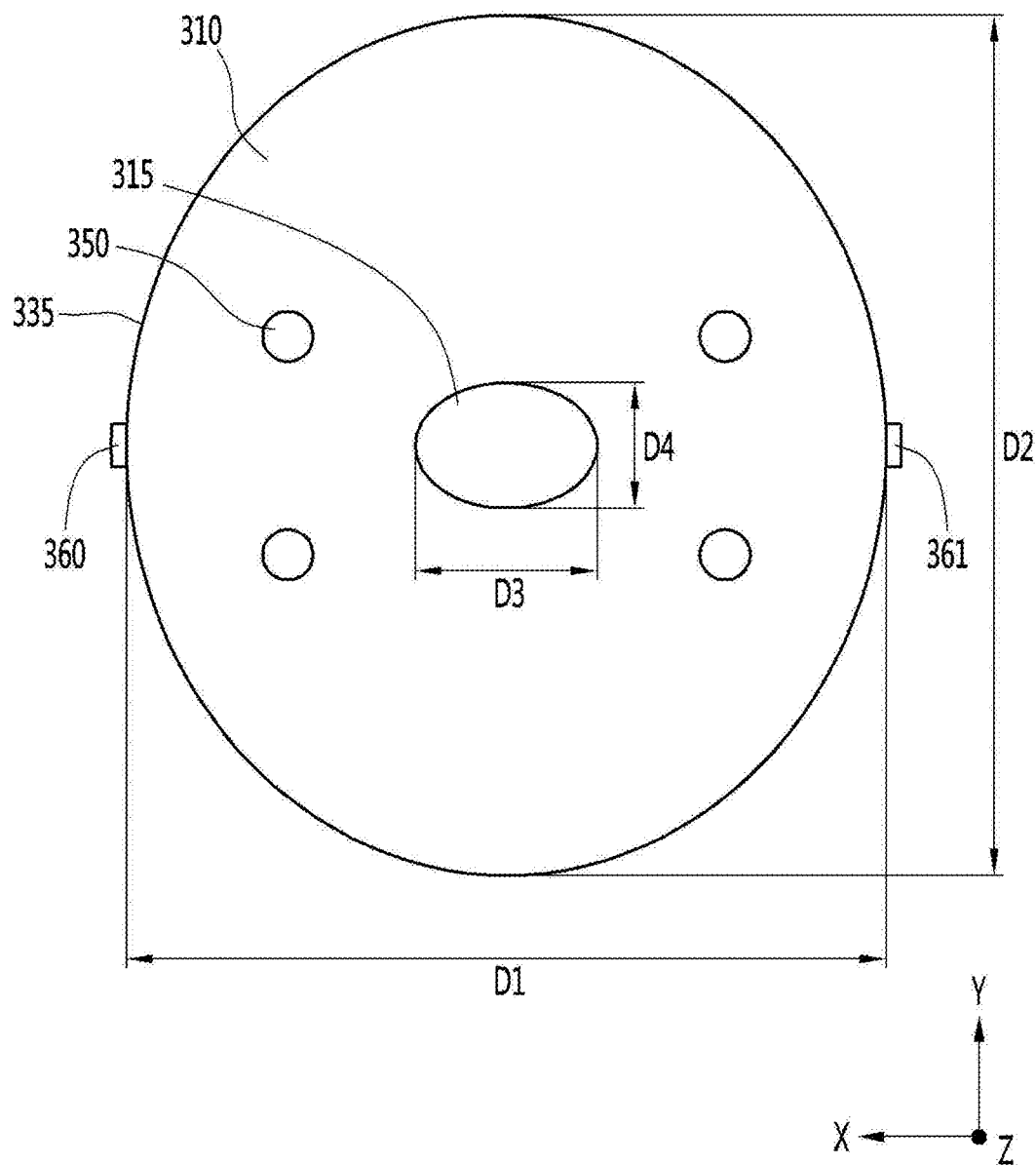
FIG. 38 is a view of a lateral protrusion of an optical lens, according to an embodiment.
Figure 39:
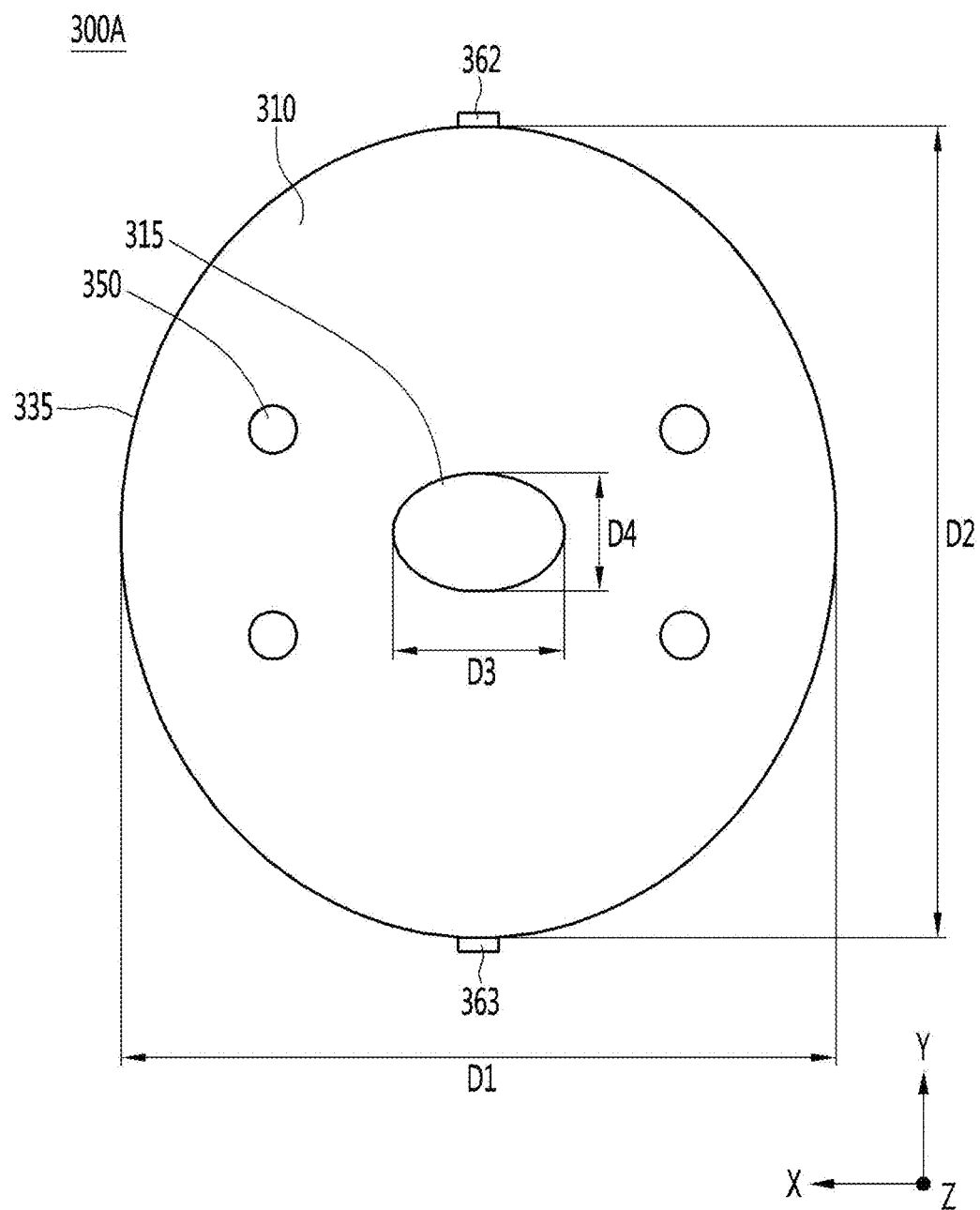
FIG. 39 is a view of another lateral protrusion of an optical lens, according to an embodiment.

When a light emitting device is provided under the optical lens of FIGS. 5 and 6, a light emitting module may be implemented as illustrated in FIGS. 14 and 15. In this case, the light emitting device 100 may be provided in the recess 315 of the optical lens 300 to emit light, and the emitted light may be refracted from the light exit surface 320 and emitted through the first light exit surface 330. A part of the light emitted through the light incidence surface 320 may be emitted through the second light exit surface 335. The optical lens according to the first embodiment may emit light refracted through the first and second light exit surfaces 330 and 335 in an upper direction and a lateral direction of the optical lens 300. That is, the optical lens 300 may refract the incident light so as to be emitted in an upper direction rather than a straight line parallel to the bottom surface. In such an optical lens 300, the orientation angle distribution in the X-axis direction may be greater than the orientation angle distribution in the Y-axis direction, as illustrated in FIGS. 36 and 37. For example, the orientation angle distribution in the X-axis direction may be higher than the orientation angle distribution in the Y-axis direction by 1 degree or more, for example, 1 degree to 5 degrees. Also, a half width at half maximum (FWHM) of the orientation angle distribution in the Y-axis direction may be 10 degrees or less, and a central strength may be 5% or less. In the optical lens according to the first embodiment, when comparing light emitted to the light exit surface, an amount of light traveling above the straight line parallel to the vertex of the optical lens may be larger than an amount of light traveling below the straight line parallel to the vertex.

Figure 3:
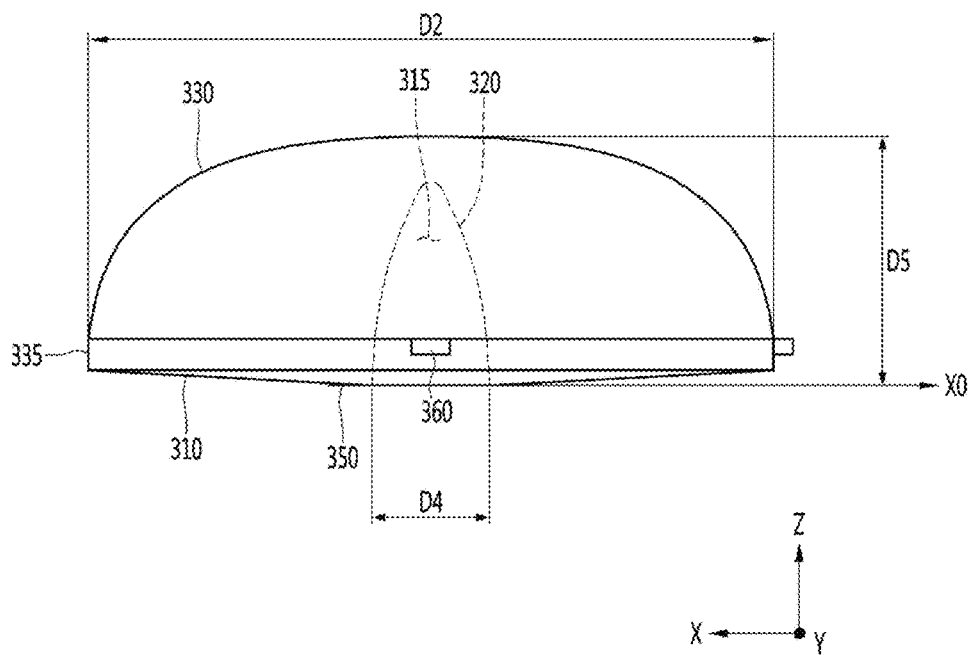
FIG. 3 is a first side view of the optical lens of FIG. 1 in an X-axis direction.

As illustrated in FIGS. 2 and 3, the optical lens 300 according to the embodiment may include a lateral protrusion 360. The lateral protrusion 360 may be provided on a part of the surface of the light exit surface, for example, the second light exit surface 335. The lateral protrusion 360 may function as a gate upon injection. The lateral protrusion 360 may be provided in at least one of the X-axis direction and the Y-axis direction in the region of the second light exit surface 335. The lateral protrusion 360 may protrude from the second light exit surface 335 of the X-axis direction. A height (or thickness) of the lateral protrusion 360 may be equal to or less than a vertical width (or height) D7 of the second light exit surface 335. Since the lateral protrusion 360 is provided in the X-axis direction, an injected liquid lens body may be dispersed due to the structure of the recess 315 having a long bottom length D3 in the X-axis direction.

Figure 7:
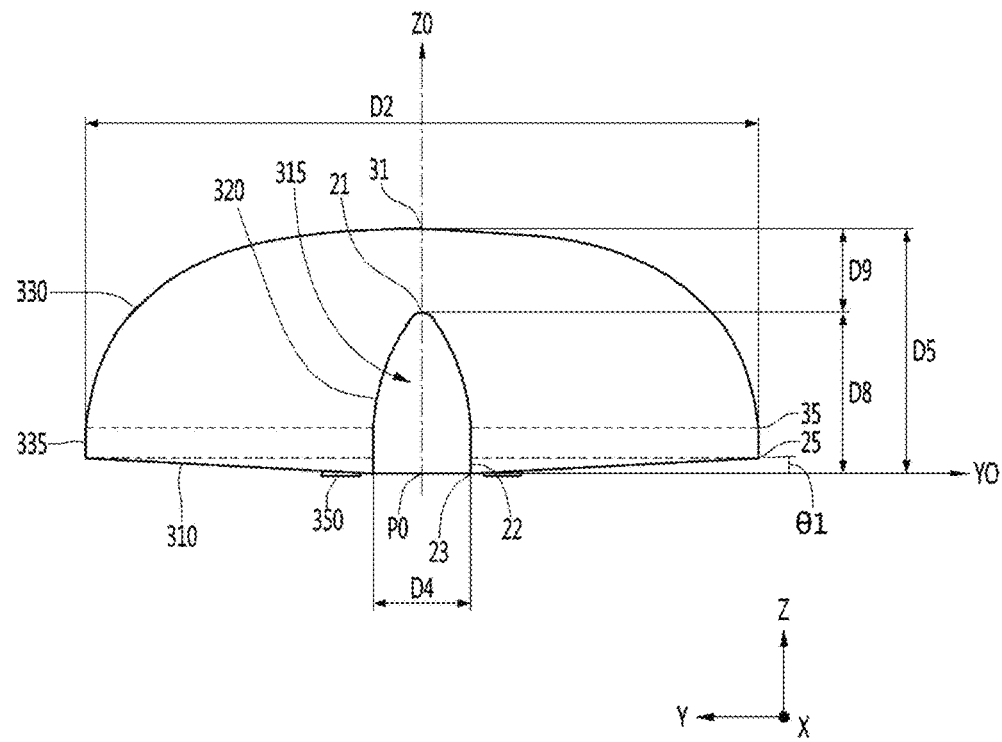
FIG. 7 is a sectional view of an optical lens, taken along line A-A of FIG. 1, according to another embodiment.
Figure 8:
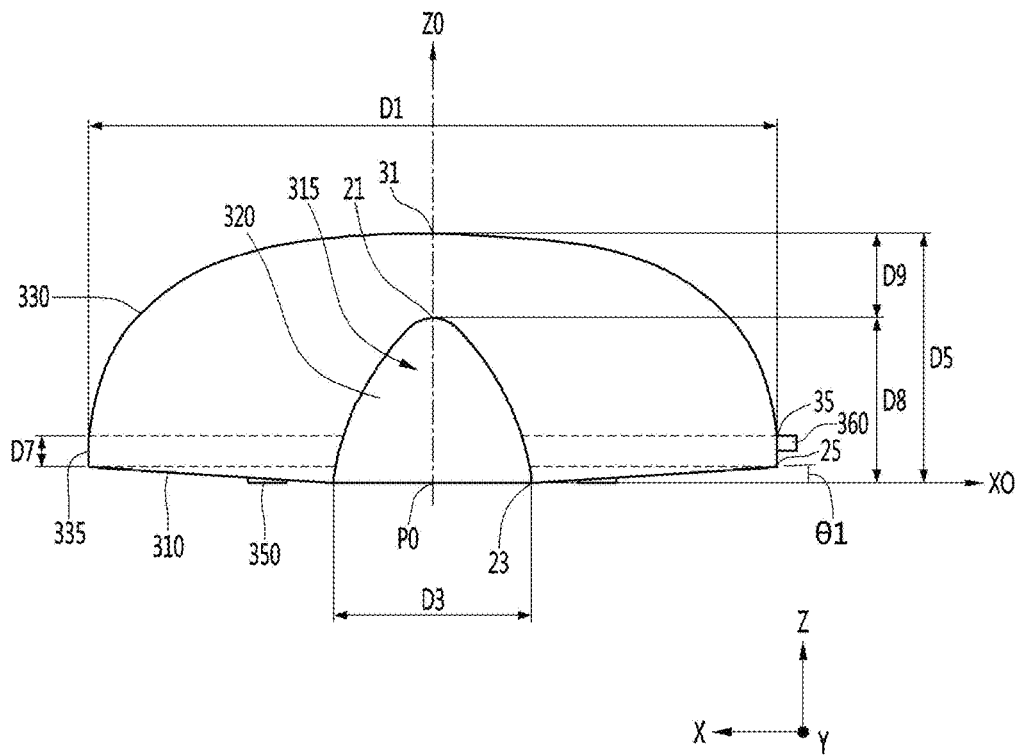
FIG. 8 is a sectional view of an optical lens, taken along line B-B of FIG. 1, according to another embodiment.

FIG. 7 is a sectional view of an optical lens, taken along line A-A of FIG. 1, according to a second embodiment, and FIG. 8 is a sectional view of an optical lens, taken along line B-B of FIG. 1, according to a second embodiment. In describing the second embodiment, descriptions already provided in the first embodiment have been omitted. With reference to the plan view and the bottom view of FIGS. 1 and 2, the optical lens of FIGS. 7 and 8 has a modified configuration of the first embodiment in terms of the length and thickness of the optical lens and the length and depth of the recess.

Referring to FIGS. 7 to 8, the optical lens according to the second embodiment includes a bottom surface 310, a recess 315 which is concave in a center region of the bottom surface 310, and a first light exit surface 330 provided on a side opposite to the bottom surface 310 and the recess 315. The optical lens 300 may include a second light exit surface 335 between the first light exit surface 330 and the bottom surface 310. The following description will focus on a difference between the optical lens according to the second embodiment and the optical lens according to the first embodiment.

The bottom surface 310 of the optical lens may include a plurality of support protrusions 350. The plurality of support protrusions 350 may protrude downward from the bottom surface 310 of the optical lens 300 and support the optical lens 300. These support protrusions 350 may be substantially the same as described in the first embodiment.

The optical lens of FIGS. 7 and 8 may emit light through the first and second light exit surfaces 330 and 335 in an upward direction and a lateral direction. An amount of the light emitted through the first and second light exit surfaces 330 and 335 may be larger in a downward direction than in an upward direction with respect to the straight line parallel to the vertex of the optical lens. While the optical lens according to the first embodiment emits a larger amount of light in an upper direction, the optical lens according to the second embodiment emits a larger amount of light in a lateral direction. Thus, the optical lens according to the second embodiment may be provided as a lateral light-emission lens.

A bottom view shape of the bottom surface 310 may include an oval shape. Regarding the length of the bottom surface 310 or the first light exit surface 330, a first length D1 in the X-axis direction may be different from a second length D2 in the Y-axis direction. The first length D1 may be a length of the optical lens 300 in the X-axis direction, and the second length D2 may be a length of the optical lens 300 in the Y-axis direction. The first length D1 may be longer than the second length D2. The first length D1 may be greater than the second length D2 by 1 mm or more, for example, 2 mm or more. The length satisfies a condition of D2>D1, and a length ratio D1:D2 may be in a range of 1:1.08 to 1:1.4. In the optical lens 300 according to the embodiment, since the second length D2 is longer than the first length D1, a luminance distribution in the Y-axis direction may not be reduced.

Figure 9:
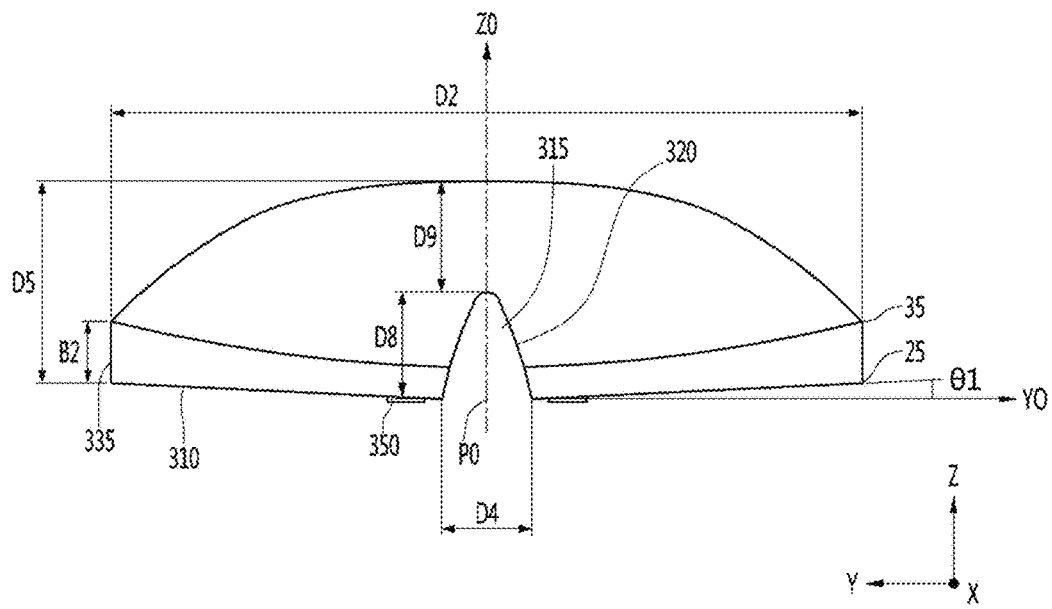
FIG. 9 is a sectional view of an optical lens, taken along line A-A of FIG. 1, according to another embodiment.

The bottom shape of the recess 315 may include an oval shape. As illustrated in FIGS. 8 and 9, a side sectional shape of the recess 315 may include a bell shape, a shell shape, or an oval shape. The recess 315 may have a shape in which a width becomes narrower upward. The recess 315 may have a shape which gradually converges from the first edge 23 of the bottom circumference toward a first vertex 21 of an upper end. When the bottom view of the recess 315 is an oval shape, a diameter thereof may be gradually reduced toward the first vertex 21. The recess 315 may have an axially symmetrical shape with respect to the central axis Z0. The first vertex 21 of the light incidence surface 320 may have a dot shape.

Bottom lengths D3 and D4 of the recess 315 may have a width where a light source, that is, a light emitting device described later, can be inserted. The bottom lengths D3 and D4 of the recess 315 may be equal to or less than three times the width of the light emitting device, for example, equal to or less than 2.5 times the width of the light emitting device. The bottom lengths D3 and D4 of the recess 315 may be in a range of 1.2 to 2.5 times the width of the light emitting device. When the bottom lengths D3 and D4 of the recess 315 are less than this range, the insertion of the light emitting device is not easy. When the bottom lengths D3 and D4 of the recess 315 are greater than this range, it is possible to reduce light loss or light interference through a region between the light emitting device and the first edge 23.

Regarding the bottom length of the recess 315, a length D3 in the X-axis direction may be different from a length D4 in the Y-axis direction. For example, the length D3 in the X-axis direction may be greater than the length D4 in the Y-axis direction. The bottom length of the recess 315 may satisfy a condition of D3>D4, and a difference therebetween may be in a range of 1.5 mm to 5 mm, for example, 1.5 mm to 5 mm. The width D3 may be equal to or less than twice the width D4. A bottom length ratio D4:D3 of the recess 315 may have a difference in a range of 1:1.3 to 1:1.8. When the difference between the length D4 in the Y-axis direction and the length D3 in the X-axis direction is smaller than the above range, the luminance improvement in the Y-axis direction may be slight. When the difference between the length D4 in the Y-axis direction and the length D3 in the X-axis direction is greater than the above range, the luminance distribution in the X-axis direction may be relatively reduced. Also, when the width difference between the bottom lengths D3 and D4 of the recess 315 is increased, the light emitted from the light source, for example, the light emitting device, may induce the improvement in the light extraction efficiency in a direction in which the recess width is wide, for example, in the X-axis direction.

When the ratio D2/D1 of the bottom surface 310 or the first light exit surface 330 is a and the ratio D3/D4 of the recess 315 is b, the optical lens 300 according to the embodiment may have a relationship of a<b. The length ratio D2/D1 may be a ratio of a long length to a short length, and the length ratio D3/D4 may be a ratio of a long length to a short length. The ratio D3/D4 of the recess 315 b may be 125% or more of a, for example, in a range of 125% to 160%. In the asymmetrical optical lens, the area of the light incidence surface 310 of the recess 315 is wider than that of the symmetrical lens, thereby diffusing light in a wider range. Accordingly, due to the length difference in the outer shape, the optical lens 300 may secure a luminance distribution in the Y-axis direction, and the luminance distribution may be widely spread in the X-axis direction and toward the edge region by the recess 315. Therefore, the number of bars of the light emitting module on which the optical lens 300 is provided may be reduced to two or less, for example, one, and luminance distributions of upper/lower corners in a backlight unit may be improved.

The second light exit surface 335 of the optical lens 300 may be provided at a higher position than the first straight line X0 and the second straight line Y0 parallel to the bottom of the recess 315. The second light exit surface 335 may be a flat surface or an inclined surface and may be defined as a flange, but is not limited thereto. The second light exit surface 335 may be provided to be perpendicular or inclined with respect to the first straight line X0 and the second straight line Y0. The second light exit surface 335 may extend to be perpendicular or inclined from the outer line of the first light exit surface 330. The second light exit surface 335 may include a third edge 35 adjacent to the first light exit surface 330, and the third edge 35 may be provided at the same position as the outer line of the first light exit surface 330 or may be provided to be more inner or outer than the first light exit surface 330.

A straight line connecting the third edge 35 of the second light exit surface 335 and the central axis Z0 may be provided at an angle of 70±2 or less from the central axis Z0 with respect to the bottom center P0 of the recess 315. The third edge 35 of the second light exit surface 335 may be provided at an angle of 20 degrees or less, for example, an angle of 16±2 degrees, with respect to the first straight line X0 and the second straight line Y0 with respect to the bottom center P0 of the recess 315. The angle between the second edge 25 and the third edge 35 of the second light exit surface 335 with respect to the bottom center P0 of the recess 315 may be 16 degrees or less, for example, 13±2 degrees. The angle of the straight line passing through the third edge 35 of the second light exit surface 335 is an external angle of the optical lens 300. The second light exit surface 335 may refract and radiate light incident on a region spaced apart from the first straight line X0 and the second straight line Y0. The light refracted by the second light exit surface 335 may be radiated at an angle smaller than an angle before refraction with respect to the central axis Z0. Accordingly, the second light exit surface 335 may radiate the refracted light in a direction lower than the parallel straight line, and thus, the light may be reflected by a reflection sheet of a light unit.

The angle θ1 between the straight line passing through the central axis Z0 and the second edge 25 of the bottom surface 310 and the first straight line X0 or the second straight line Y0 may be 5 degrees or less, for example, in a range of 0.4 degrees to 4 degrees. The angle θ1 may be changed according to the distance to the central axis Z0 and the height of the second edge 25. When the angle θ1 deviates from this range, the thickness of the optical lens may be changed and light loss may be increased. The second light exit surface 335 refracts light beams, which deviate from a half power angle, from the central axis Z0 with respect to the bottom center P0 of the recess 315, thereby reducing light loss.

The lengths D1 and D2 of the optical lens 300 may be greater than the thickness D5 of the optical lens 300. The lengths D1 and D2 of the optical lens 300 may be equal to or greater than 2.5 times the thickness D5 of the optical lens 300, for example, equal to or greater than 3 times the thickness D5 of the optical lens 300. The first length D1 may be 15 mm or more, for example, in a range of 16 mm to 25 mm, and the second length D2 may be 17 mm or more, for example, in a range of 17 mm to 30 mm. The thickness D5 of the optical lens 300 may be 6.5 mm or more, for example, in a range of 6.5 mm to 9 mm. Since the different lengths D1 and D2 of the optical lens 300 are greater than the thickness D5, it is possible to provide a uniform luminance distribution to an entire region of a lighting apparatus or a light unit. Also, since a region covered in the light unit is improved, the number of optical lenses may be reduced and the thickness of the optical lens 300 may be reduced.

When a ratio of D5/D1 is c and a ratio of D5/D2 is d, c and d may be 0.3 or more and may have a relationship of c>d. Since the lengths D1 and D2 of the optical lens 300 are greater than the thickness D5 and the optical lens 300 has a relationship of D2>D1 and D3>D4, it is possible to provide a uniform luminance distribution to an entire region of a lighting apparatus or a light unit. Also, since a region covered in the light unit is improved, the number of optical lenses may be reduced and the thickness of the optical lens 300 may be reduced.

The depth D8 of the recess 315 has an interval from the bottom center P0 to the first vertex 21. The first vertex 21 may be a vertex of the light incidence surface 320 or an upper end point of the recess 315. The depth D8 of the recess 315 may be 4 mm or more, for example, in a range of 4 mm to 5.2 mm, and the thickness D5 of the optical lens 300 may be 0.6 mm or more, for example, 0.6 mm to 0.7 mm. The depth D8 of the recess 315 may be equal to or greater than 60% of the distance between the second vertex 31 of the first light exit surface 330 and the bottom center P0 or the first edge 23. When a ratio of D3/D8 is e and a ratio of D4/D8 is f, the recess 315 may have a relationship of e>f. Since the depth D8 of the recess 315 is deep, light may be diffused to a region adjacent to the first vertex 21 of the light incidence surface 320 in a lateral direction even though the center region of the first light exit surface 330 does not have a total reflection surface or a negative curvature. Since the recess 315 has a deep depth D8, the light incidence surface 320 may refract light incident from a region close to the second vertex 31 to a peripheral region of the first vertex 21 in a lateral direction.

A minimum distance D9 between the recess 315 and the first light exit surface 330 may be an interval between the first vertex 21 of the light incidence surface 320 and the second vertex 31 of the first light exit surface 330. The distance D9 may be 3 mm or less, for example, in a range of 2 mm to 3 mm. When the distance D9 between the first vertex 21 of the light incidence surface 320 and the second vertex 31 of the first light exit surface 330 is greater than 3 mm, a difference between an amount of light traveling toward the center region of the first light exit surface 330 and an amount of light traveling toward the side region of the first light exit surface 330 may be increased and a light distribution may not be uniform. When the distance D9 between the first vertex 21 of the light incidence surface 320 and the second vertex 31 of the first light exit surface 330 is less than 2 mm, the stiffness on the center of the optical lens 300 is weakened. By disposing the distance D9 between the recess 315 and the first light exit surface 330 in the above range, an optical path may be diffused in an outward direction even though the center region of the second light exit surface 335 does not have a total reflection surface or a negative curvature.

As the first vertex 21 of the light incidence surface 320 is closer to the convex second vertex 31 of the first light exit surface 330, it is possible to increase an amount of light traveling in a lateral direction of the first light exit surface 330 through the light incidence surface 320. Accordingly, it is possible to increase an amount of light diffusing in a lateral direction of the optical lens 300, for example, in the Y-axis direction. The first vertex 21 of the light incidence surface 320 may be provided to be more adjacent to the second vertex 31, which is the center of the first light exit surface 330, than the straight line extending in parallel from the third edge 35 of the second light exit surface 335.

A width D7 of the second light exit surface 335 may be a straight distance between the second edge 25 and the third edge 35 and may be less than the depth D8 (>D7) of the recess 315. The width D7 of the second light exit surface 335 may be in a range of, for example, 1.5 mm to 2.3 mm. When the width D7 of the second light exit surface 335 exceeds the above range, an amount of light emitted to the second light exit surface 335 may be increased, and thus, light distribution control may be difficult. When the width D7 of the second light exit surface 335 is smaller than the above range, it may be difficult to secure a gate region when the lens body is manufactured.

In the optical lens 300, the second light exit surface 335 may be provided around a lower circumference of the first light exit surface 330, and the bottom surface 310 may be provided to be lower than the second edge 25 of the second light exit surface 335. The bottom surface 310 may protrude more downward than the horizontal line of the second edge 25 of the second light exit surface 335. As another example of the optical lens 300, the second light exit surface 335 may have an uneven surface. The uneven surface may be a rough haze surface. The uneven surface may be a surface on which scattered particles are formed. As another example of the optical lens 300, the bottom surface 310 may have an uneven surface. The uneven surface of the bottom surface 310 may be a rough haze surface or a surface on which scattered particles are formed.

As illustrated in FIG. 13, the optical lenses 300 according to the embodiment may be provided on the circuit board 400 in the Y-axis direction by certain intervals. These optical lenses 300 are provided in the Y-axis direction where the length (D2>D1) and the length (D4<D3) of the recess 315 are wide. Thus, the number of optical lenses 300 may be reduced while widening the interval between the optical lenses 300. Also, due to the asymmetrical structure of the recess 315, the luminance distribution in the X-axis direction may be improved.

Figure 46:
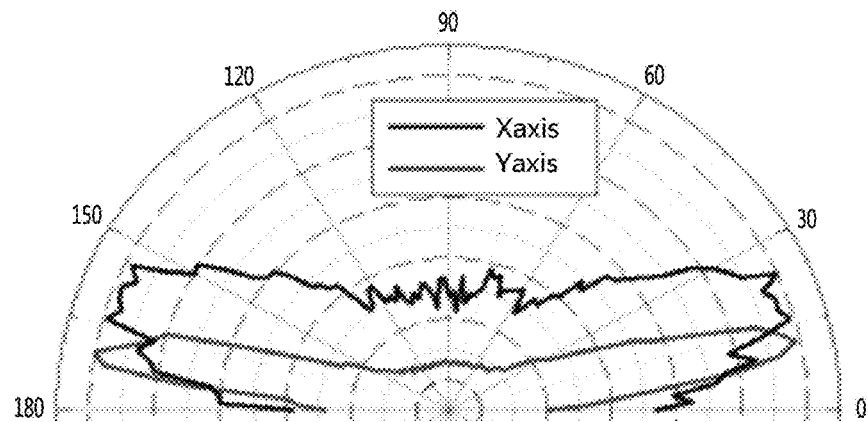
FIG. 46 is a view illustrating radiation patterns of the optical lenses of FIG. 7 and FIG. 8.

In such an optical lens 300, the orientation angle distribution in the Y-axis direction may be greater than the orientation angle distribution in the X-axis direction, as illustrated in FIGS. 46 and 77. For example, the orientation angle distribution in the Y-axis direction may be greater than the orientation angle distribution in the X-axis direction by 10 degree or more, for example, 10 degree to 25 degrees. Also, a half width at half maximum (FWHM) of the orientation angle distribution in the Y-axis direction may be 10 degrees or more, and a central strength may be 4% or more.

Figure 10:
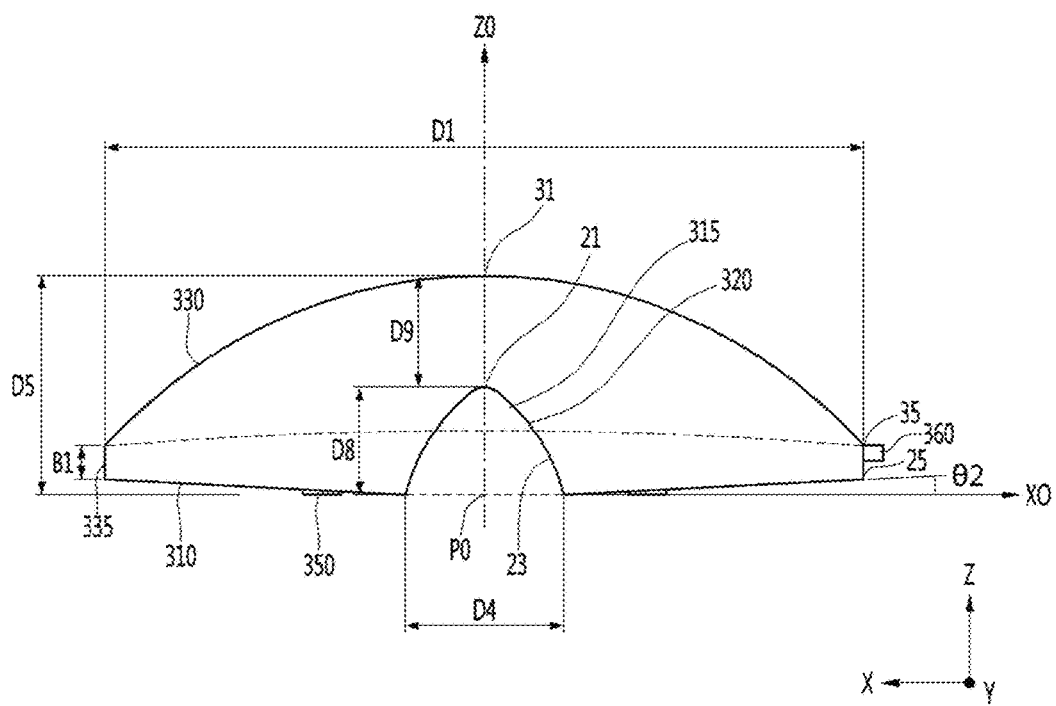
FIG. 10 is a sectional view of an optical lens, taken along line B-B of FIG. 1, according to another embodiment.

Referring to FIGS. 9 to 10, the optical lens according to a third embodiment includes a bottom surface 310, a recess 315 which is convex upwardly from the bottom surface 310 in a center region of the bottom surface 310, a first light exit surface 330 provided on a side opposite to the bottom surface 310 and the recess 315, and a second light exit surface 335 provided below the first light exit surface 330. The optical lens according to the third embodiment differs from the optical lens according to the first embodiment in terms of the first and second lengths D1 and D2, the lengths D3 and D4 of the recess 315, and the depth of the recess 315. Also, in the optical lens according to the third embodiment, the widths B1 and B2 of the second light exit surface 335 are different according to a region.

A bottom view shape of the bottom surface 310 of the optical lens may include an oval shape. Regarding the length of the bottom surface 310 or the first light exit surface 330, the first length D1 in the X-axis direction may be different from the second length D2 in the Y-axis direction. The first length D1 may be a length of the optical lens 300 in the X-axis direction, and the second length D2 may be a length of the optical lens 300 in the Y-axis direction. The first length D1 may be shorter than the second length D2, and a difference between the first length D1 and the second length D2 may be 0.5 mm or more, for example, 0.5 mm to 3 mm. The length may satisfy a condition of D2>D1, and a length ratio D1:D2 may be in a range of 1:1.06 to 1:1.1. In the optical lens 300 according to the embodiment, since the first length D1 is shorter than the second length D2, the luminance distribution in the X-axis direction may not be reduced.

The bottom shape of the recess 315 may include an oval shape. A side sectional shape of the recess 315 may include a bell shape, a shell shape, or an oval shape. The recess 315 may have a shape in which a width becomes narrower upward. The recess 315 may have a shape which gradually converges from the first edge 23 of the bottom circumference toward a first vertex 21 of an upper end. When the bottom view of the recess 315 is an oval shape, a diameter thereof may be gradually reduced toward the first vertex 21. The recess 315 may have an axially symmetrical shape with respect to the central axis Z0. The first vertex 21 of the light incidence surface 320 may have a dot shape.

Bottom lengths D3 and D4 of the recess 315 may have a width where a light source, that is, a light emitting device described later, can be inserted. The bottom lengths D3 and D4 of the recess 315 may be equal to or less than three times the width of the light emitting device, for example, equal to or less than 2.5 times the width of the light emitting device. The bottom lengths D3 and D4 of the recess 315 may be in a range of 1.2 to 2.5 times the width of the light emitting device. When the bottom lengths D3 and D4 of the recess 315 are less than this range, the insertion of the light emitting device is not easy. When the bottom lengths D3 and D4 of the recess 315 are greater than this range, it is possible to reduce light loss or light interference through a region between the light emitting device and the first edge 23.

Regarding the bottom length of the recess 315, a length D3 in the X-axis direction may be different from a length D4 in the Y-axis direction. For example, the length D3 in the X-axis direction may be greater than the length D4 in the Y-axis direction. The bottom length of the recess 315 may have a relationship of D3>D4, and a difference therebetween may be in a range of 1.5 mm to 5 mm, for example, 1.5 mm to 3 mm. The width D3 may be equal to or less than three times the width D4, for example, equal to or less than twice the width D4. A bottom length ratio D4:D3 of the recess 315 may have a difference in a range of 1:1.5 to 1:3. Since the bottom length D3 of the recess 315 in the X-axis direction is greater than the length D3 in the Y-axis direction, the optical lens may have an asymmetrical lens shape. Even when the width difference between the bottom lengths D3 and D4 of the recess 315 is not great, the light emitted from the light source, for example, the light emitting device, may induce the improvement in the light extraction efficiency in a direction in which the recess width is wide, for example, in the Y-axis direction.

In the optical lens according to the embodiment, the first length D1 in the X-axis direction may be shorter than the second length D2 in the Y-axis direction, and the bottom length D3 of the recess 315 in the X-axis direction may be greater than the bottom length D4 thereof in the Y-axis direction. Accordingly, due to the length difference in the outer shape, the optical lens 300 may secure a luminance distribution in the Y-axis direction, and the luminance distribution may be widely spread in the X-axis direction and toward the edge region by the recess 315.

When the length ratio D2/D1 of the bottom surface 310 or the first light exit surface 330 is a and the length ratio D3/D4 of the recess 315 is b, the optical lens according to the embodiment may have a relationship of a<b. The ratio of D2/D1 may be a ratio of a long length to a short length of the first light exit surface 330, and the ratio of D3/D4 may be a ratio of a long length to a short length of the bottom of the recess 315. b may be 120% or more of a, for example, in a range of 120% to 145%, or 130% to 280%. b may be equal to or more than 1.2 times a, for example, in a range of 1.2 to 1.45 times a, or 1.3 to 2.8 times a. In the asymmetrical optical lens, the area of the light incidence surface 320 of the recess 315 is wider than that of the symmetrical lens, thereby diffusing light in a wider range. Accordingly, due to the length difference in the outer shape, the optical lens 300 may secure a luminance distribution in the Y-axis direction, and the luminance distribution may be widely spread in the X-axis direction and the radiation direction by the recess 315. Therefore, the number of bars of the light emitting module on which the optical lens 300 is provided may be reduced to two or less, for example, one, and luminance distributions of upper/lower corners in a backlight unit may be improved.

The second light exit surface 335 of the optical lens 300 may be provided at a higher position than the first straight line X0 and the second straight line Y0 parallel to the bottom of the recess 315. The second light exit surface 335 may be a flat surface or an inclined surface and may be defined as a flange, but is not limited thereto. The second light exit surface 335 may be provided to be perpendicular or inclined with respect to the first straight line X0 and the second straight line Y0. The second light exit surface 335 may extend to be perpendicular or inclined from the outer line of the first light exit surface 330. The second light exit surface 335 may include a third edge 35 adjacent to the first light exit surface 330, and the third edge 35 may be provided at the same position as the outer line of the first light exit surface 330 or may be provided to be more inner or outer than the first light exit surface 330.

A straight line connecting the third edge 35 of the second light exit surface 335 and the central axis Z0 may be provided at an angle of 74±2 or less from the central axis Z0 with respect to the bottom center P0 of the recess 315. The third edge 35 of the second light exit surface 335 may be provided at an angle of 20 degrees or less, for example, an angle of 16±2 degrees, with respect to the first straight line X0 and the second straight line Y0 with respect to the bottom center P0 of the recess 315. The angle between the second edge 25 and the third edge 35 of the second light exit surface 335 with respect to the bottom center P0 of the recess 315 may be 16 degrees or less, for example, 13±2 degrees. The angle of the straight line passing through the third edge 35 of the second light exit surface 335 is an external angle of the optical lens 300. The second light exit surface 335 may refract and radiate light incident on a region spaced apart from the first straight line X0 and the second straight line Y0. The light refracted by the second light exit surface 335 may be radiated at an angle smaller than an angle before refraction with respect to the central axis Z0. Accordingly, the second light exit surface 335 may suppress the refracted light from being radiated in a horizontal axis or a direction below the horizontal axis and may prevent interference on the adjacent optical member or light loss.

The angle θ1 or θ2 between the straight line passing through the central axis Z0 and the second edge 25 of the bottom surface 310 and the first straight line X0 or the second straight line Y0 may be 5 degrees or less, for example, in a range of 0.4 degrees to 4 degrees. The angles θ1 and θ2 with respect to the first straight line X0 or the second straight line Y0 may be equal to each other or may have a difference of 1 degree or less. The angles θ1 and θ2 may be changed according to the distance to the central axis Z0 and the height of the second edge 25. When the angles θ1 and θ2 deviate from this range, the thickness of the optical lens may be changed and light loss may be increased. The second light exit surface 335 refracts light beams, which deviate from a half power angle, from the central axis Z0 with respect to the bottom center P0 of the recess 315, thereby reducing light loss.

The lengths D1 and D2 of the optical lens 300 may be greater than the thickness D5 thereof. The lengths D1 and D2 of the optical lens 300 may be equal to or greater than 2.5 times the thickness D5 of the optical lens 300, for example, equal to or greater than 3 times the thickness D5 of the optical lens 300. The first length D1 of the optical lens 300 may be 15 mm or more, for example, in a range of 16 mm to 26 mm, and the second length D2 of the optical lens 300 may be 17 mm or more, for example, in a range of 17 mm to 30 mm. The thickness D5 of the optical lens 300 may be 6.5 mm or more, for example, in a range of 6.5 mm to 9 mm. Since the different lengths D1 and D2 of the optical lens 300 are greater than the thickness D5, it is possible to provide a uniform luminance distribution to an entire region of a lighting apparatus or a light unit. Also, since a region covered in the light unit is improved, the number of optical lenses may be reduced and the thickness of the optical lens 300 may be reduced.

The depth D8 of the recess 315 has an interval from the bottom center P0 to the first vertex 21. The first vertex 21 may be a vertex of the light incidence surface 320 or an upper end point of the recess 315. The depth D8 of the recess 315 may be 3 mm or more, for example, 4 mm or more, and may be 60% or more of the thickness D5 of the optical lens 300, for example, 63% or more of the thickness D5 of the optical lens 300. Even though the depth D8 of the recess 315 is not deeper than that in the first embodiment, light may be diffused to a region adjacent to the first vertex 21 of the light incidence surface 320 in a lateral direction if the center region of the first light exit surface 330 does not have a total reflection surface or a negative curvature. The recess 315 may have a low depth D8 and improve light extraction efficiency in the Y-axis direction due to a width difference of the recess 315.

A minimum distance D9 between the recess 315 and the first light exit surface 330 may be an interval between the first vertex 21 of the light incidence surface 320 and the second vertex 31 of the first light exit surface 330. The distance D9 may be less than 5 mm, for example, in a range of 1 mm to 3.5 mm. When the distance D9 between the first vertex 21 of the light incidence surface 320 and the second vertex 31 of the first light exit surface 330 is 5 mm or more, the light extraction efficiency may be reduced by the low depth of the recess 315. Due to the recess 315 having the above-described structure, the light diffusion may be more effectively performed in the Y-axis direction of the first light exit surface 330 than in the X-axis direction of the first light exit surface 330.

The first vertex 21 of the light incidence surface 320 may be provided to be more adjacent to the second vertex 31, which is the center of the first light exit surface 330, than the straight line extending in parallel from the third edge 35 of the second light exit surface 335. The widths B1 and B2 of the second light exit surface 335 are a straight distance between the second edge 25 and the third edge 35. Regarding the widths B1 and B2 of the second light exit surface 335, the width B2 of a region close to the second edge 25 in a direction of the first straight line X0 may be widest, and the width B1 of a region close to the second edge 25 in a direction of the second straight line Y0 may be narrowest. As it gets closer to the second edge 25 in the direction of the first straight line X0, the width B2 may be gradually wider, and as it gets closer to the second edge 25 in the direction of the second straight line Y0, the width B1 may be gradually narrower. The second light exit surface 335 may have a width relationship of B2>B1, and B2 may be greater than B1 by 0.1 mm or more.

Regarding the widths B1 and B2 of the second light exit surface 335, the maximum width B2 may be smaller than the depth D8 of the recess 315. The widths B1 and B2 of the second light exit surface 335 may be in a range of, for example, 1.5 mm to 2.3 mm. When the width B2 of the second light exit surface 335 exceeds the above range, an amount of light emitted to the second light exit surface 335 is increased, and thus, a light distribution control is difficult. The region having the width B2 on the second light exit surface 335 may be used as a gate region when a lens body is manufactured.

In the optical lens 300, the second light exit surface 335 may be provided around a lower circumference of the first light exit surface 330, and the bottom surface 310 may be provided to be lower than the second edge 25 of the second light exit surface 335. The bottom surface 310 may protrude more downward than the horizontal line of the second edge 25 of the second light exit surface 335. As another example of the optical lens 300, the second light exit surface 335 may have an uneven surface. The uneven surface may be a rough haze surface. The uneven surface may be a surface on which scattered particles are formed. As another example of the optical lens 300, the bottom surface 310 may have an uneven surface. The uneven surface of the bottom surface 310 may be a rough haze surface or a surface on which scattered particles are formed.

As illustrated in FIG. 13, the optical lenses according to the embodiment may be provided on the circuit board 400 in the X-axis direction by certain intervals. Due to the length relationship (D4<D3) of the recess 315, the length of the light incidence surface of the optical lens in the X-axis direction may be increased. The number of optical lenses 300 may be reduced while widening the interval between the optical lenses 300. Also, due to the asymmetrical structure of the recess 315, the luminance distribution in the Y-axis direction may be improved. The circuit board 400 may have a long length in the X-axis direction.

Figure 11:
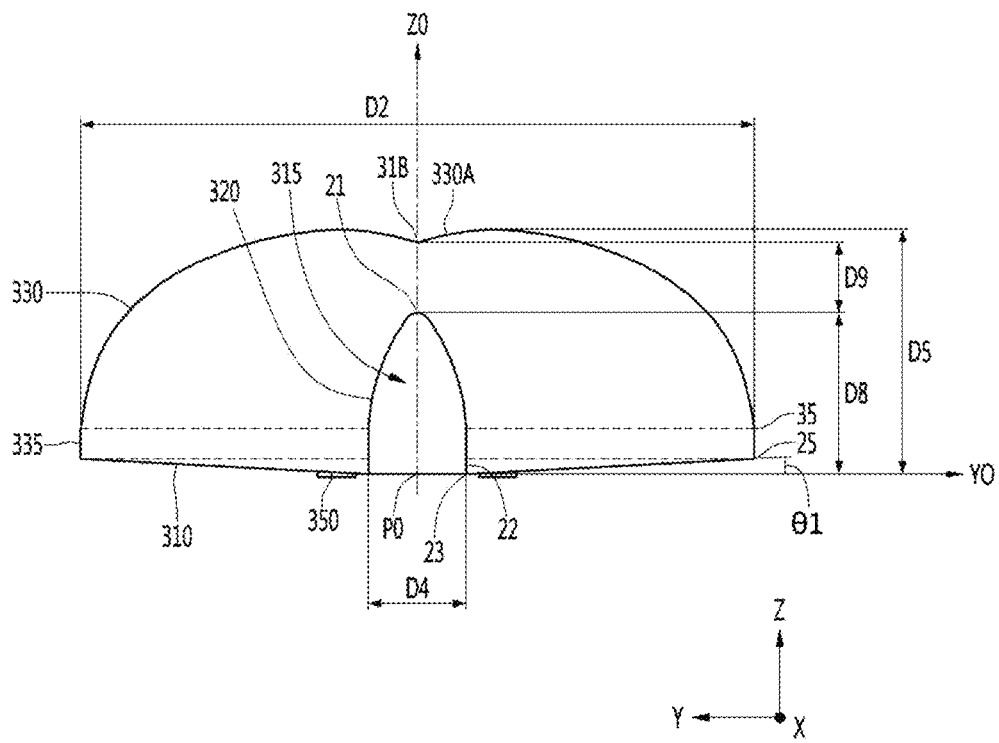
FIG. 11 is a modification of the optical lens of FIG. 5.
Figure 12:
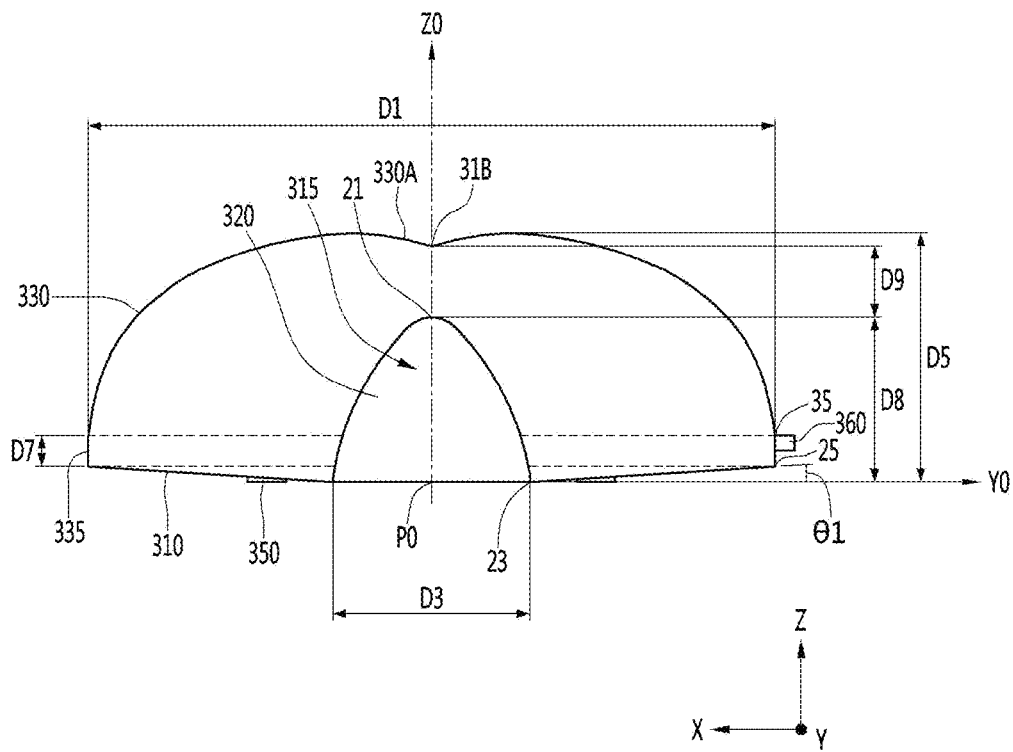
FIG. 12 is a modification of the optical lens of FIG. 6.

FIGS. 11 and 12 are views illustrating an optical lens according to a fourth embodiment. FIGS. 11 and 12 are respectively sectional views of modifications of the second embodiment in the first axis direction and the second axis direction. In describing the fourth embodiment, same parts as those described above may be understood by referring to the above descriptions. Referring to FIGS. 11 to 12, the optical lens 300 may include a bottom surface 310, a recess 315 which is concave upwardly from the bottom surface 310 in a center region of the bottom surface 310, a light incidence surface 320 provided around the recess 315, a first light exit surface 330 provided on a side opposite to the bottom surface 310 and the recess 315, and a second light exit surface 335 provided below the first light exit surface 330.

The optical lens may have a concave portion 330A which is concave in the center region of the first light exit surface 330, and the concave portion 330A may be gradually deeper toward the center thereof. The concave portion 330A may be provided as a total reflection surface configured to reflect incident light in a lateral direction. In the concave portion 330A, a point corresponding to a vertex 21 of the recess 315 may be a lowest point 31B. The concave portion 330A may include a concavely curved surface or a curved surface having different curvatures.

In the optical lenses illustrated in FIGS. 11 and 12, a length D1 in a first axis direction, a length D2 in a second axis direction, a thickness D5, lengths D3 and D4 of the recess 315 in the first and second axis directions, a depth D8 of the recess 315, and a distance D9 between the recess 315 and the point 31B may be selected from the above-described embodiments. The length ratios D2/D1 and D3/D4 may be selected from the values provided above and may have a relationship of D2/D1<D3/D4.

Referring to FIGS. 13 to 15, a light emitting module 400A may include a plurality of optical lenses 300 provided on a circuit board 400, and at least one light emitting device 100 may be provided in the optical lens 300. One or more light emitting devices 100 may be provided on the circuit board 400 by certain intervals. The light emitting device 100 is provided between the optical lens 300 and the circuit board 400. The light emitting device 100 is driven by power supplied from the circuit board 400 and emits light. The circuit board 400 may include a circuit layer electrically connected to the light emitting device 100. The circuit board 400 may include at least one of a PCB made of a resin material, a metal core PCB (MCPCB), and a flexible PCB (FPCB), but is not limited thereto.

The optical lens 300 may receive light emitted from the light emitting device 100 and incident on the light incidence surface 320 and emits light through the first and second light exit surfaces 330 and 335. A part of the light incident from the light incidence surface 320 may pass through a certain path, be reflected by the bottom surface 310, and be emitted to the first light exit surface 330 or the second light exit surface 335.

An orientation angle of the light emitting device 100 may be a unique orientation angle of the light emitting device 100, and light may be emitted at 130 degrees or more, for example, 136 degrees or more. The light emitting device 100 may emit light through a top surface and a plurality of side surfaces. That is, the light emitting device 100 may have at least five light exit surfaces. The light emitted from the light emitting device 100 may be radiated at an orientation angle spread through the first and second light exit surfaces 330 and 335.

In the optical lens 300, the light incidence surface 320 may be provided outside the top surface and the side surfaces of the light emitting device 100. A lower region 22 of the light incidence surface 320 of the optical lens 300 may be provided to face the plurality of side surfaces of the light emitting device 100. Accordingly, the light emitted through each side surface of the light emitting device 100 may be incident on the light incidence surface 320 without leakage.

Since the light emitting device 100 has at least five light emission surfaces, the orientation angle distribution of the light emitting device 100 may be widened by the light emitted through the side surfaces. Since the orientation angle distribution of the light emitting device 100 is widely provided, the light diffusion using the optical lens 300 may be more facilitated. The orientation angle distribution from the optical lens 300 may be greater than an angle formed by two straight lines passing through the third edge 35 of the second light exit surface 335 of the optical lens 300 from the central axis P0. The orientation angle distribution from the optical lens 300 includes an orientation distribution of light emitted through the second light exit surface 335. Thus, due to the distribution of light emitted from the second light exit surface 335, light loss may be reduced and a luminance distribution may be improved.

In the size (C0≤C1) of the light emitting device 100, the lengths in the first axis (X) direction and the second axis (Y) direction may be equal to or different from each other. For example, as illustrated in FIGS. 14 and 15, the light emitting device 100 may be provided in the recess 315. As another example, the light emitting device 100 may be provided below the recess 315, but is not limited thereto. Since the light emitting device 100 emits light through the plurality of side surfaces in the recess 315, light may be incident on the entire light incidence surface 320, thereby improving light incidence efficiency.

The bottom surface 310 of the optical lens 300 may provide an inclined surface with respect to the top surface of the circuit board 400. The bottom surface 310 of the optical lens 300 may be provided as an inclined surface with respect to the X and Y axes. 80% or more of the bottom surface 310, for example, 100% of the bottom surface 310, may be inclined with respect to the top surface of the circuit board 400. The bottom surface 310 may include a total reflection surface. The top surface of the circuit board 400 may be provided to be more adjacent to the first edge 23 than the second edge 25 of the bottom surface 310 of the optical lens 300. The first edge 23 of the bottom surface 310 may contact the top surface of the circuit board 400, and the second edge 25 may be spaced apart from the top surface of the circuit board 400 by a maximum interval. The first edge 23 may be provided at a lower position than an active layer in the light emitting device 100, thereby preventing light loss.

The first and second light exit surfaces 330 and 335 of the optical lens 300 refract and emit incident light. The entire first light exit surface 330 may have a curved surface through which light is emitted. The first light exit surface 330 may include a curved shape which continuously connected from the second vertex 31. The first light exit surface 330 may reflect or refract incident light and exit the light to the outside. In the first light exit surface 330, an emission angle of light emitted to the first light exit surface 330 may be greater after refraction than an incidence angle before refraction with respect to the central axis Z0.

The second light exit surface 335 refracts light such that an angle of the light after refraction is smaller than an angle of incident light before refraction with respect to the central axis Z0. Accordingly, a long optical interference distance between the adjacent optical lenses 300 may be provided, and a part of light emitted through the second light exit surface 335 and light emitted to the first light exit surface 330 may be mixed in the vicinity of the optical lens 300.

The second light exit surface 335 may be provided around a lower circumference of the first light exit surface 330 to refract and emit incident light. The second light exit surface 335 includes an inclined surface or a flat surface. The second light exit surface 335 may be a surface perpendicular or inclined with respect to the top surface of the circuit board 400. When the second light exit surface 335 is an inclined surface, separation is facilitated at the time of injection molding. The second light exit surface 335 may receive, refract, and extract a part of light emitted to the side surface of the light emitting device 100. In this case, the second light exit surface 335 refracts light such that an exit angle of the emitted light is smaller than an incidence angle before refraction with respect to the central axis Z0. Accordingly, a long optical interference distance between the adjacent optical lenses 300 may be provided.

The optical lens 300 according to the embodiment may have a structure in which the length D3 of the bottom of the recess 315 in the X-axis direction is longer than the length D4 thereof in the Y-axis direction, and may be provided on the circuit board 400 in the X-axis direction. Accordingly, light emitted from the light emitting device 100 to the recess 315 may be diffused in the X-axis direction within the recess 315 and then spread in the Y-axis direction and toward the edge region. According to the embodiment, the recess 315 having an asymmetrical structure makes it possible to further diffuse light in a certain axis direction (for example, a diagonal direction), thereby reducing the number of bars of the light emitting module.

One or more support protrusions 350 provided below the optical lens 300 may protrude downward from the bottom surface 310, that is, in a direction of the circuit board 400. The support protrusions 350 may be fixed on a plurality of circuit boards 400 to prevent the optical lens 300 from being tilted. A lateral protrusion 360 of the optical lens 300 may protrude from the surface of the second light exit surface 335 in the X-axis direction. As another example, the lateral protrusion 360 of the optical lens 300 may protrude from the surface of the X-axis direction.

Figure 16:
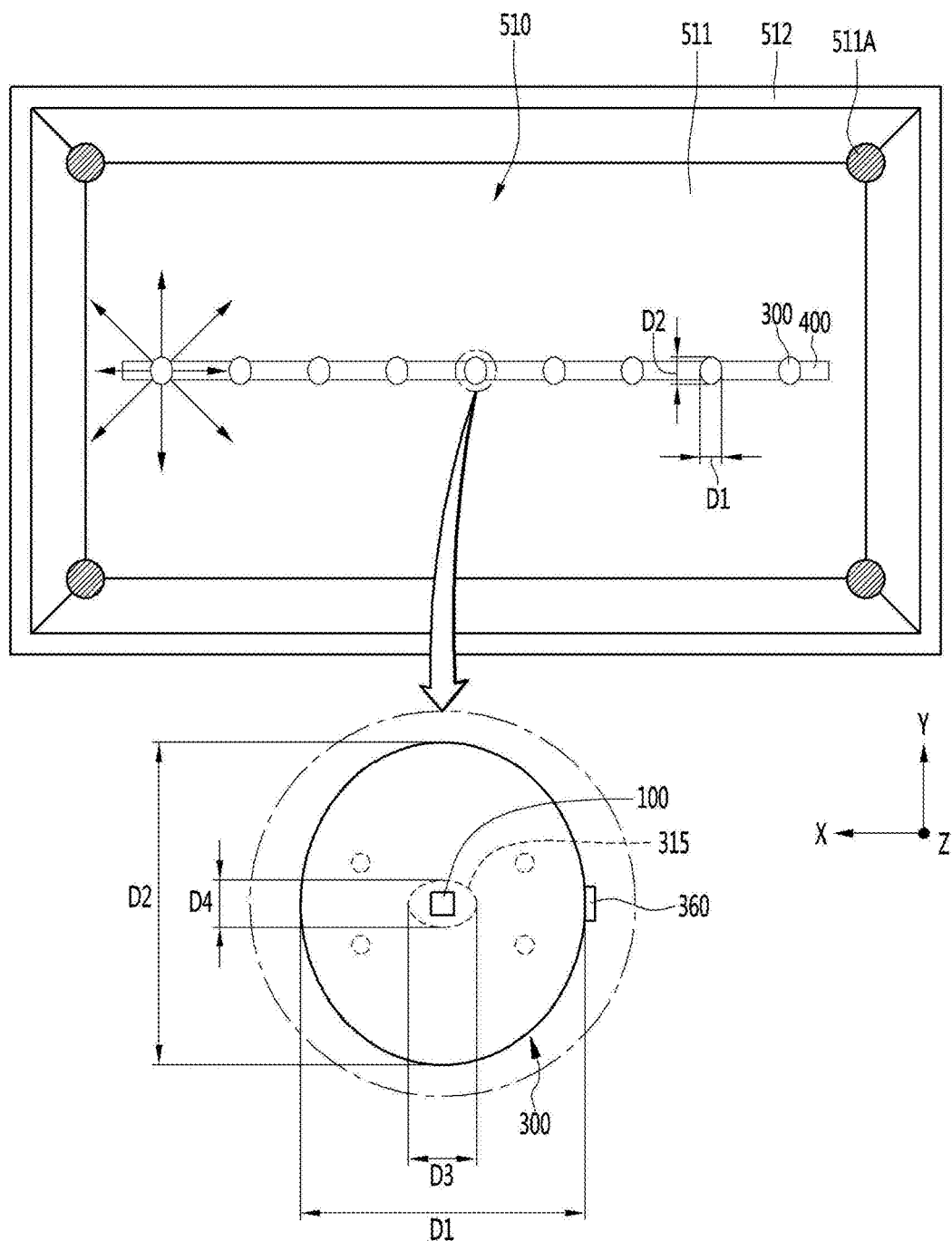
FIG. 16 is a plan view of a light unit including the light emitting module of FIG. 13.

Referring to FIG. 16, a light unit may include a bottom cover 510, a plurality of circuit boards 400 provided in the bottom cover 510 as a light emitting module 400A, a light emitting device 100, and optical lenses 300 provided on the plurality of circuit boards 400. The plurality of circuit boards 400 may be provided on a bottom 511 of the bottom cover 510. A side cover 512 of the bottom cover 510 may reflect light emitted from the light emitting module 400A, or may reflect light toward a display panel. In the light emitting module 400A, two or less circuit boards 400, for example, one circuit board 400, may be provided in the bottom cover 510. The circuit board 400 may include a circuit layer electrically connected to the light emitting device 100.

The bottom cover 510 may include a metal or a thermally conductive resin material for heat dissipation. The bottom cover 510 may include an accommodation portion, and a side cover may be provided around the accommodation portion. A reflection sheet may be provided on the circuit board 400. The reflection sheet may be made of, for example, PET, PC, PVC resin, or the like, but is not limited thereto. An optical sheet may be provided on the bottom cover 510. The optical sheet may include at least one of prism sheets configured to collect dispersed light, a brightness enhancement sheet, and a diffusion sheet configured to diffuse light again. A light guide layer made of a transparent material may be provided in a region between the optical sheet and the light emitting module.

The bottom cover 510 may be provided such that the size of the bottom 511 is longer in the X-axis direction than in the Y-axis direction, the optical lens 300 has a length (D2>D1), and the recess 315 has a bottom length (D3>D4). Thus, light may be effectively radiated toward a corner region 511A of the bottom 511 and in a corner direction. Due to the 1-bar light emitting module, it is possible to reduce the generation of dark spots in the corner region 511A of the bottom 511.

As illustrated in FIGS. 13 and 16, when a length ratio D2/D1 of the bottom surface 310 or the first light exit surface 330 is a and a length ratio D3/D4 of the recess 315 is b, each optical lens 300 provided on the circuit board 400 in the X-axis direction may have a relationship of a<b. A ratio of D2/D1 may be a ratio of a long length to a short length of the first light exit surface 330, and a ratio of D3/D4 may be a ratio of a long length to a short length of the bottom of the recess 315. b may be 110% or more of a, for example, in a range of 110% to 140%, or 120% to 160%. b may be equal to or more than 1.1 times a, for example, in a range of 1.1 to 1.4 times a, or 1.2 to 1.6 times a. A difference between the length in the first axis direction and the length in the second axis direction on the bottom of the recess 315 may be equal to or different from a difference between the length in the first axis direction and the length in the second axis direction of the bottom surface 310 or the first light exit surface 330. D1 is a maximum length of the optical lens 300 in the first axis direction, and D2 may be a maximum length of the optical lens 300 in the second axis direction.

In the light emitting module, the optical lenses have an asymmetrical shape, and the area of the light incidence surface 320 of the recess 315 is wider than that of a lens having a symmetrical shape, thereby diffusing incident light in a wide range in the Y-axis direction. Accordingly, due to the length difference in the outer shape, the optical lens 300 may secure a luminance distribution in the Y-axis direction, and the luminance distribution may be widely spread in the X-axis direction and toward the edge region by the recess 315. Therefore, the number of bars of the light emitting module on which the optical lens 300 is provided may be reduced to two or less, for example, one, and luminance distributions of upper/lower corners in a backlight unit may be improved. A reflection plate may be provided on the bottom 511 of the bottom cover 510, but embodiments are not limited thereto. A reflection layer may be further provided on the side surface of the bottom 511, but embodiments are not limited thereto.

A phosphor film may be provided on the surface of the light emitting device 100. The phosphor film may include at least one of a blue phosphor, a cyan phosphor, a green phosphor, a yellow phosphor, and a red phosphor and may be provided with a single layer or a multi-layer. In the phosphor film, a phosphor is added to a light-transmitting resin material. The light-transmitting resin material may include a material such as silicon or epoxy, and the phosphor may be made of YAG, TAG, silicate, nitride, or oxynitride-based material. The phosphor film may include a phosphor such as a quantum dot. The quantum dot may include a group II-V1 compound semiconductor or a group III-V compound semiconductor and may include at least one of blue, green, yellow, and red phosphors. The quantum dot is a nanoscale particle which may have optical characteristics generated from quantum confinement. Specific composition (s), structure, and/or size of the quantum dot may be selected so that light having a desired wavelength is emitted from the quantum dot at the time of stimulation using a specific excitation source. By changing the size of the quantum dot, light may be emitted over an entire visible spectrum. The quantum dot may include at least one semiconductor material. Examples of the semiconductor material may include a group IV element, a group II-VI compound, a group II-V compound, a group III-VI compound, a group III-V compound, a group IV-VI compound, a group I-III-VI compound, a group II-IV-VI compound, a group II-IV-V compound, an alloy thereof, and/or 3-membered and 4-membered mixtures or alloys thereof, and mixtures thereof. Examples of the quantum dot may be ZnS, ZnSe, ZnTe, CdS, CdSe, CdTe, GaN, GaP, GaAs, GaSb, InP, InAs, InSb, AlS, AlP, AlAs, PbS, PbSe, Ge, Si, CuInS2, CuInSe$_2$, MgS, MgSe, MgTe, and combinations thereof.

Figure 17:
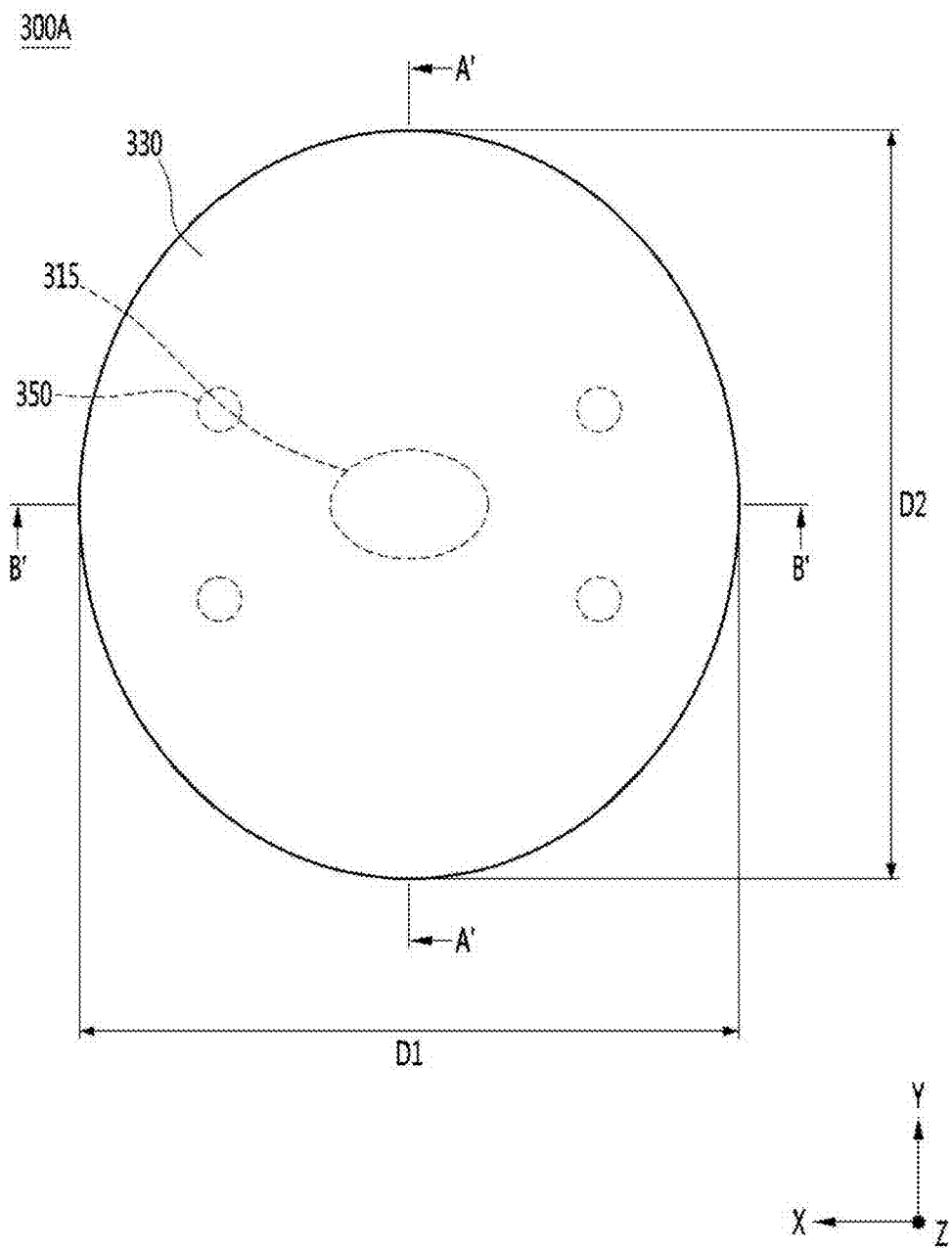
FIG. 17 is a plan sectional view of an optical lens according to another embodiment.
Figure 18:
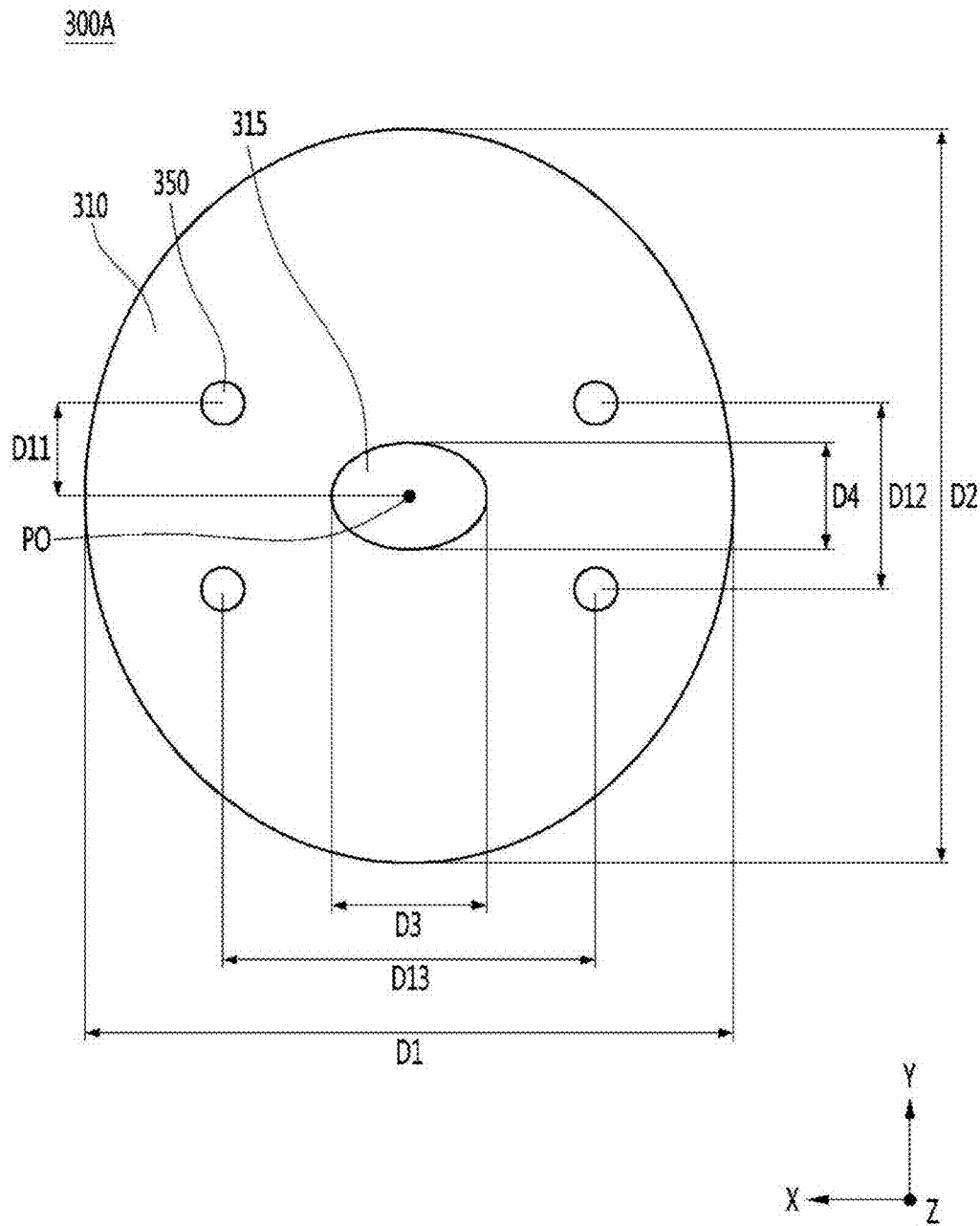
FIG. 18 is a bottom view of the optical lens of FIG. 17.
Figure 19:
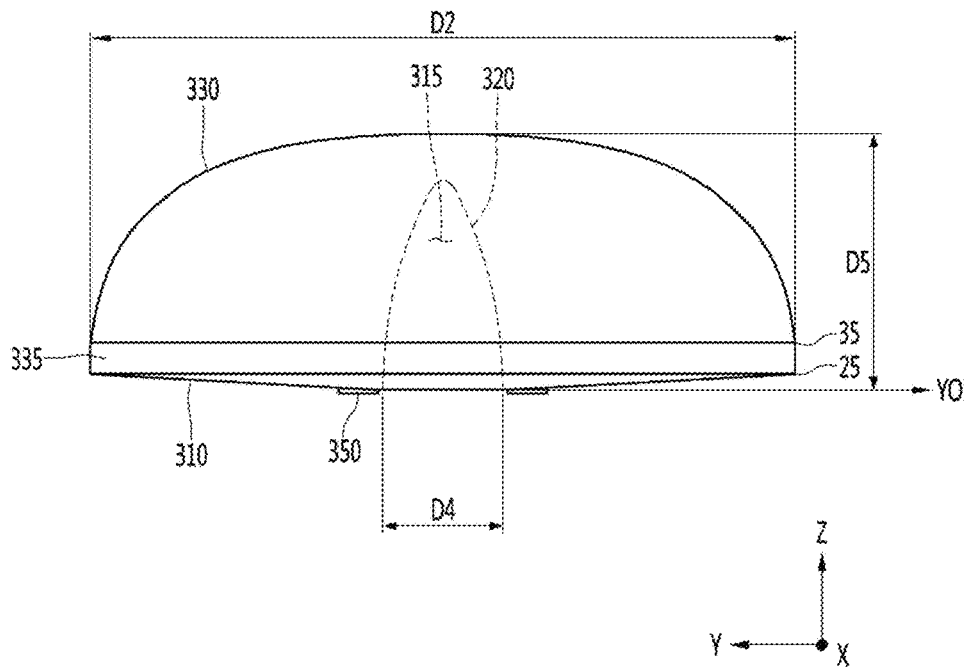
FIG. 19 is a first side view of the optical lens of FIG. 17.
Figure 20:
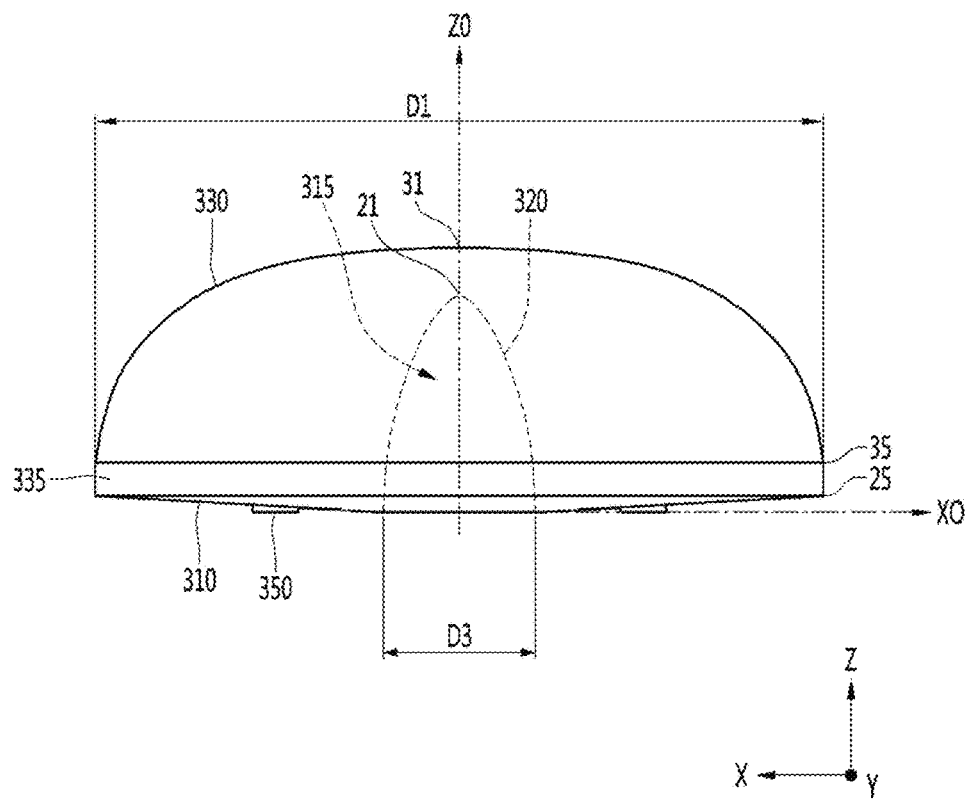
FIG. 20 is a second side view of the optical lens of FIG. 17.
Figure 21:
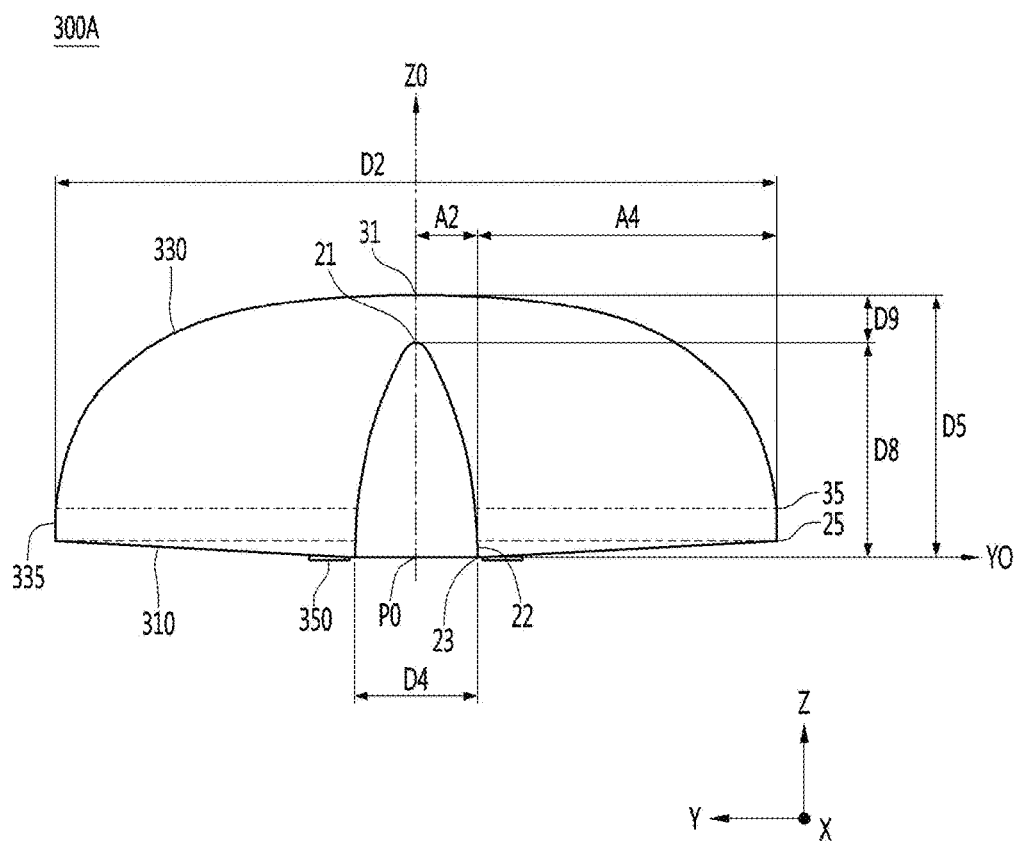
FIG. 21 is a sectional view of the optical lens, taken along line A'-A' of FIG. 17.
Figure 22:
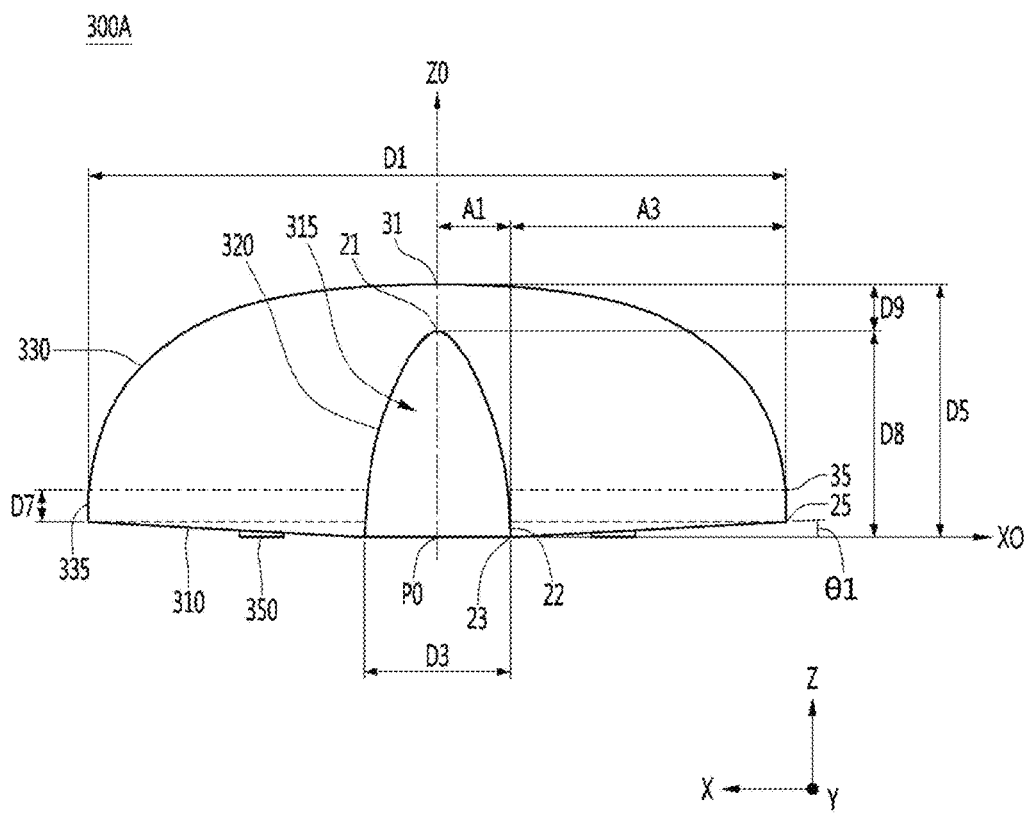
FIG. 22 is a sectional view of the optical lens, taken along line B'-B' of FIG. 17.

FIG. 17 is a plan sectional view of an optical lens according to a fourth embodiment, FIG. 18 is a bottom view of the optical lens of FIG. 17, FIG. 19 is a first side view of the optical lens of FIG. 17, FIG. 20 is a second side view of the optical lens of FIG. 17, FIG. 21 is a sectional view of the optical lens, taken along line A'-A' of FIG. 17, and FIG. 22 is a sectional view of the optical lens, taken along line B'-B' of FIG. 17. The following description may focus on a difference between the optical lens according to the fourth embodiment and the optical lenses according to the above embodiments. Same parts as those described above may be understood by referring to the above descriptions and may be selectively applied to the present embodiment. Referring to FIGS. 17 to 22, an optical lens 300A may include a bottom surface 310, a recess 315 which is convex upwardly from the bottom surface 310 in a center region of the bottom surface 310, a light incidence surface 320 provided around the recess 315, a first light exit surface 330 provided on a side opposite to the bottom surface 310 and the light incidence surface 320, and a second light exit surface 335 provided below the first light exit surface 330.

In the optical lens 300A, a Z-axis direction perpendicular to the bottom center P0 of the recess 315 may be defined as a central axis Z0 or an optical axis. Two axis directions parallel to the bottom center P0 of the recess 315 may be a first axis (X) direction and a second axis (Y) direction, and the first axis (X) direction and the second axis (Y) direction may be two axis directions perpendicular to the central axis Z0 or the optical axis. The bottom center P0 of the recess 315 may be a lower center of the optical lens 300 and may be defined as a reference point.

The bottom surface 310 of the optical lens 300A according to the embodiment may be provided around the recess 315. The bottom surface 310 may include a surface inclined with respect to the first and second straight lines X0 and Y0 or may include both an inclined surface and a curved surface. In the bottom surface 310, a region adjacent to the recess 315 may be flat, and a region adjacent to the second light exit surface 335 may have an inclined surface The recess 315 may be dented in a vertical upward direction from the center region of the bottom surface 310.

The bottom surface 310 of the optical lens 300A may include a first edge 23 adjacent to the recess 315 and a second edge 25 adjacent to the second light exit surface 335. The first edge 23 is a boundary region between the light incidence surface 320 and the bottom surface 310 and may include a low point region of the optical lens 300A. The first edge 23 may include the lowest point in the region of the bottom surface 310. A position of the first edge 23 may be provided to be lower than a position of the second edge 25 with respect to the first straight line X0. The first edge 23 may cover a lower circumference of the light incidence surface 320. The second edge 25 may be an outer region of the bottom surface 310 or a lower region of the second light exit surface 335. The second edge 25 may be a boundary region between the bottom surface 310 and the second light exit surface 335.

The first edge 23 may be an inner region of the bottom surface 310 or a boundary line with the light incidence surface 320. The second edge 25 may be an outer region of the bottom surface 310 or a boundary line with the second light exit surface 335. The first edge 23 may include an inner corner or a curved surface. The second edge 25 may include an outer corner or a curved surface. The first edge 23 and the second edge 25 may be both ends of the bottom surface 310. A bottom view shape of the first edge 23 may be a circular shape or an oval shape, and a bottom view shape of the second edge 25 may be a circular shape or an oval shape.

As a distance from the first edge 23 on the bottom surface 310 is closer, an interval between the first straight line X0 and the second straight line Y0 may be gradually narrower. As a distance from the first edge 23 on the bottom surface 310 is farther away, an interval between the first straight line X0 and the second straight line Y0 may be gradually increased. On the bottom surface 310, the second edge 25 may be a maximum interval between the first straight line X0 and the second straight line Y0, and the first edge 23 may be a minimum interval between the first straight line X0 and the second straight line Y0. The bottom surface 310 may include either or both of an inclined surface and a curved surface between the first edge 23 and the second edge 25. As a distance is gradually farther away toward the outside with respect to the first straight line X0 and the second straight line Y0, the bottom surface 310 may be a total reflection surface when viewed from the recess 315. For example, when an arbitrary light source is provided on the bottom of the recess 315, the bottom surface 310 may provide an inclined surface. Since the bottom surface 310 reflects light incident through the recess 315, light loss may be reduced. Also, it is possible to remove light directly incident through the bottom surface 310 without passing through the light incidence surface 320. The optical lens 300A may increase an amount of light incident on the bottom surface 310 through the light incidence surface 320.

As a distance to the first edge 23 of the recess 315 is closer, the bottom surface 310 may become lower. Thus, the bottom surface 310 may be gradually closer to the first straight line X0 and the second straight line Y0. Accordingly, an area of the bottom surface 310 may be increased. An area of the light incidence surface 320 of the recess 315 may be further widened by a lowered depth of the bottom surface 310. Since a depth of the recess 315 is a height from the first edge 23, the depth of the recess 315 may become deeper. As the area of the bottom surface 310 is increased, a reflection area may be increased. Since the bottom of the recess 315 becomes lower, a bottom area may be increased.

The first edge 23 of the bottom surface 310 may be provided on the first straight line X0 and the second straight line Y0 parallel to the bottom of the recess 315, and the second edge 25 is spaced apart from the first straight line X0 and the second straight line Y0 by a certain interval. The interval between the second edge 25 and the first and second straight lines X0 and Y0 may be a distance that can provide an inclined surface so as to reflect light incident on the lower region 22 of the light incidence surface 320. The lower region 22 of the light incidence surface 320 may be a region between the first edge 23 and the lower point of the light incidence surface 320 which intersects with a line parallel to the second edge 25.

The interval between the second edge 25 and the first straight line X0 or the second straight line Y0 may be 500 μm or less, for example, 450 μm or less. The interval between the second edge 25 and the first straight line X0 or the second straight line Y0 may be in a range of 200 μm to 450 μm. When the interval between the second edge 25 and the first straight line X0 or the second straight line Y0 is less than the above range, a low point position of the second light exit surface 335 is lowered, thus causing interference between light beams emitted from the second light exit surface 335. When the interval is greater than the above range, a high point position of the second light exit surface 335 is increased, thus causing a problem that a curvature of the first light exit surface 330 is changed and a thickness D5 of the optical lens 300A is increased The bottom surface 310 of the optical lens 300A may include a plurality of support protrusions 350. Like in FIG. 18, the plurality of support protrusions 350 may be provided at the same distance D11 from the center of the recess 315. As another example, at least one of the plurality of support protrusions 350 may be provided at different distances from the center of the recess 315. In the plurality of support protrusions 350, an interval D13 in the X-axis direction may be greater than an interval D12 in the second axis direction.

Regarding the length of the bottom surface 310, a first length D1 in the X-axis direction may be different from a second length D2 in the Y-axis direction. The first length D1 may be a length of the bottom surface 310 or the first light exit surface 330 in the X-axis direction, and the second length D2 may be a length of the bottom surface 310 or the first light exit surface 330 in the Y-axis direction. The first length D1 may be a length of the optical lens 300A in the first axis direction, and the second length D2 may be a length of the optical lens 300A in the second axis direction. The second length D2 may be longer than the first length D1. The second length D2 may be greater than the first length D1 by 0.5 mm or more, for example, 1 mm or more. The length may satisfy a relationship of D1<D2, and a length ratio D1:D2 may be in a range of 1:1.03 to 1:1.1. In the optical lens 300A according to the embodiment, since the second length D2 is longer than the first length D1, the luminance distribution in the second axis direction may not be reduced.

As illustrated in FIG. 18, the bottom shape of the recess 315 may include an oval shape. As illustrated in FIGS. 19 to 22, a side sectional shape of the recess 315 may include a bell shape, a shell shape, or an oval shape. The recess 315 may have a shape in which a width becomes narrower upward. The recess 315 may have a shape which gradually converges from the first edge 23 of the bottom circumference toward a first vertex 21 of an upper end. When the bottom view of the recess 315 is an oval shape, a diameter thereof may be gradually reduced toward the first vertex 21. The recess 315 may have an axially symmetrical shape with respect to the central axis Z0. The first vertex 21 of the light incidence surface 320 may have a dot shape.

Bottom lengths D3 and D4 of the recess 315 may have a width where a light source, that is, a light emitting device described later, can be inserted. The bottom lengths D3 and D4 of the recess 315 may be equal to or less than three times the width of the light emitting device, for example, equal to or less than 2.5 times the width of the light emitting device. The bottom lengths D3 and D4 of the recess 315 may be in a range of 1.2 to 2.5 times the width of the light emitting device. When the bottom lengths D3 and D4 of the recess 315 are less than this range, the insertion of the light emitting device is not easy. When the bottom lengths D3 and D4 of the recess 315 are greater than this range, it is possible to reduce light loss or light interference through a region between the light emitting device and the first edge 23.

Regarding the bottom length of the recess 315, the third length D3 in the first axis direction may be different from the fourth length D4 in the second axis direction. For example, the third length D3 in the first axis direction may be greater than the fourth length D4 in the second axis direction. The bottom length of the recess 315 may satisfy a relationship of D3>D4, and a difference therebetween may be in a range of 0.5 mm to 5 mm, for example, 1 mm to 2 mm. The third length D3 may be equal to or less than four times the fourth length D4, for example, twice the fourth length D4. A bottom length ratio D4:D3 of the recess 315 may have a difference in a range of 1:1.3 to 1:2. When the difference between the fourth length D4 in the second axis direction and the third length D3 in the first axis direction is smaller than the above range, the luminance improvement in the Y-axis direction may be slight. When the difference between the fourth length D4 in the second axis direction and the third length D3 in the first axis direction is greater than the above range, the luminance distribution in the X-axis direction may be relatively reduced.

When the length ratio D2/D1 of the bottom surface 310 or the first light exit surface 330 is a and the length ratio D3/D4 of the recess 315 is b, the optical lens 300A according to the embodiment may have a relationship of a<b. The ratio of D2/D1 may be a ratio of a long length to a short length of the first light exit surface 330, and the ratio of D3/D4 may be a ratio of a long length to a short length of the bottom of the recess 315. b may be 110% or more of a, for example, in a range of 110% to 190%, or 120% to 180%. b may be equal to or more than 1.1 times a, for example, in a range of 1.1 to 1.9 times a, or 1.2 to 1.8 times a. A difference between the length in the first axis direction and the length in the second axis direction on the bottom of the recess 315 may be equal to or different from a difference between the length in the first axis direction and the length in the second axis direction of the bottom surface 310 or the first light exit surface 330. In the optical lens having such an asymmetrical shape, the area of the light incidence surface 315 of the recess 315 is wider in the X-axis direction than that of the lens having the symmetrical shape, thereby diffusing light more widely in the Y-axis direction. Accordingly, due to the length difference in the outer shape, the optical lens 300A may secure a luminance distribution in the Y-axis direction, and the luminance distribution may be widely spread in the X-axis direction and the diagonal direction between the X axis and the Y axis by the recess 315. Therefore, the number of bars of the light emitting module on which the optical lens 300A is provided may be reduced to two or less, for example, one, and luminance distributions of upper/lower corners in a backlight unit may be improved.

In the optical lens 300A according to the embodiment, the first length D1 in the first axis direction may be less than the second length D2 in the second axis direction, and the third length D3 of the recess 315 in the first axis direction may be greater than the fourth length D4 thereof in the second axis direction. Accordingly, due to the length difference in the outer shape, the optical lens 300A may secure a luminance distribution in the second axis direction, and the luminance distribution may be widely spread in the first axis direction and the edge region by the recess 315. Therefore, the number of bars of the light emitting module on which the optical lens 300A is provided may be reduced to two or less, for example, one, and luminance distributions of upper/lower corners in a backlight unit may be improved.

The light incidence surface 320 may be convex upward from the center region of the bottom surface 310 and may be gradually farther away as a distance to the bottom center P0 of the recess 315 is vertically increased. Since the light incidence surface 320 has a convexly curved surface, the entire light incidence surface 320 may refract light. Since a lower region 22 of the light incidence surface 320 is provided at a lower position than the second light exit surface 335, the light incidence surface 320 may receive light directly or indirectly. The lower region 22 of the light incidence surface 320 may receive light reflected from the bottom of the recess 315. The bottom surface 310 and the light incidence surface 320 may be formed by a rotor having a Bezier curve. The curve of the bottom surface 310 and the light incidence surface 320 may be realized by spline, for example, cubic, B-spline, or T-spline. The curve of the light incidence surface 320 may be realized by a Bezier curve.

As illustrated in FIGS. 21 and 22, the optical lens 300A may include the first light exit surface 330 and the second light exit surface 335. The first light exit surface 330 may be a surface opposite to the light incidence surface 320 and the bottom surface 310 with respect to the lens body. The first light exit surface 330 may include a curved surface. A point corresponding to the central axis Z0 on the first light exit surface 330 may be a second vertex 31, and the second vertex 31 may be a vertex of the lens body. The first light exit surface 330 may include a curved surface which is convex upward. First regions A1 and A2 on the center adjacent to the second vertex 31 on the second light exit surface 335 may not have a negative curvature. The first regions A1 and A2 adjacent to the second vertex 31 on the second light exit surface 335 may have different positive curvature radii. Second regions A3 and A4, which are outer side regions of the first regions A1 and A2, may be curved surfaces having different curvature radii.

The first light exit surface 330 may be gradually increased as a distance to the bottom center P0 of the recess 315 is gradually farther away from the central axis Z0. As a distance to the central axis Z0, that is, the second vertex 31, on the first light exit surface 330 is reduced, there is no slope or a slight slope difference with respect to a horizontal axis. That is, the first regions A1 and A2 on the center of the first light exit surface 330 may include a gently curved surface or a parallel straight line. The first regions A1 and A2 of the first light exit surface 330 may include a region vertically overlapping the recess 315. The second regions A3 and A4 on the sides of the first light exit surface 330 may have a steeply curved surface, as compared with the first regions A1 and A2. Since the first light exit surface 330 and the light incidence surface 320 have a convexly curved surface, it is possible to diffuse light emitted from the bottom center P0 of the recess 315 in a lateral direction. The first light exit surface 330 and the light incidence surface 320 may increase a light refraction angle as a distance to the central axis Z0 is increased in an angle range of 70±4 degrees from the central axis Z0.

The curvature radii of the first regions A1 and A2 of the first light exit surface 330 may be greater than the curvature radius of the light incidence surface 320. The curvature radii of the first regions A1 and A2 of the first light exit surface 330 may be greater than the curvature radii of the second regions A3 and A4. The first regions A1 and A2 in the first axis direction and the second axis direction may have the same curvature radius or different curvature radii, but are not limited thereto. The second regions A3 and A4 in the first axis direction and the second axis direction may have the same curvature radius or different curvature radii, but are not limited thereto.

The slope of the first light exit surface 330 may be less than the slope of the light incidence surface 320. The first light exit surface 330 of the optical lens 300A monotonically increase as a distance to the central axis Z0 is increased within an orientation angle. The second light exit surface 335 includes a region deviated from the orientation angle distribution of light and monotonically increases as a distance to the central axis Z0 is increased.

A refraction angle of light at an interface between the first light exit surface 330 and the second light exit surface 335 may be reduced in an angle range of, for example, 2 degrees or less. Since a surface of the first light exit surface 330 close to the second light exit surface 335 is provided as a surface close to or perpendicular to a tangent line, the refraction angle of light may be gradually reduced.

The second light exit surface 335 of the optical lens 300 may be provided at a higher position than the first straight line X0 and the second straight line Y0 parallel to the bottom of the recess 315. The second light exit surface 335 may be a flat surface or an inclined surface and may be defined as a flange, but is not limited thereto. The second light exit surface 335 may be provided to be perpendicular or inclined with respect to the first straight line X0 and the second straight line Y0. The second light exit surface 335 may extend to be perpendicular or inclined from the outer line of the first light exit surface 330. The second light exit surface 335 may include a third edge 35 adjacent to the first light exit surface 330, and the third edge 35 may be provided at the same position as the outer line of the first light exit surface 330 or may be provided to be more inner or outer than the first light exit surface 330.

A straight line connecting the third edge 35 of the second light exit surface 335 and the central axis Z0 may be provided at an angle of 74±2 or less from the central axis Z0 with respect to the bottom center P0 of the recess 315. The third edge 35 of the second light exit surface 335 may be provided at an angle of 20 degrees or less, for example, an angle of 16±2 degrees, with respect to the first straight line X0 and the second straight line Y0 with respect to the bottom center P0 of the recess 315. The angle between the second edge 25 and the third edge 35 of the second light exit surface 335 with respect to the bottom center P0 of the recess 315 may be 16 degrees or less, for example, 13±2 degrees. The angle of the straight line passing through the third edge 35 of the second light exit surface 335 is an external angle of the optical lens 300A. The second light exit surface 335 may refract and radiate light incident on a region spaced apart from the first straight line X0 and the second straight line Y0. The light refracted by the second light exit surface 335 may be radiated at an angle smaller than an angle before refraction with respect to the central axis Z0. Accordingly, the second light exit surface 335 may suppress the refracted light from being radiated in a horizontal axis or a direction below the horizontal axis and may prevent interference on the adjacent optical member or light loss.

The angle θ1 between the straight line passing through the central axis Z0 and the second edge 25 of the bottom surface 310 and the first straight line X0 or the second straight line Y0 may be 5 degrees or less, for example, in a range of 0.4 degrees to 4 degrees. The angle θ1 may be changed according to the distance to the central axis Z0 and the height of the second edge 25. When the angle θ1 deviates from this range, the thickness of the optical lens may be changed and light loss may be increased. The second light exit surface 335 refracts light beams, which deviate from a half power angle, from the central axis Z0 with respect to the bottom center P0 of the recess 315, thereby reducing light loss.

The lengths D1 and D2 of the optical lens 300A may be greater than the thickness D5 thereof. The lengths D1 and D2 of the optical lens 300A may be equal to or greater than 2.5 times the thickness D5 of the optical lens 300A, for example, equal to or greater than 3 times the thickness D5 of the optical lens 300A. The first length D1 of the optical lens 300A may be 15 mm or more, for example, in a range of 16 mm to 25 mm, and the second length D2 of the optical lens 300 may be 16 mm or more, for example, in a range of 17 mm to 30 mm. The thickness D5 of the optical lens 300 may be 6.5 mm or more, for example, in a range of 6.5 mm to 9 mm. Since the different lengths D1 and D2 of the optical lens 300A are greater than the thickness D5, it is possible to provide a uniform luminance distribution to an entire region of a lighting apparatus or a light unit. Also, since a region covered in the light unit is improved, the number of optical lenses may be reduced and the thickness of the optical lens 300A may be reduced.

The depth D8 of the recess 315 has an interval from the bottom center P0 to the first vertex 21. The first vertex 21 may be a vertex of the light incidence surface 320 or an upper end point of the recess 315. The depth D8 of the recess 315 may be 5 mm or more, for example, 6 mm or more, and may be 75% or more of the thickness D5 of the optical lens 300A, for example, 80% or more of the thickness D5 of the optical lens 300A. The depth D8 of the recess 315 may be equal to or greater than 80% of the distance between the second vertex 31 of the first light exit surface 330 and the bottom center P0 or the first edge 23. Since the depth D8 of the recess 315 is deep, light may be diffused to a region adjacent to the first vertex 21 of the light incidence surface 320 in a lateral direction even though the center region of the first light exit surface 330 does not have a total reflection surface or a negative curvature. Since the recess 315 has a deep depth D8, the light incidence surface 320 may refract light incident from a region close to the second vertex 31 to a peripheral region of the first vertex 21 in a lateral direction.

A minimum distance D9 between the recess 315 and the first light exit surface 330 may be an interval between the first vertex 21 of the light incidence surface 320 and the second vertex 31 of the first light exit surface 330. The distance D9 may be 3 mm or less, for example, in a range of 0.6 mm to 3 mm, or 0.6 mm to 2 mm. When the distance D9 between the first vertex 21 of the light incidence surface 320 and the second vertex 31 of the first light exit surface 330 is 3 mm or more, a difference between an amount of light traveling toward the first regions A1 and A2 of the first light exit surface 330 and an amount of light traveling toward the second regions A3 and A4 of the first light exit surface 330 may be increased and a light distribution may not be uniform. When the distance D9 between the first vertex 21 of the light incidence surface 320 and the second vertex 31 of the first light exit surface 330 is less than 0.6 mm, the stiffness on the center of the optical lens 300A is weakened. By disposing the distance D9 between the recess 315 and the first light exit surface 330 in the above range, an optical path may be diffused in an outward direction even though the first regions A1 and A2 of the second light exit surface 335 do not have a total reflection surface or a negative curvature. As the first vertex 21 of the light incidence surface 320 is closer to the convex second vertex 31 of the first light exit surface 330, it is possible to increase an amount of light traveling in a lateral direction of the first light exit surface 330 through the light incidence surface 320. Accordingly, it is possible to increase an amount of light diffusing in a lateral direction of the optical lens 300A.

The first vertex 21 of the light incidence surface 320 may be provided to be more adjacent to the second vertex 31, which is the center of the first light exit surface 330, than the straight line extending in parallel from the third edge 35 of the second light exit surface 335. A width D7 of the second light exit surface 335 is a straight distance between the second edge 25 and the third edge 35 and may be less than the depth D8 of the recess 315. The width D7 of the second light exit surface 335 may be in a range of, for example, 1.8 mm to 2.3 mm. When the width D7 of the second light exit surface 335 exceeds the above range, an amount of light emitted to the second light exit surface 335 is increased, and thus, a light distribution control is difficult. When the width D7 of the second light exit surface 335 is smaller than the above range, it may be difficult to secure a gate region when the lens body is manufactured.

As illustrated in FIGS. 21 and 22, the first regions A1 and A2 of the first light exit surface 330 are regions vertically overlapping the recess 315 and may be provided in a region of an angle of 20 degrees or less, for example, an angle of 14 degrees to 18 degrees, from the central axis Z0 with respect to the bottom center P0. When the first regions A1 and A2 of the first light exit surface 330 exceed the above angle range, the radius of the recess 315 is further increased and a difference between an amount of light in the first regions A1 and A2 and an amount of light in the second regions A3 and A4 is increased. Also, when the first regions A1 and A2 of the first light exit surface 330 are smaller than the above angle range, the radius of the recess 315 is further decreased. Thus, the insertion of the light source may not be easy and a light distribution of the first regions A1 and A2 and the second regions A3 and A4 of the first light exit surface 330 may not be uniform.

In the optical lens 300A, the second light exit surface 335 may be provided around a lower circumference of the first light exit surface 330, and the bottom surface 310 may be provided to be lower than the second edge 25 of the second light exit surface 335. The bottom surface 310 may protrude more downward than the horizontal line of the second edge 25 of the second light exit surface 335.

As another example of the optical lens 300A, the second light exit surface 335 may have an uneven surface. The uneven surface may be a rough haze surface. The uneven surface may be a surface on which scattered particles are formed. As another example of the optical lens 300A, the bottom surface 310 may have an uneven surface. The uneven surface of the bottom surface 310 may be a rough haze surface or a surface on which scattered particles are formed.

Figure 32:
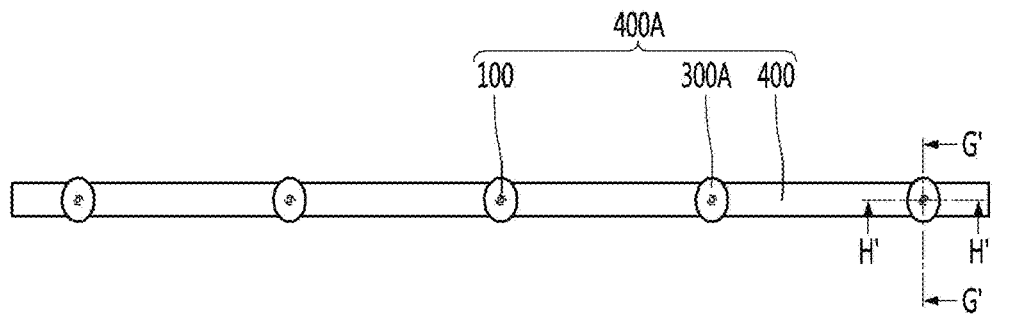
FIG. 32 is a view of a light emitting module including optical lenses according to embodiments.

As illustrated in FIG. 32, the optical lenses 300A according to the embodiment may be provided on the circuit board 400 in the first axis (X-axis) direction by certain intervals. As illustrated in FIGS. 18, 21, and 22, these optical lenses 300A are provided in the X-axis direction where the bottom length (D4<D3) of the recess 315 is wide. Thus, the number of optical lenses 300A may be reduced while widening the interval between the optical lenses 300A. Also, due to the asymmetrical structure of the recess 315, the luminance distribution in the second axis (Y-axis) direction may be improved.

Figure 23:
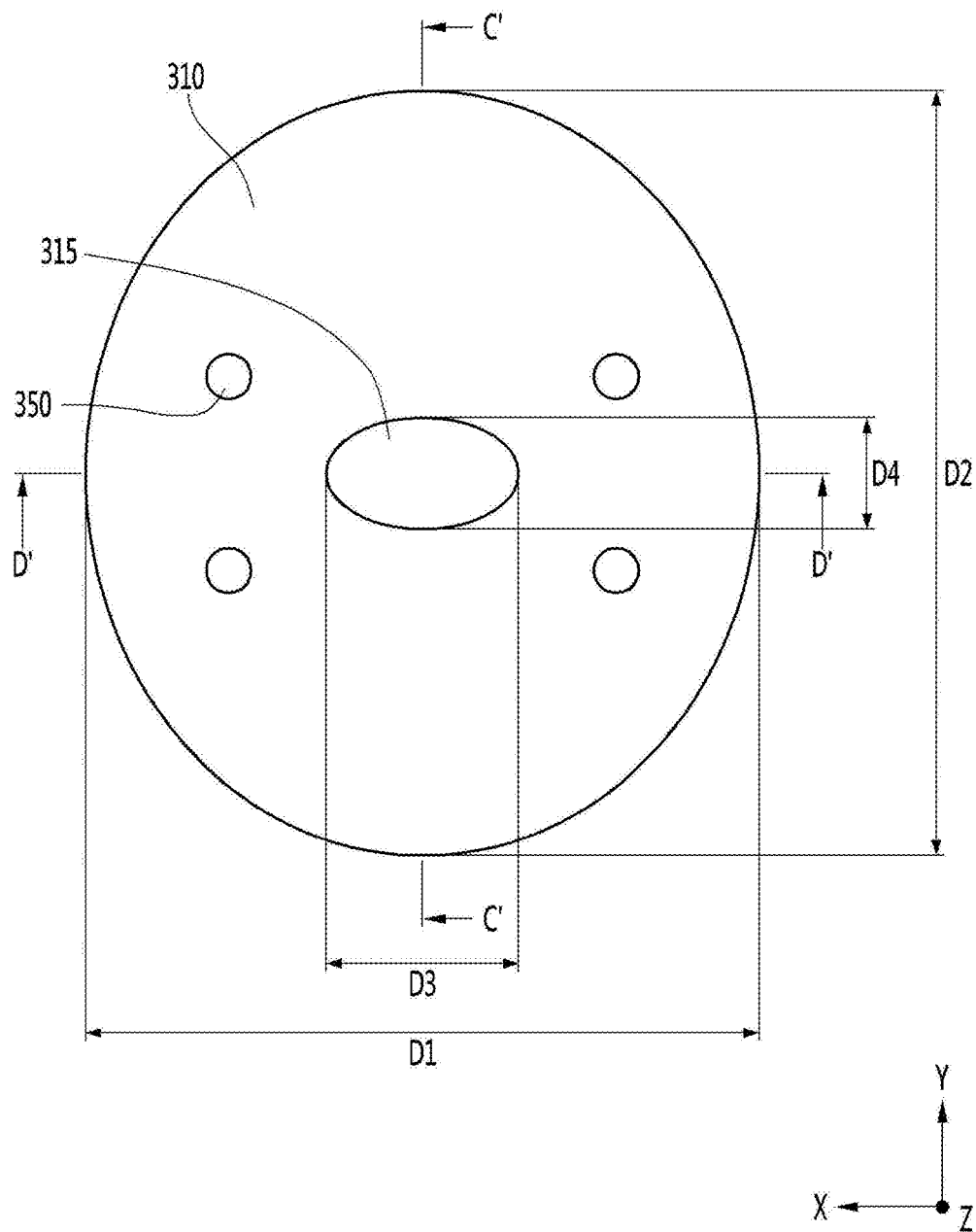
FIG. 23 is a bottom view of an optical lens according to another embodiment.
Figure 24:
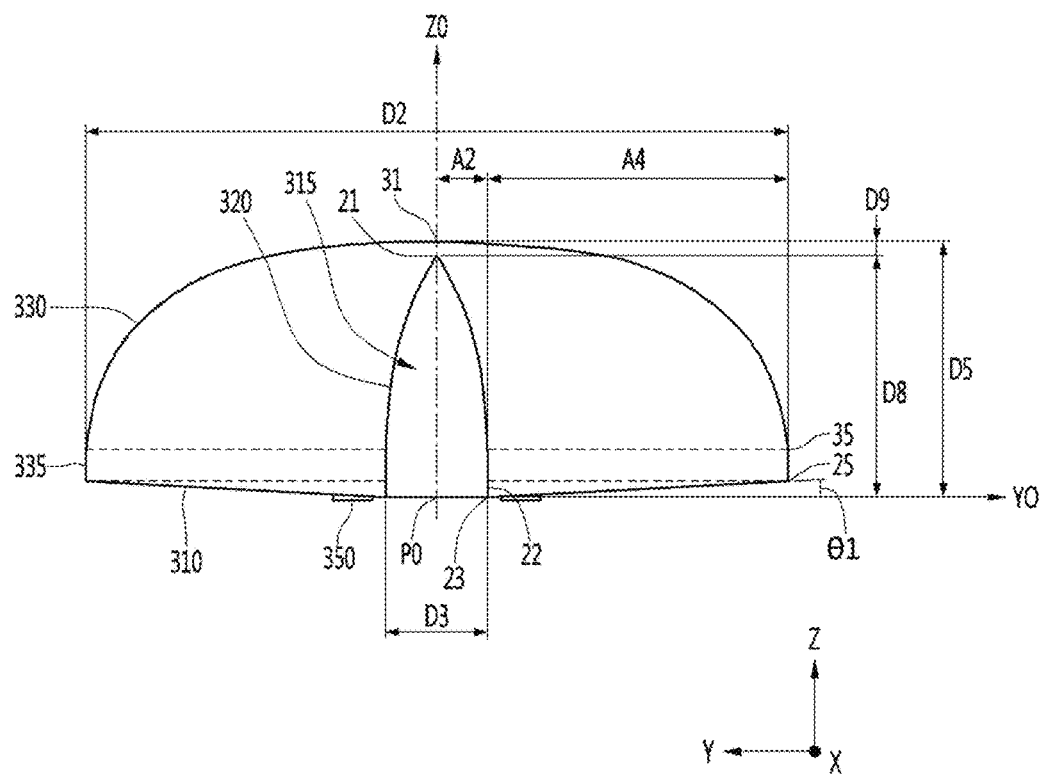
FIG. 24 is a sectional view of the optical lens, taken along line C'-C' of FIG. 23.
Figure 25:
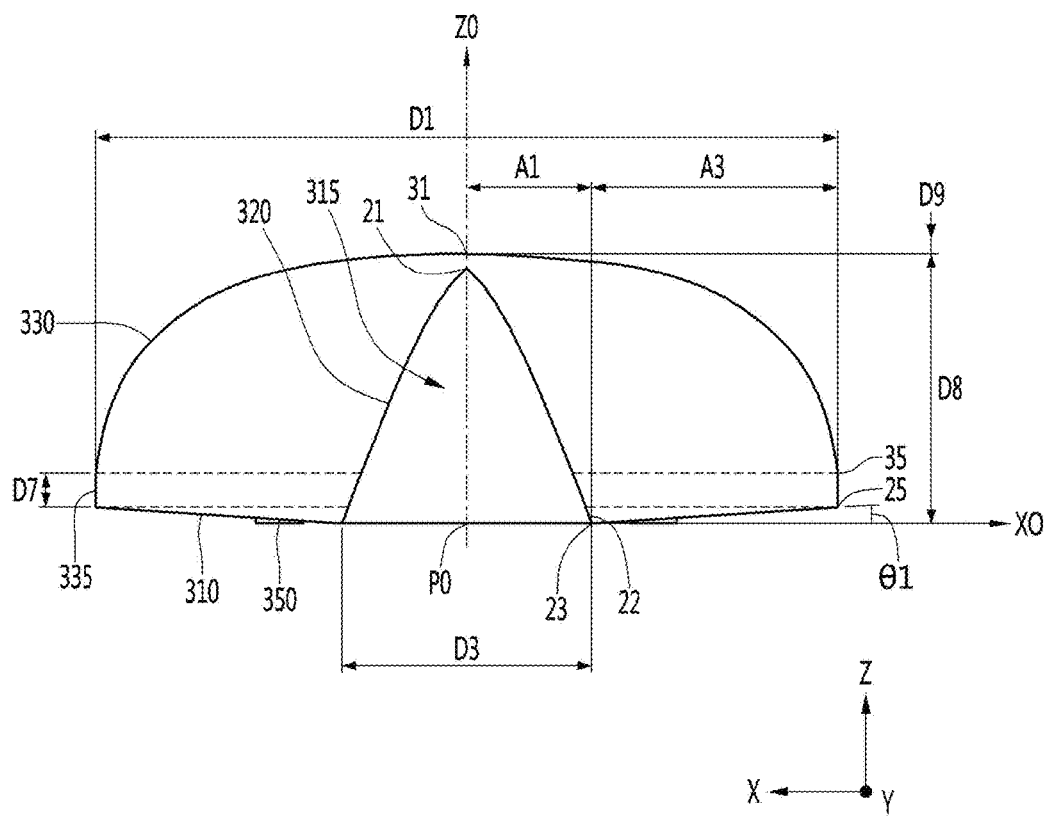
FIG. 25 is a sectional view of the optical lens, taken along line D'-D' of FIG. 23.

FIG. 23 is a bottom view of an optical lens according to a fifth embodiment, FIG. 24 is a sectional view of the optical lens, taken along line C'-C' of FIG. 23, and FIG. 25 is a sectional view of the optical lens, taken along line D'-D' of FIG. 23. In describing the fifth embodiment, the same parts as those described above may be understood by referring to the above descriptions. Detailed descriptions of the redundant configurations will be omitted and may be selectively applied.

Referring to FIGS. 23 to 25, the optical lens according to the fifth embodiment includes a bottom surface 310, a recess 315 which is convex upwardly from the bottom surface 310 in a center region of the bottom surface 310, a light incidence surface 320 provided around the recess 315, a first light exit surface 330 provided on a side opposite to the bottom surface 310 and the light incidence surface 320, and a second light exit surface 335 provided below the first light exit surface 330. The optical lens according to the fifth embodiment differs from the optical lenses according to the first to fourth embodiments in terms of the first and second lengths D1 and D2, the bottom lengths D3 and D4 of the recess 315, and the depth of the recess 315. The bottom surface 310 of the optical lens may include a plurality of support protrusions 350. The plurality of support protrusions 350 protrude downward from the bottom surface 310 of the optical lens and support the optical lens.

The bottom view shape of the bottom surface 310 may include an oval shape. Regarding the length of the bottom surface 310 or the first light exit surface 330, a first length D1 in the first axis (X-axis) direction may be different from a second length D2 in the second axis (Y-axis) direction. The first length D1 may be a length of the optical lens in the first axis direction, and the second length D2 may be a length of the optical lens in the second axis direction. The second length D2 may be longer than the first length D1. The second length D2 may be greater than the first length D1 by 0.5 mm or more, for example, 1 mm or more. The length may satisfy a relationship of D2>D1, and a length ratio D1:D2 may be in a range of 1:1.03 to 1:1.1. In the optical lens according to the embodiment, since the second length D2 is longer than the first length D1, the luminance distribution in the second axis direction may not be reduced.

Figure 26:
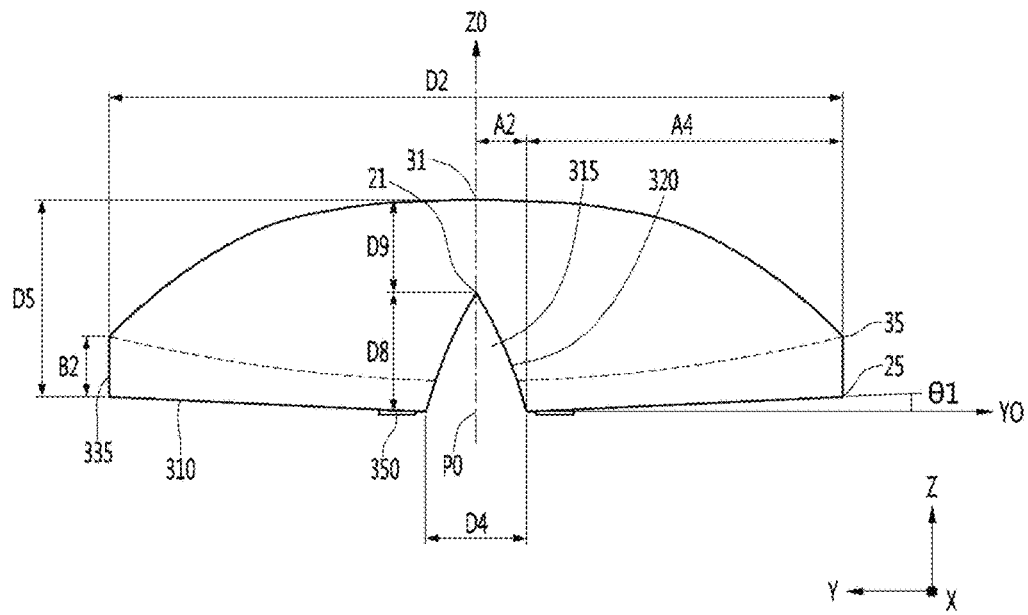
FIG. 26 is a side sectional view of an optical lens according to another embodiment.
Figure 27:
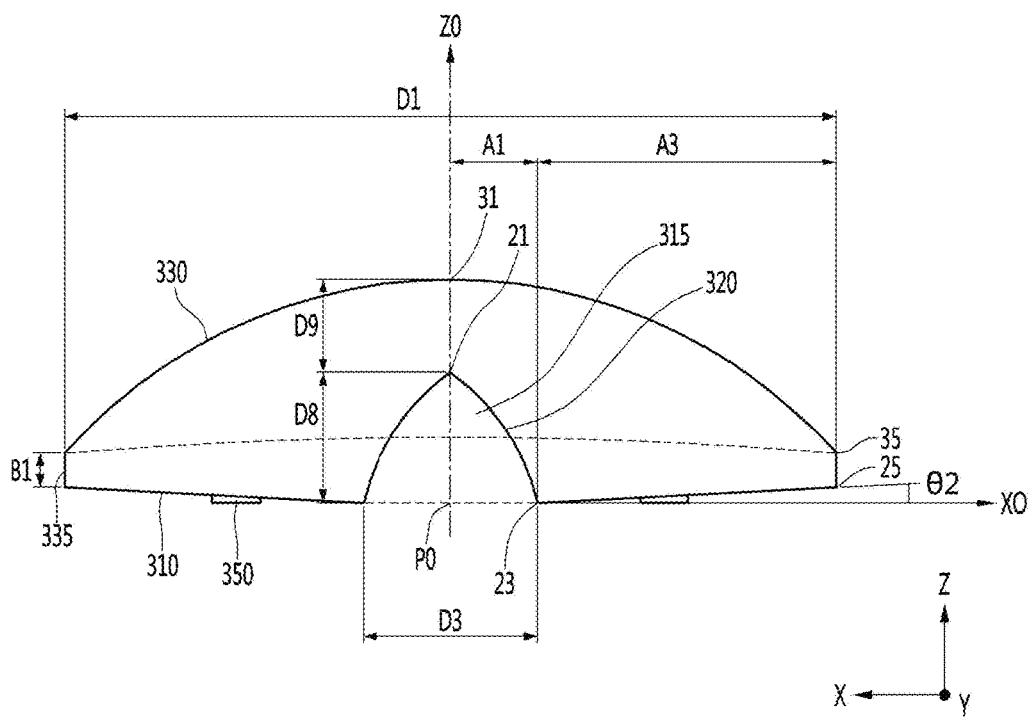
FIG. 27 is another sectional view of the optical lens of FIG. 26.
Figure 29:
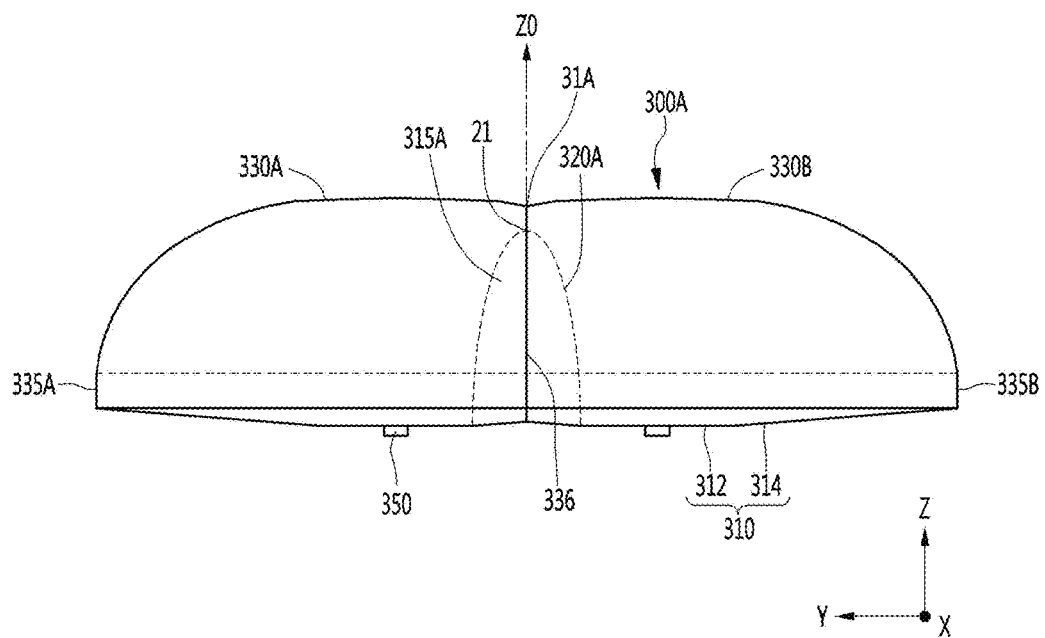
FIG. 29 is a side view of the optical lens of FIG. 28.

As illustrated in FIG. 26, the bottom shape of the recess 315 may include an oval shape. As illustrated in FIGS. 27 and 28, a side sectional shape of the recess 315 may include a bell shape, a shell shape, or an oval shape. The recess 315 may have a shape in which a width becomes narrower upward. The recess 315 may have a shape which gradually converges from the first edge 23 of the bottom circumference toward a first vertex 21 of an upper end. When the bottom view of the recess 315 is an oval shape, a diameter thereof may be gradually reduced toward the first vertex 21. The recess 315 may have an axially symmetrical shape with respect to the central axis Z0. The first vertex 21 of the light incidence surface 320 may have a dot shape.

Bottom lengths D3 and D4 of the recess 315 may have a width where a light source, that is, a light emitting device described later, can be inserted. The bottom lengths D3 and D4 of the recess 315 may be equal to or less than three times the width of the light emitting device, for example, equal to or less than 2.5 times the width of the light emitting device. The bottom lengths D3 and D4 of the recess 315 may be in a range of 1.2 to 2.5 times the width of the light emitting device. When the bottom lengths D3 and D4 of the recess 315 are less than this range, the insertion of the light emitting device is not easy. When the bottom lengths D3 and D4 of the recess 315 are greater than this range, it is possible to reduce light loss or light interference through a region between the light emitting device and the first edge 23.

Regarding the bottom length of the recess 315, the length D3 in the first axis direction may be different from the length D4 in the second axis direction. For example, the length D3 in the first axis direction may be greater than the length D4 in the second axis direction. The bottom length of the recess 315 may satisfy a relationship of D3>D4, and a difference therebetween may be in a range of 2 mm to 5 mm, for example, 3 mm to 5 mm. The bottom length D3 may be equal to or less than four times the bottom length D4. A bottom length ratio D4:D3 of the recess 315 may have a difference in a range of 1:1.5 to 1:3. When the difference between the length D4 in the second axis direction and the length D3 in the first axis direction is smaller than the above range, the luminance improvement in the Y-axis direction may be slight. When the difference between the length D4 in the second axis direction and the length D3 in the first axis direction is greater than the above range, the luminance distribution in the X-axis direction may be relatively reduced. Also, when the length difference between the bottom lengths D3 and D4 of the recess 315 is increased, the light emitted from the light source, for example, the light emitting device, may induce the improvement in the light extraction efficiency in a direction perpendicular to a direction in which the bottom length of the recess is long, for example, in the Y-axis direction.

When the length ratio D2/D1 of the bottom surface 310 or the first light exit surface 330 is a and the bottom length ratio D3/D4 of the recess 315 is b, the optical lens according to the embodiment may have a relationship of a<b. The ratio of D2/D1 may be a ratio of a long length to a short length of the first light exit surface 330, and the ratio of D3/D4 may be a ratio of a long length to a short length of the bottom of the recess 315. b may be 136% or more of a, for example, in a range of 136% to 290%, or 145% to 270%. b may be equal to or more than 1.36 times a, for example, in a range of 1.36 to 2.90 times a, or 1.45 to 2.70 times a. In the asymmetrical optical lens, the area of the light incidence surface 315 of the recess 315 is wider than that of the symmetrical lens, thereby diffusing light in a wider range. Accordingly, due to the length difference in the outer shape, the optical lens may secure a luminance distribution in the Y-axis direction, and the luminance distribution may be widely spread in the X-axis direction and the edge region by the recess 315. Therefore, the number of bars of the light emitting module on which the optical lens is provided may be reduced to two or less, for example, one, and luminance distributions of upper/lower corners in a backlight unit may be improved.

In the optical lens according to the embodiment, the second length D2 in the second axis direction may be greater than the first length D1 in the first axis direction, and the bottom length D4 of the recess 315 in the second axis direction may be less than the bottom length D3 thereof in the first axis direction. Accordingly, due to the length difference in the outer shape, the optical lens may secure a luminance distribution in the second axis direction, and the luminance distribution may be widely spread in the second axis direction and the edge region between the X-axis and the Y-axis by the recess 315. The number of bars of the light emitting module on which the optical lens is provided may be reduced to two or less, for example, one, and luminance distributions of upper/lower corners in a backlight unit may be improved.

The second light exit surface 335 of the optical lens 300 may be provided at a higher position than the first straight line X0 and the second straight line Y0 parallel to the bottom of the recess 315. The second light exit surface 335 may be a flat surface or an inclined surface and may be defined as a flange, but is not limited thereto. The second light exit surface 335 may be provided to be perpendicular or inclined with respect to the first straight line X0 and the second straight line Y0. The second light exit surface 335 may extend to be perpendicular or inclined from the outer line of the first light exit surface 330. The second light exit surface 335 may include a third edge 35 adjacent to the first light exit surface 330, and the third edge 35 may be provided at the same position as the outer line of the first light exit surface 330 or may be provided to be more inner or outer than the first light exit surface 330.

A straight line connecting the third edge 35 of the second light exit surface 335 and the central axis Z0 may be provided at an angle of 74±2 or less from the central axis Z0 with respect to the bottom center P0 of the recess 315. The third edge 35 of the second light exit surface 335 may be provided at an angle of 20 degrees or less, for example, an angle of 16±2 degrees, with respect to the first straight line X0 and the second straight line Y0 with respect to the bottom center P0 of the recess 315. The angle between the second edge 25 and the third edge 35 of the second light exit surface 335 with respect to the bottom center P0 of the recess 315 may be 16 degrees or less, for example, 13±2 degrees. The angle of the straight line passing through the third edge 35 of the second light exit surface 335 is an external angle of the optical lens. The second light exit surface 335 may refract and radiate light incident on a region spaced apart from the first straight line X0 and the second straight line Y0. The light refracted by the second light exit surface 335 may be radiated at an angle smaller than an angle before refraction with respect to the central axis Z0. Accordingly, the second light exit surface 335 may suppress the refracted light from being radiated in a horizontal axis or a direction below the horizontal axis and may prevent interference on the adjacent optical member or light loss.

The angle θ1 or θ2 between the straight line passing through the central axis Z0 and the second edge 25 of the bottom surface 310 and the first straight line X0 or the second straight line Y0 may be 5 degrees or less, for example, in a range of 0.4 degrees to 4 degrees. The angle θ1 may be changed according to the distance to the central axis Z0 and the height of the second edge 25. When the angle θ1 deviates from this range, the thickness of the optical lens may be changed and light loss may be increased. The second light exit surface 335 refracts light beams, which deviate from a half power angle, from the central axis Z0 with respect to the bottom center P0 of the recess 315, thereby reducing light loss.

The lengths D1 and D2 of the optical lens may be greater than the thickness D5 thereof. The lengths D1 and D2 of the optical lens may be equal to or greater than 2.5 times the thickness D5 of the optical lens, for example, equal to or greater than 3 times the thickness D5 of the optical lens. The first length D1 of the optical lens may be 15 mm or more, for example, in a range of 16 mm to 25 mm, and the second length D2 of the optical lens may be 16 mm or more, for example, in a range of 17 mm to 30 mm. The thickness D5 of the optical lens may be 6.5 mm or more, for example, in a range of 6.5 mm to 9 mm. Since the different lengths D1 and D2 of the optical lens are greater than the thickness D5, it is possible to provide a uniform luminance distribution to an entire region of a lighting apparatus or a light unit. Also, since a region covered in the light unit is improved, the number of optical lenses may be reduced and the thickness of the optical lens may be reduced.

The depth D8 of the recess 315 has an interval from the bottom center P0 to the first vertex 21. The first vertex 21 may be a vertex of the light incidence surface 320 or an upper end point of the recess 315. The depth D8 of the recess 315 may be 5 mm or more, for example, 6 mm or more, and may be 75% or more of the thickness D5 of the optical lens, for example, 80% or more of the thickness D5 of the optical lens. The depth D8 of the recess 315 may be equal to or greater than 80% of the distance between the second vertex 31 of the first light exit surface 330 and the bottom center P0 or the first edge 23. Since the depth D8 of the recess 315 is deep, light may be diffused to a region adjacent to the first vertex 21 of the light incidence surface 320 in a lateral direction even though the center region of the first light exit surface 330 does not have a total reflection surface or a negative curvature. Since the recess 315 has a deep depth D8, the light incidence surface 320 may refract light incident from a region close to the second vertex 31 to a peripheral region of the first vertex 21 in a lateral direction.

A minimum distance D9 between the recess 315 and the first light exit surface 330 may be an interval between the first vertex 21 of the light incidence surface 320 and the second vertex 31 of the first light exit surface 330. The distance D9 may be 3 mm or less, for example, in a range of 0.6 mm to 3 mm, or 0.6 mm to 2 mm. When the distance D9 between the first vertex 21 of the light incidence surface 320 and the second vertex 31 of the first light exit surface 330 is 3 mm or more, a difference between an amount of light traveling toward the center region of the first light exit surface 330 and an amount of light traveling toward the side region of the first light exit surface 330 may be increased and a light distribution may not be uniform. When the distance D9 between the first vertex 21 of the light incidence surface 320 and the second vertex 31 of the first light exit surface 330 is less than 0.6 mm, the stiffness on the center of the optical lens 300 is weakened. By having the distance D9 between the recess 315 and the first light exit surface 330 in the above range, an optical path may be diffused in an outward direction even though the center region of the second light exit surface 335 does not have a total reflection surface or a negative curvature. As the first vertex 21 of the light incidence surface 320 is closer to the convex second vertex 31 of the first light exit surface 330, it is possible to increase an amount of light traveling in a lateral direction of the first light exit surface 330 through the light incidence surface 320. Accordingly, it is possible to increase an amount of light diffusing in a lateral direction of the optical lens, for example, the Y-axis direction.

The first vertex 21 of the light incidence surface 320 may be provided to be more adjacent to the second vertex 31, which is the center of the first light exit surface 330, than the straight line extending in parallel from the third edge 35 of the second light exit surface 335. A width D7 of the second light exit surface 335 is a straight distance between the second edge 25 and the third edge 35 and may be less than the depth D8 of the recess 315. The width D7 of the second light exit surface 335 may be in a range of, for example, 1.8 mm to 2.3 mm. When the width D7 of the second light exit surface 335 exceeds the above range, an amount of light emitted to the second light exit surface 335 is increased, and thus, a light distribution control is difficult. When the width D7 of the second light exit surface 335 is smaller than the above range, it may be difficult to secure a gate region when the lens body is manufactured.

In the optical lens, the second light exit surface 335 may be provided around a lower circumference of the first light exit surface 330, and the bottom surface 310 may be provided to be lower than the second edge 25 of the second light exit surface 335. The bottom surface 310 may protrude more downward than the horizontal line of the second edge 25 of the second light exit surface 335. As another example of the optical lens, the second light exit surface 335 may have an uneven surface. The uneven surface may be a rough haze surface. The uneven surface may be a surface on which scattered particles are formed. As another example of the optical lens, the bottom surface 310 may have an uneven surface. The uneven surface of the bottom surface 310 may be a rough haze surface or a surface on which scattered particles are formed.

As illustrated in FIG. 37, the optical lenses according to the embodiment may be provided on the circuit board 400 in the second axis (Y-axis) direction by certain intervals. As illustrated in FIGS. 24 to 26, these optical lenses are provided in the first axis direction where the bottom length (D4<D3) of the recess 315 is wide. Thus, the number of optical lenses may be reduced while widening the interval between the optical lenses. Also, due to the asymmetrical structure of the recess 315, the luminance distribution in the second axis (Y-axis) direction may be improved.

Referring to FIGS. 26 and 27, an optical lens according to a sixth embodiment may include a bottom surface 310, a recess 315 which is convex upwardly from the bottom surface 310 in a center region of the bottom surface 310, a light incidence surface 320 provided around the recess 315, a first light exit surface 330 provided on a side opposite to the bottom surface 310 and the light incidence surface 320, and a second light exit surface 335 provided below the first light exit surface 330. The optical lens according to the sixth embodiment differs from the optical lenses according to the above embodiments in terms of the first and second lengths D1 and D2, the bottom lengths D3 and D4 of the recess 315, and the depth of the recess 315. Also, in the optical lens according to the sixth embodiment, the widths B1 and B2 of the second light exit surface 335 are different according to a region.

The bottom view shape of the bottom surface 310 of the optical lens may include an oval shape. Regarding the length of the bottom surface 310 or the first light exit surface 330, a first length D1 in the first axis (X-axis) direction may be different from a second length D2 in the second axis (Y-axis) direction. The first length D1 may be a length of the optical lens in the first axis direction, and the second length D2 may be a length of the optical lens in the second axis direction. The second length D2 may be longer than the first length D1. A difference between the second length D2 and the first length D1 may be 0.5 mm or more, for example, 0.5 mm or 2 mm. The length may satisfy a relationship of D2>D1, and a length ratio D1:D2 may be in a range of 1:1.03 to 1:1.1. In the optical lens according to the embodiment, since the second length D2 is longer than the first length D1, the luminance distribution in the second axis direction may not be reduced.

The bottom shape of the recess 315 may include an oval shape. A side sectional shape of the recess 315 may include a bell shape, a shell shape, or an oval shape. The recess 315 may have a shape in which a width becomes narrower upward. The recess 315 may have a shape which gradually converges from the first edge 23 of the bottom circumference toward a first vertex 21 of an upper end. When the bottom view of the recess 315 is an oval shape, a diameter thereof may be gradually reduced toward the first vertex 21. The recess 315 may have an axially symmetrical shape with respect to the central axis Z0. The first vertex 21 of the light incidence surface 320 may have a dot shape.

Bottom lengths D3 and D4 of the recess 315 may have a width where a light source, that is, a light emitting device described later, can be inserted. The bottom lengths D3 and D4 of the recess 315 may be equal to or less than three times the width of the light emitting device, for example, equal to or less than 2.5 times the width of the light emitting device. The bottom lengths D3 and D4 of the recess 315 may be in a range of 1.2 to 2.5 times the width of the light emitting device. When the bottom lengths D3 and D4 of the recess 315 are less than this range, the insertion of the light emitting device is not easy. When the bottom lengths D3 and D4 of the recess 315 are greater than this range, it is possible to reduce light loss or light interference through a region between the light emitting device and the first edge 23.

Regarding the bottom length of the recess 315, the length D3 in the first axis direction may be different from the length D4 in the second axis direction. For example, the length D4 in the second axis direction may be less than the length D3 in the first axis direction. The bottom length of the recess 315 may have a relationship of D3>D4, and a difference therebetween may be in a range of 1.5 mm to 5 mm, for example, 1.5 mm to 3 mm. The bottom length D3 may be equal to or less than three times the bottom length D4, for example, equal to or less than twice the bottom length D4. A bottom length ratio D4:D3 of the recess 315 may have a difference in a range of 1:1.5 to 1:3. When the difference between the bottom length D4 in the second axis direction and the bottom length D3 in the first axis direction is smaller than the above range, the luminance improvement in the Y-axis direction may be slight. When the difference between the bottom length D4 in the second axis direction and the bottom length D3 in the first axis direction is greater than the above range, the luminance distribution in the X-axis direction may be relatively reduced. Also, even when the length difference between the bottom lengths D3 and D4 of the recess 315 is not great, the light emitted from the light source, for example, the light emitting device, may induce the improvement in the light extraction efficiency in a direction perpendicular to a direction in which the length of the recess 315 is long, for example, in the Y-axis direction.

When the length ratio D2/D1 of the bottom surface 310 or the first light exit surface 330 is a and the bottom length ratio D3/D4 of the recess 315 is b, the optical lens according to the embodiment may have a relationship of a<b. The ratio of D2/D1 may be a ratio of a long length to a short length of the first light exit surface 330, and the ratio of D3/D4 may be a ratio of a long length to a short length of the bottom of the recess 315. b may be 136% or more of a, for example, in a range of 136% to 290%, or 145% to 270%. b may be equal to or more than 1.36 times a, for example, in a range of 1.36 to 2.90 times a, or 1.45 to 2.70 times a. In the asymmetrical optical lens, the area of the light incidence surface 315 of the recess 315 is wider than that of the symmetrical lens, thereby diffusing light in a wider range. Accordingly, due to the length difference in the outer shape, the optical lens may secure a luminance distribution in the Y-axis direction, and the luminance distribution may be widely spread in the X-axis direction and the edge region by the recess 315. Therefore, the number of bars of the light emitting module on which the optical lens is provided may be reduced to two or less, for example, one, and luminance distributions of upper/lower corners in a backlight unit may be improved.

In the optical lens according to the embodiment, the second length D2 in the second axis direction may be greater than the first length D1 in the first axis direction, and the bottom length D4 of the recess 315 in the second axis direction may be less than the bottom length D3 thereof in the first axis direction. Accordingly, due to the length difference in the outer shape, the optical lens may secure a luminance distribution in the second axis direction, and the luminance distribution may be widely spread in the second axis direction and the diagonal direction between the X-axis and the Y-axis by the recess 315. The number of bars of the light emitting module on which the optical lens is provided may be reduced to two or less, for example, one, and luminance distributions of upper/lower corners in a backlight unit may be improved.

The second light exit surface 335 of the optical lens may be provided at a higher position than the first straight line X0 and the second straight line Y0 parallel to the bottom of the recess 315. The second light exit surface 335 may be a flat surface or an inclined surface and may be defined as a flange, but is not limited thereto. The second light exit surface 335 may be provided to be perpendicular or inclined with respect to the first straight line X0 and the second straight line Y0. The second light exit surface 335 may extend to be perpendicular or inclined from the outer line of the first light exit surface 330. The second light exit surface 335 may include a third edge 35 adjacent to the first light exit surface 330, and the third edge 35 may be provided at the same position as the outer line of the first light exit surface 330 or may be provided to be more inner or outer than the first light exit surface 330.

A straight line connecting the third edge 35 of the second light exit surface 335 and the central axis Z0 may be provided at an angle of 74±2 or less from the central axis Z0 with respect to the bottom center P0 of the recess 315. The third edge 35 of the second light exit surface 335 may be provided at an angle of 20 degrees or less, for example, an angle of 16±2 degrees, with respect to the first axis X0 and the second axis Y0 with respect to the bottom center P0 of the recess 315. The angle between the second edge 25 and the third edge 35 of the second light exit surface 335 with respect to the bottom center P0 of the recess 315 may be 16 degrees or less, for example, 13±2 degrees. The angle of the straight line passing through the third edge 35 of the second light exit surface 335 is an external angle of the optical lens. The second light exit surface 335 may refract and radiate light incident on a region spaced apart from the first straight line X0 and the second straight line Y0. The light refracted by the second light exit surface 335 may be radiated at an angle smaller than an angle before refraction with respect to the central axis Z0. Accordingly, the second light exit surface 335 may suppress the refracted light from being radiated in a horizontal axis or a direction below the horizontal axis and may prevent interference on the adjacent optical member or light loss.

The angles θ1 and θ2 between the straight line passing through the central axis Z0 and the second edge 25 of the bottom surface 310 and the first and second straight lines X0 and Y0 may be 5 degrees or less, for example, in a range of 0.4 degrees to 4 degrees. The angles θ1 and θ2 with respect to the first and second straight lines X0 and Y0 may be equal to each other or may have a difference of 1 degree or less. The angles θ1 and θ2 may be changed according to the distance to the central axis Z0 and the height of the second edge 25. When the angles θ1 and θ2 deviate from this range, the thickness of the optical lens may be changed and light loss may be increased. The second light exit surface 335 refracts light beams, which deviate from a half power angle, from the central axis Z0 with respect to the bottom center P0 of the recess 315, thereby reducing light loss.

The lengths D1 and D2 of the optical lens may be greater than the thickness D5 thereof. The lengths D1 and D2 of the optical lens may be equal to or greater than 2.5 times the thickness D5 of the optical lens, for example, equal to or greater than 3 times the thickness D5 of the optical lens. The first length D1 of the optical lens may be 15 mm or more, for example, in a range of 16 mm to 25 mm, and the second length D2 of the optical lens may be 16 mm or more, for example, in a range of 17 mm to 30 mm. The thickness D5 of the optical lens 300 may be 6.5 mm or more, for example, in a range of 6.5 mm to 9 mm. Since the different lengths D1 and D2 of the optical lens are greater than the thickness D5, it is possible to provide a uniform luminance distribution to an entire region of a lighting apparatus or a light unit. Also, since a region covered in the light unit is improved, the number of optical lenses may be reduced and the thickness of the optical lens may be reduced.

The depth D8 of the recess 315 has an interval from the bottom center P0 to the first vertex 21. The first vertex 21 may be a vertex of the light incidence surface 320 or an upper end point of the recess 315. The depth D8 of the recess 315 may be 3 mm or more, for example, 3.5 mm or more, and may be 55% or more of the thickness D5 of the optical lens, for example, 57% or more of the thickness D5 of the optical lens. The depth D8 of the recess 315 may be equal to or greater than 80% of the distance between the second vertex 31 of the first light exit surface 330 and the bottom center P0 or the first edge 23. Even though the depth D8 of the recess 315 is not deeper than that in the first embodiment, light may be diffused to a region adjacent to the first vertex 21 of the light incidence surface 320 in a lateral direction if the center region of the first light exit surface 330 does not have a total reflection surface or a negative curvature. The recess 315 may have a low depth D8 and improve light extraction efficiency in the Y-axis direction due to a width difference of the recess 315.

A minimum distance D9 between the recess 315 and the first light exit surface 330 may be an interval between the first vertex 21 of the light incidence surface 320 and the second vertex 31 of the first light exit surface 330. The distance D9 may be less than 5 mm, for example, in a range of 1 mm to 3.5 mm. When the distance D9 between the first vertex 21 of the light incidence surface 320 and the second vertex 31 of the first light exit surface 330 is 5 mm or more, the light extraction efficiency may be reduced by the low depth of the recess 315. Due to the recess 315 having the above-described structure, the light diffusion may be more effectively performed in the second axis direction of the first light exit surface 330 than in the first axis direction of the first light exit surface 330. The first vertex 21 of the light incidence surface 320 may be provided to be more adjacent to the second vertex 31, which is the center of the first light exit surface 330, than the straight line extending in parallel from the third edge 35 of the second light exit surface 335.

The widths B1 and B2 of the second light exit surface 335 are a straight distance between the second edge 25 and the third edge 35. Regarding the widths B1 and B2 of the second light exit surface 335, the width B2 of a region close to the second edge 25 in a direction of the first axis (X0) direction may be widest, and the width B1 of a region close to the second edge 25 in a direction of the second axis (Y0) direction may be narrowest. Also, as it gets closer to the second edge 25 in the direction of the first axis (X0) direction, the width B2 may be gradually wider, and as it gets closer to the second edge 25 in the direction of the second axis (Y0) direction, the width B1 may be gradually narrower.

Regarding the widths B1 and B2 of the second light exit surface 335, the maximum width B2 may be smaller than the depth D8 of the recess 315. The widths B1 and B2 of the second light exit surface 335 may be in a range of, for example, 1.5 mm to 2.3 mm. When the width B2 of the second light exit surface 335 exceeds the above range, an amount of light emitted to the second light exit surface 335 is increased, and thus, a light distribution control is difficult. The region having the width B2 on the second light exit surface 335 may be used as a gate region when a lens body is manufactured.

In the optical lens 300, the second light exit surface 335 may be provided around a lower circumference of the first light exit surface 330, and the bottom surface 310 may be provided to be lower than the second edge 25 of the second light exit surface 335. The bottom surface 310 may protrude more downward than the horizontal line of the second edge 25 of the second light exit surface 335. As another example of the optical lens 300, the second light exit surface 335 may have an uneven surface. The uneven surface may be a rough haze surface. The uneven surface may be a surface on which scattered particles are formed. As another example of the optical lens, the bottom surface 310 may have an uneven surface. The uneven surface of the bottom surface 310 may be a rough haze surface or a surface on which scattered particles are formed.

As illustrated in FIG. 37, the optical lenses according to the embodiment may be provided on the circuit board 400 in the first axis direction by certain intervals. As illustrated in FIGS. 26 and 27, these optical lenses are provided in the first axis direction where the bottom length (D4<D3) of the recess 315 is wide. Thus, the number of optical lenses may be reduced while widening the interval between the optical lenses. Also, due to the asymmetrical structure of the recess 315, the luminance distribution in the second axis (Y-axis) direction may be improved.

Referring to FIGS. 28 to 31, the optical lens 300B according to a seventh embodiment may include a bottom surface 310, a recess 315A which is convex upwardly from the bottom surface 310 in a center region of the bottom surface 310, a light incidence surface 320A provided around the recess 315A, first light exit surfaces 330A and 330B provided on a side opposite to the bottom surface 310A and the light incidence surface 320A, and second light exit surfaces 335A and 335B provided below the first light exit surfaces 330A and 330B.

The optical lens 300B may be formed such that a first length D22 in the second axis (Y-axis) direction of two axes (X-axis and Y-axis) passing the center of the bottom surface 310 has a maximum value and a first length D23 in the first axis (X-axis) direction has a minimum value. The bottom surface 310 of the optical lens 300A may have the first length D21 and the second length D22 in the first and second axes (X axis and Y axis), and the other shape thereof may be a shape in which two semicircles are connected together. On the first and second light exit surfaces 330A and 330B, the maximum length D21 in the X-axis direction may be greater than the length D23 in the X-axis direction of the bottom surface 310 on the center. The second light exit surfaces 335A and 335B adjacent to the bottom surface 310 may have one or more inflection points along a boundary divided by the center, for example, two semicircular shapes. Due to this, an outer shape of the bottom surface 310 may have an 8-shape or a shape in which two hemispheres are overlapped. The bottom surface 310 may include a flat inner region 312 and an inclined outer region 314, but is not limited thereto.

The recess 315A may be dented upward from the center region of the bottom surface 310, and a bottom length D4 of the recess 315A in the second axis direction may be less than a bottom length D3 thereof in the first axis direction. That is, the length D3 may be greater than the length D4. The bottom length of the recess 315A may have a relationship of D3>D4, and a difference therebetween may be in a range of 1.5 mm to 5 mm, for example, 1.5 mm to 3 mm. The bottom length D3 may be equal to or less than three times the bottom length D4, for example, equal to or less than twice the bottom length D4. A bottom length ratio D4:D3 of the recess 315A may have a difference in a range of 1:1.5 to 1:3. When the difference between the length D3 in the first axis direction and the length D4 in the second axis direction is smaller than the above range, the luminance improvement in the Y-axis direction may be slight. When the difference between the length D3 in the first axis direction and the length D4 in the second axis direction is greater than the above range, the luminance distribution in the X-axis direction may be relatively reduced. Also, even when the length difference between the bottom lengths D3 and D4 of the recess 315A is not great, the light emitted from the light source, for example, the light emitting device, may induce the improvement in the light extraction efficiency in a direction perpendicular to a direction in which the length of the recess 315A is long, for example, in the Y-axis direction.

In the optical lens 300B according to the embodiment, the second length D22 in the second axis direction may be greater than the first length D21 in the first axis direction, and the bottom length D4 of the recess 315A in the second axis direction may be less than the bottom length D3 thereof in the first axis direction. Accordingly, due to the length difference in the outer shape, the optical lens 300B may secure a luminance distribution in the second axis direction, and the luminance distribution may be widely spread in the first axis direction and the edge region between the X-axis and the Y-axis by the recess 315A. Therefore, the number of bars of the light emitting module on which the optical lens 300B is provided may be reduced to two or less, for example, one, and luminance distributions of upper/lower corners in a backlight unit may be improved.

The light incidence surface 320A may be provided around the recess 315A and has a vertex 21. The bottom shape of the recess 315A may include an oval shape. A side sectional shape of the recess 315A may include a bell shape, a shell shape, or an oval shape. The recess 315A may have a shape in which a width becomes narrower upward. The recess 315A may have a shape which gradually converges from the first edge 23 of the bottom circumference toward a first vertex 21 of an upper end. When the bottom view of the recess 315 is an oval shape, a diameter thereof may be gradually reduced toward the first vertex 21. The recess 315A may have an axially symmetrical shape with respect to the central axis Z0. The first vertex 21 of the light incidence surface 320A may have a dot shape.

Bottom lengths D3 and D4 of the recess 315A may have a width where a light source, that is, a light emitting device described later, can be inserted. The bottom lengths D3 and D4 of the recess 315A may be equal to or less than three times the width of the light emitting device, for example, equal to or less than 2.5 times the width of the light emitting device. The bottom lengths D3 and D4 of the recess 315A may be in a range of 1.2 to 2.5 times the width of the light emitting device. When the bottom lengths D3 and D4 of the recess 315A are less than this range, the insertion of the light emitting device is not easy. When the bottom lengths D3 and D4 of the recess 315A are greater than this range, it is possible to reduce light loss or light interference through a region between the light emitting device and the first edge 23.

The first light exit surfaces 330A and 330B may have two curved surfaces or a spherical shape by an inflection part of the center region 336 in the Y-axis direction. The width and the vertex 31A of the center region 336 may be lower than those of the first and second light exit surfaces 330A and 330B. The first light exit surfaces 330A and 330B have at least one inflection point between 30% and 70% with respect to the effective diameter. Also, the thickness at the center of the optical lens 300A may always have a minimum value. The second light exit surface 335A may be flat or inclined at the outer circumference of the optical lens 300A.

The second light exit surfaces 335A and 335B of the optical lens 300B may be provided at a higher position than the axis parallel to the bottom of the recess 315A. The second light exit surface 335A may be a flat surface or an inclined surface and may be defined as a flange, but is not limited thereto. The second light exit surfaces 335A and 335B may be provided to be perpendicular or inclined with respect to the parallel axis. The second light exit surfaces 335A and 335B may extend to be perpendicular or inclined from the outer line of the first light exit surfaces 330A and 330B. The second light exit surface 335A may include a third edge 35 adjacent to the first light exit surfaces 330A and 330B, and the third edge 35 may be provided at the same position as the outer line of the first light exit surfaces 330A and 330B or may be provided to be more inner or outer than the first light exit surfaces 330A and 330B.

Figure 30:
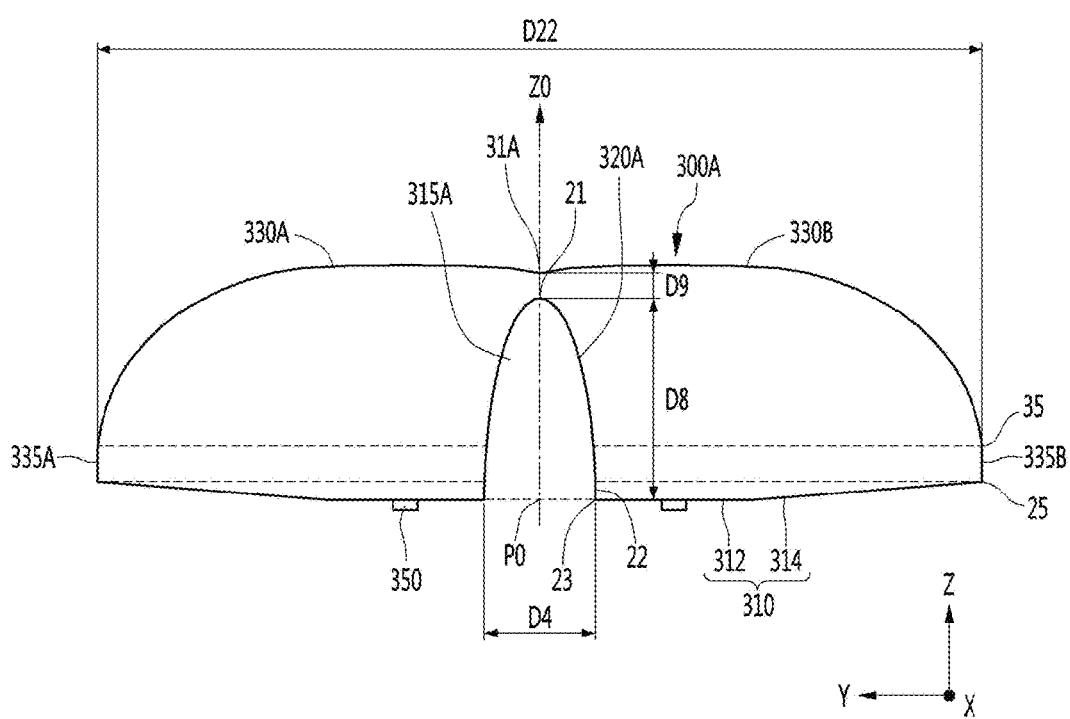
FIG. 30 is a sectional view of the optical lens, taken along line F''-F'' of FIG. 28.
Figure 31:
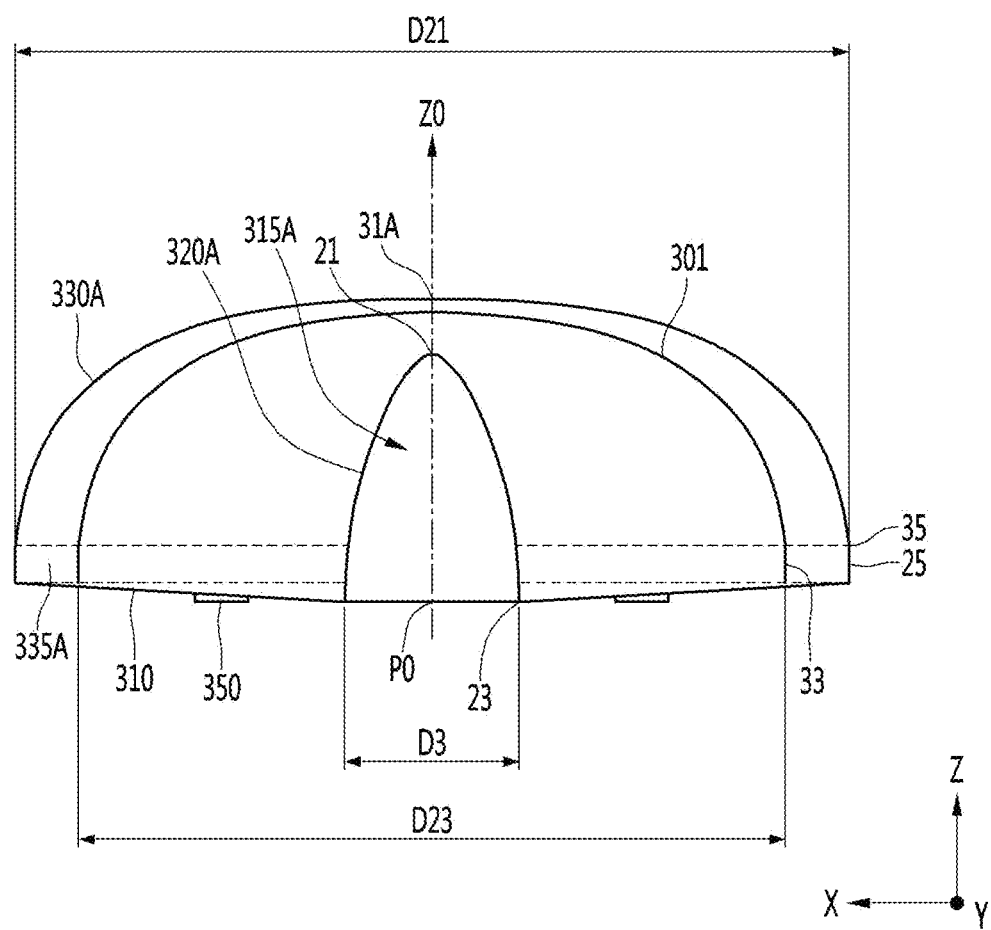
FIG. 31 is a sectional view of the optical lens, taken along line E'-E' of FIG. 28.

As illustrated in FIGS. 30 and 31, the depth D8 of the recess 315A has an interval from the bottom center P0 to the first vertex 21. The first vertex 21 may be a vertex of the light incidence surface 320A or an upper end point of the recess 315A. The depth D8 of the recess 315A may be 5 mm or more, for example, 6 mm or more, and may be 75% or more of the thickness D5 of the optical lens 300A, for example, 80% or more of the thickness D5 of the optical lens 300A. The depth D8 of the recess 315 may be equal to or greater than 80% of the distance between the second vertex 31A of the first light exit surfaces 330A and 330B and the bottom center P0 or the first edge 23. Since the depth D8 of the recess 315A is deep, light may be diffused to a region adjacent to the first vertex 21 of the light incidence surface 320A in a lateral direction even though the center region of the first light exit surfaces 330A and 330B do not have a total reflection surface or a negative curvature. Since the recess 315A has a deep depth D8, the light incidence surface 320A may refract light incident from a region close to the second vertex 31A to a peripheral region of the first vertex 21 in a lateral direction.

A minimum distance D9 between the recess 315A and the first light exit surfaces 330A and 330B may be an interval between the first vertex 21 of the light incidence surface 320A and the second vertex 31A of the first light exit surfaces 330A and 330B. The distance D9 may be 3 mm or less, for example, in a range of 0.6 mm to 3 mm, or 0.6 mm to 2 mm. When the distance D9 between the first vertex 21 of the light incidence surface 320A and the second vertex 31A is 3 mm or more, a difference in an amount of light may be increased according to a region and a light distribution may not be uniform. When the distance D9 between the first vertex 21 of the light incidence surface 320A and the second vertex 31A of the first light exit surfaces 330A and 330B is less than 0.6 mm, the stiffness on the center of the optical lens 300A is weakened. By disposing the distance D9 between the recess 315A and the first light exit surfaces 330A and 330B in the above range, an optical path may be diffused in an outward direction. As the first vertex 21 of the light incidence surface 320A is closer to the convex second vertex 31A of the first light exit surfaces 330A and 330B, it is possible to increase an amount of light traveling in a lateral direction of the first light exit surfaces 330A and 330B through the light incidence surface 320A. Accordingly, it is possible to increase an amount of light diffusing in a lateral direction of the optical lens 300A, for example, the X-axis direction.

The first vertex 21 of the light incidence surface 320A may be provided to be more adjacent to the second vertex 31A between the first light exit surfaces 330A and 330B than the straight line extending in parallel from the third edge 35 of the second light exit surface 335A. In the optical lens 300B, the second light exit surfaces 335A and 335B may be provided around a lower circumference of the first light exit surfaces 330A and 330B, and the bottom surface 310 may be provided to be lower than the second edge 25 of the second light exit surfaces 335A and 335B. The bottom surface 310 may protrude more downward than the horizontal line of the second edge 25 of the second light exit surfaces 335A and 335B. As another example of the optical lens 300B, the second light exit surfaces 335A and 335B may have an uneven surface. The uneven surface may be a rough haze surface. The uneven surface may be a surface on which scattered particles are formed. As another example of the optical lens 300B, the bottom surface 310 may have an uneven surface. The uneven surface of the bottom surface 310 may be a rough haze surface or a surface on which scattered particles are formed.

As illustrated in FIG. 37, the optical lenses 300B according to the embodiment may be provided on the circuit board 400 in the first axis (X-axis) direction by certain intervals. As illustrated in FIGS. 30 and 31, these optical lenses 300B are provided in the first axis direction where the bottom length (D4<D3) of the recess 315A is wide. Thus, the number of optical lenses 300B may be reduced while widening the interval between the optical lenses 300B. Also, due to the asymmetrical structure of the recess 315A, the luminance distribution in the second axis (Y-axis) direction may be improved.

Figure 33:
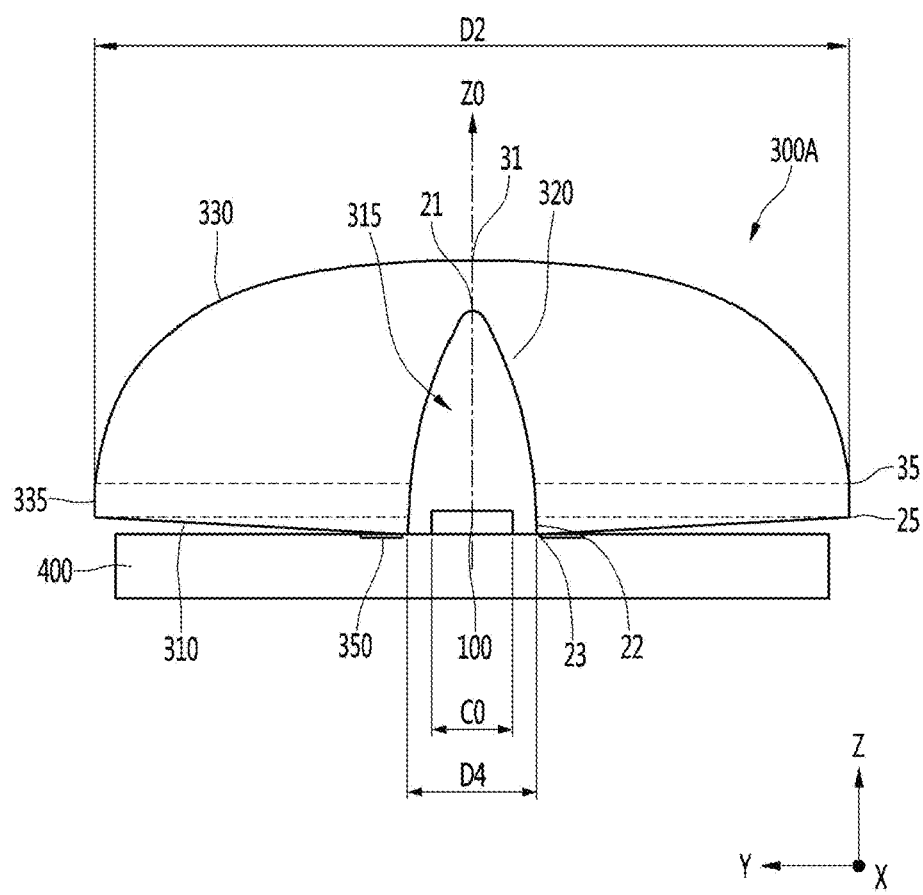
FIG. 33 is a sectional view of the light emitting module, taken along line G'-G' of FIG. 32.
Figure 34:
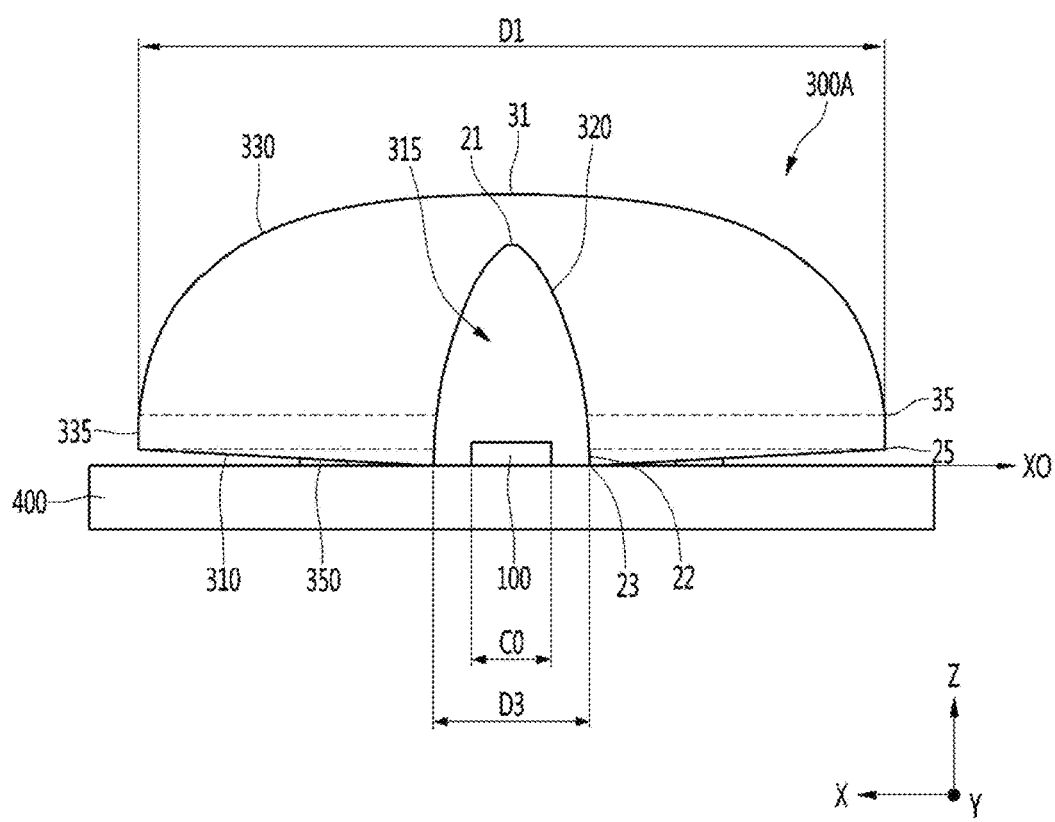
FIG. 34 is a sectional view of the light emitting module, taken along line H'-H' of FIG. 32.

Referring to FIGS. 32 to 34, a light emitting module 400A may include a plurality of optical lenses 300A provided on a circuit board 400, and at least one light emitting device 100 may be provided in the optical lens 300A. One or more light emitting devices 100 may be provided on the circuit board 400 by certain intervals. The light emitting device 100 is provided between the optical lens 300A and the circuit board 400. The light emitting device 100 is driven by power supplied from the circuit board 400 and emits light. The circuit board 400 may include a circuit layer electrically connected to the light emitting device 100. The circuit board 400 may include at least one of a PCB made of a resin material, a metal core PCB (MCPCB), and a flexible PCB (FPCB), but is not limited thereto.

The optical lens 300A receives light emitted from the light emitting device 100 and incident on the light incidence surface 320 and emits light through the first and second light exit surfaces 330 and 335. A part of the light incident from the light incidence surface 320 may pass through a certain path, be reflected by the bottom surface 310, and be emitted to the first light exit surface 330 or the second light exit surface 335. An orientation angle of the light emitting device 100 may be a unique orientation angle of the light emitting device 100, and light may be emitted at 130 degrees or more, for example, 136 degrees or more. The light emitting device 100 may emit light through a top surface and a plurality of side surfaces. That is, the light emitting device 100 may have five or more light exit surfaces. The light emitted from the light emitting device 100 may be radiated at an orientation angle spread through the first and second light exit surfaces 330 and 335.

In the optical lens 300A, the light incidence surface 320 may be provided outside the top surface and the side surfaces of the light emitting device 100. A lower region 22 of the light incidence surface 320 of the optical lens 300A may be provided to face the plurality of side surfaces of the light emitting device 100. Accordingly, the light emitted through each side surface of the light emitting device 100 may be incident on the light incidence surface 320 without leakage.

Since the light emitting device 100 has at least five light exit surfaces, the orientation angle distribution of the light emitting device 100 may be widened by the light emitted through the side surfaces. Since the orientation angle distribution of the light emitting device 100 is widely provided, the light diffusion using the optical lens 300A may be more facilitated. The orientation angle distribution from the optical lens 300 may be greater than an angle formed by two straight lines passing through the third edge 35 of the second light exit surface 335 of the optical lens 300 from the central axis P0. The orientation angle distribution from the optical lens 300A includes an orientation distribution of light emitted through the second light exit surface 335. Thus, due to the distribution of light emitted from the second light exit surface 335, light loss may be reduced and a luminance distribution may be improved.

In the size C0 of the light emitting device 100, the lengths in the first axis (X-axis) direction and the second axis (Y-axis) direction may be equal to or different from each other. For example, as illustrated in FIG. 36, the light emitting device 100 may be provided in the recess 315. As another example, as illustrated in FIG. 37, in the light emitting device 100A, the length C2 in the second axis direction may be greater than the length C1 in the first axis direction so as to correspond to the width of the recess 315. Due to the length difference C1 and C2 of the side surfaces, the light emitting device 100A is more adjacent to the light incidence surface 320 of the recess 315, thereby improving light incidence efficiency.

The bottom surface 310 of the optical lens 300A may provide an inclined surface with respect to the top surface of the circuit board 400. The bottom surface 310 of the optical lens 300A may be provided as an inclined surface with respect to the first axis (X-axis). 80% or more of the bottom surface 310, for example, 100% of the bottom surface 310, may be inclined with respect to the top surface of the circuit board 400. The bottom surface 310 may include a total reflection surface. The top surface of the circuit board 400 may be provided to be more adjacent to the first edge 23 than the second edge 25 of the bottom surface 310 of the optical lens 300A. The first edge 23 of the bottom surface 310 may contact the top surface of the circuit board 400, and the second edge 25 may be maximally spaced apart from the top surface of the circuit board 400. The first edge 23 may be provided at a lower position than an active layer in the light emitting device 100.

The first and second light exit surfaces 330 and 335 of the optical lens 300A may refract and emit incident light. The entire first light exit surface 330 may have a curved surface from which light is emitted. The first light exit surface 330 may include a curved surface continuously connected from the second vertex 31. The first light exit surface 330 reflects or refracts incident light and emits the reflected or refracted light to the outside. An emission angle of light emitted to the first light exit surface 330 may be greater after refraction than an incidence angle before refraction with respect to the central axis Z0

The second light exit surface 335 refracts light such that an angle of the light after refraction is smaller than an angle of incident light before refraction with respect to the central axis Z0. Accordingly, a long optical interference distance between the adjacent optical lenses 300A may be provided, and a part of light emitted through the second light exit surface 335 and light emitted to the first light exit surface 330 may be mixed in the vicinity of the optical lens 300A.

The second light exit surface 335 is provided around a lower circumference of the first light exit surface 330 to refract and emit incident light. The second light exit surface 335 includes an inclined surface or a flat surface. The second light exit surface 335 may be a surface perpendicular or inclined with respect to the top surface of the circuit board 400. When the second light exit surface 335 is an inclined surface, separation is facilitated at the time of injection molding. The second light exit surface 335 receive, refracts, and extract a part of light emitted to the side surface of the light emitting device 100. In this case, the second light exit surface 335 refracts light such that an exit angle of the emitted light is smaller than an incidence angle before refraction with respect to the central axis Z0. Accordingly, a long optical interference distance between the adjacent optical lenses 300A may be provided.

The optical lens 300A according to the embodiment may have a structure in which the bottom length of the recess 315 in the first axis direction is longer than the bottom length thereof in the second axis direction, and may be provided on the circuit board 400 in the X-axis direction. Accordingly, light emitted from the light emitting device 100 to the recess 315 may be diffused in the first axis direction within the recess 315 and then spread in the second axis direction and toward the edge region. According to the embodiment, the recess 315 having an asymmetrical structure makes it possible to further diffuse light in a certain axis direction, thereby reducing the number of bars of the light emitting module. One or more support protrusions 350 provided below the optical lens 300A may protrude downward from the bottom surface 310, that is, in a direction of the circuit board 400. The support protrusions 350 may be fixed on a plurality of circuit boards 400 to prevent the optical lens 300 from being tilted.

Figure 35:
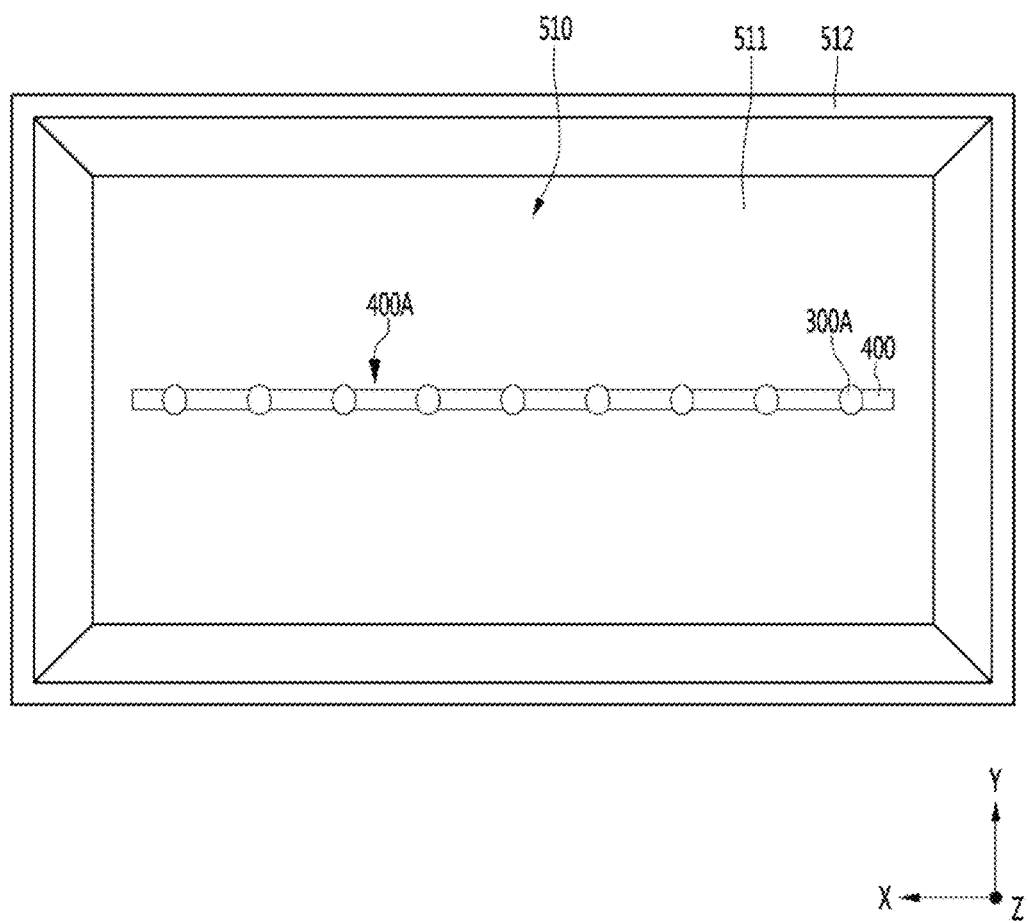
FIG. 35 is a plan view of a light unit including the light emitting module of FIG. 32.

Referring to FIG. 35, a light unit may include a bottom cover 510, a plurality of circuit boards 400 provided in the bottom cover 510 as a light emitting module 400A, a light emitting device 100, and optical lenses 300A provided on the plurality of circuit boards 400. The plurality of circuit boards 400 may be provided on a bottom 511 of the bottom cover 510. A side cover 512 of the bottom cover 510 may reflect light emitted from the light emitting module 400A, or may reflect light toward a display panel. In the light emitting module 400A, two or less circuit boards 400, for example, one circuit board 400, may be provided in the bottom cover 510. The circuit board 400 may include a circuit layer electrically connected to the light emitting device 100.

The bottom cover 510 may include a metal or a thermally conductive resin material for heat dissipation. The bottom cover 510 may include an accommodation portion, and a side cover may be provided around the accommodation portion. A reflection sheet may be provided on the circuit board 400. The reflection sheet may be made of, for example, PET, PC, PVC resin, or the like, but is not limited thereto. An optical sheet may be provided on the bottom cover 510. The optical sheet may include at least one of prism sheets configured to collect dispersed light, a brightness enhancement sheet, and a diffusion sheet configured to diffuse light again. A light guide layer made of a transparent material may be provided in a region between the optical sheet and the light emitting module.

Figure 51A:
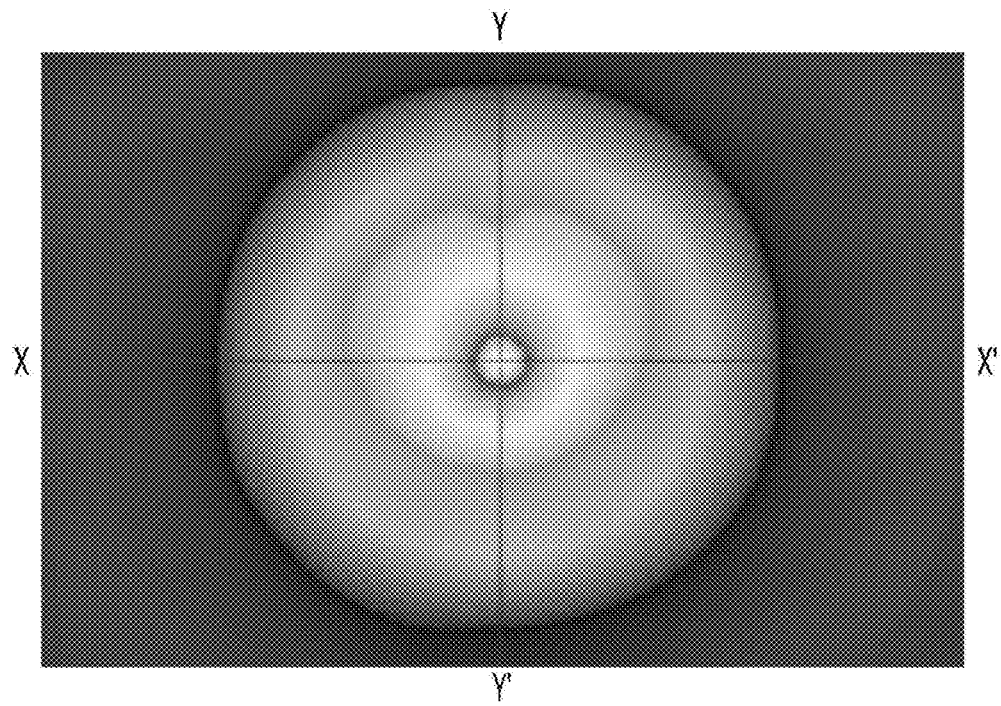
FIG. 51A and FIG. 51B are views illustrating a comparison of luminance distributions of optical lenses according to an embodiment and a comparative example.
Figure 51B:
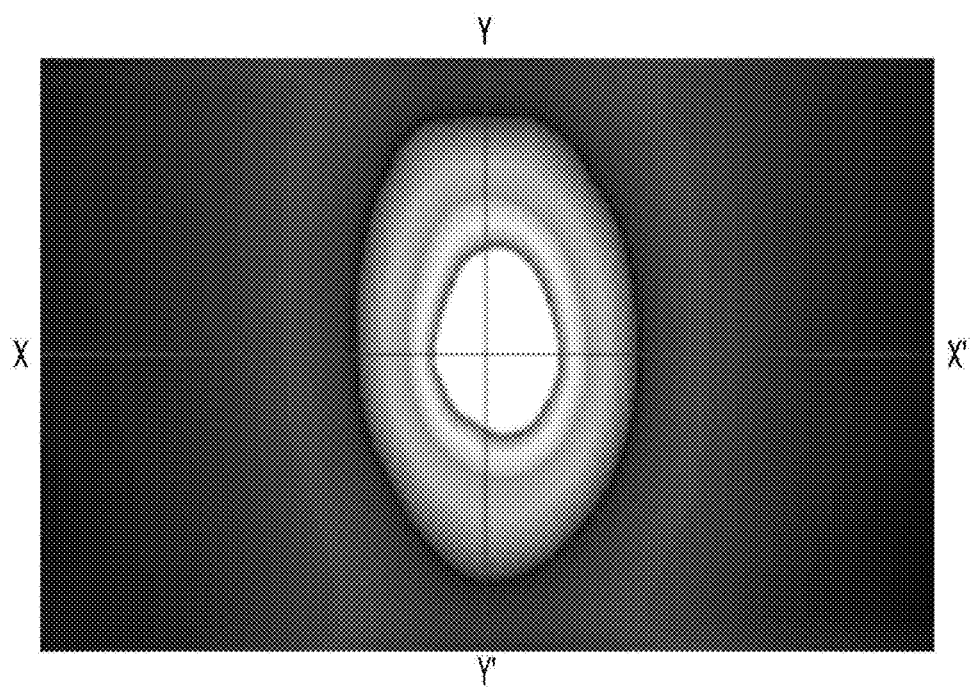

FIG. 51A is a view illustrating a luminance distribution of an optical lens according to a comparative example, and FIG. 51B is a view illustrating a luminance distribution of the optical lens according to the fifth embodiment. As illustrated in FIG. 51B, it can be seen that the luminance distribution of the optical lens according to the fifth embodiment is wide in a Y-Y' axis direction and diffused in an X-X' axis direction.

Figure 52A:
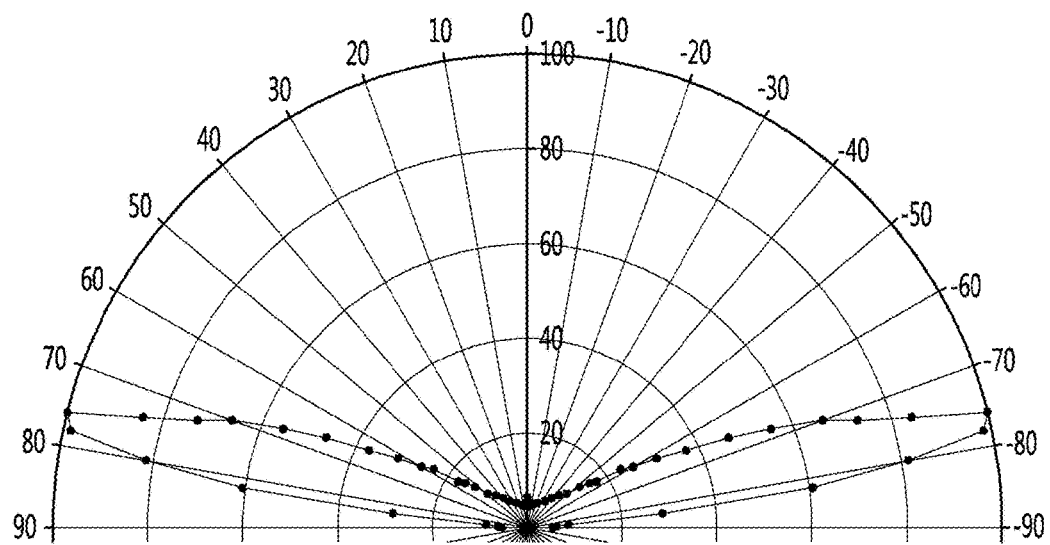
FIG. 52A and FIG. 52B are views illustrating a comparison of radiation patterns of optical lenses according to an embodiment and a comparative example.
Figure 52B:
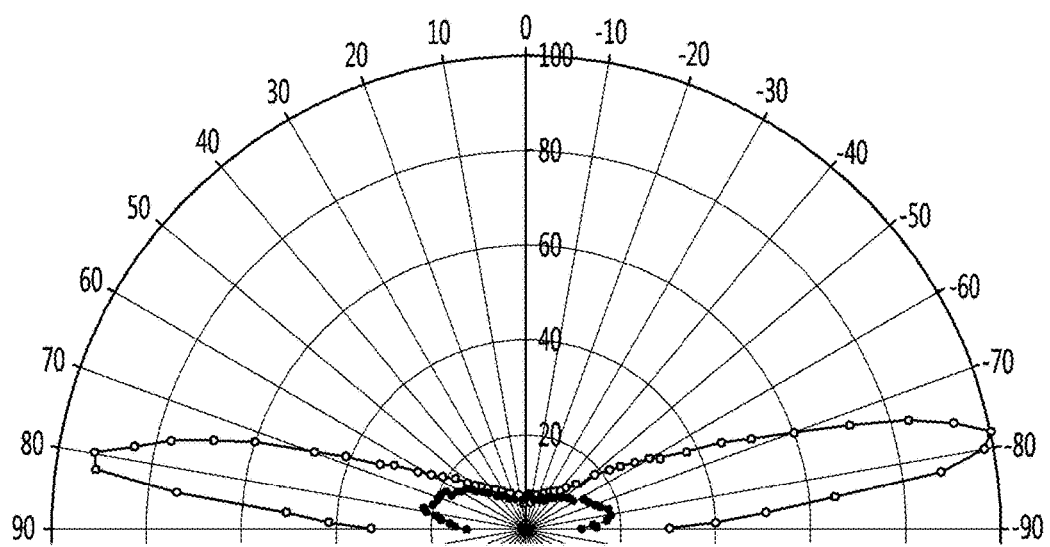

FIGS. 52A and 52B are views illustrating a comparison of radiation patterns of the optical lenses according to the comparative example and the fifth embodiment. It can be seen that the optical lens according to the comparative example has the same radiation pattern, but the radiation pattern of the optical lens according to the fifth embodiment has different sizes in the Y-Y' axis direction (FIG. 51B) and the X-X' axis direction (FIG. 51B). It can be seen that, after light is diffused in a specific axis direction, the light can be diffused in another axis direction.

Figure 53:
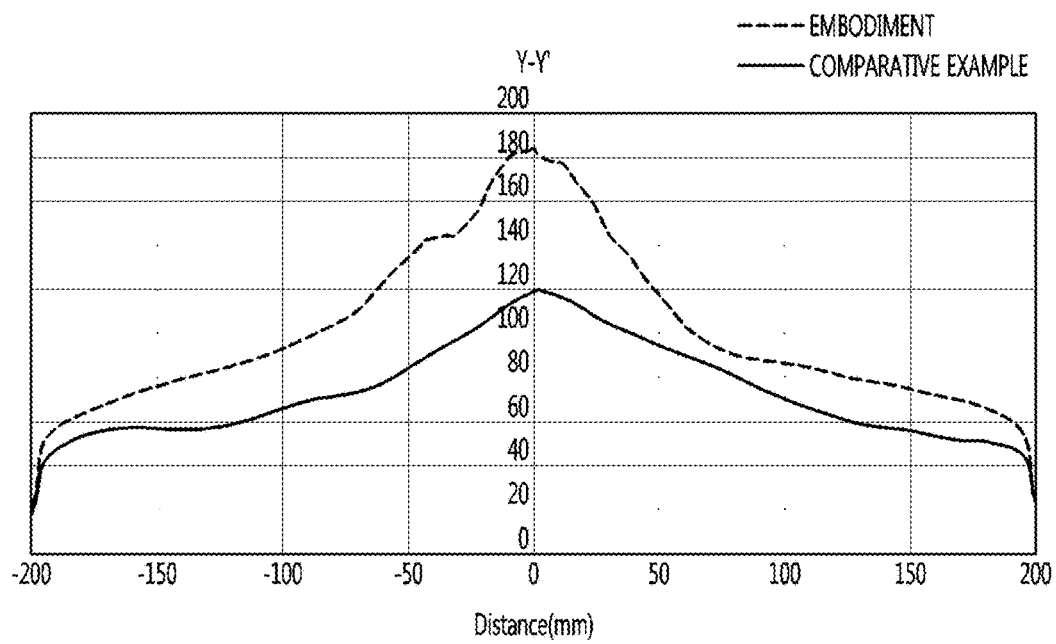
FIG. 53 is a graph showing luminance distributions in an X-X' axis direction of FIG. 51A and FIG. 51B.
Figure 54:
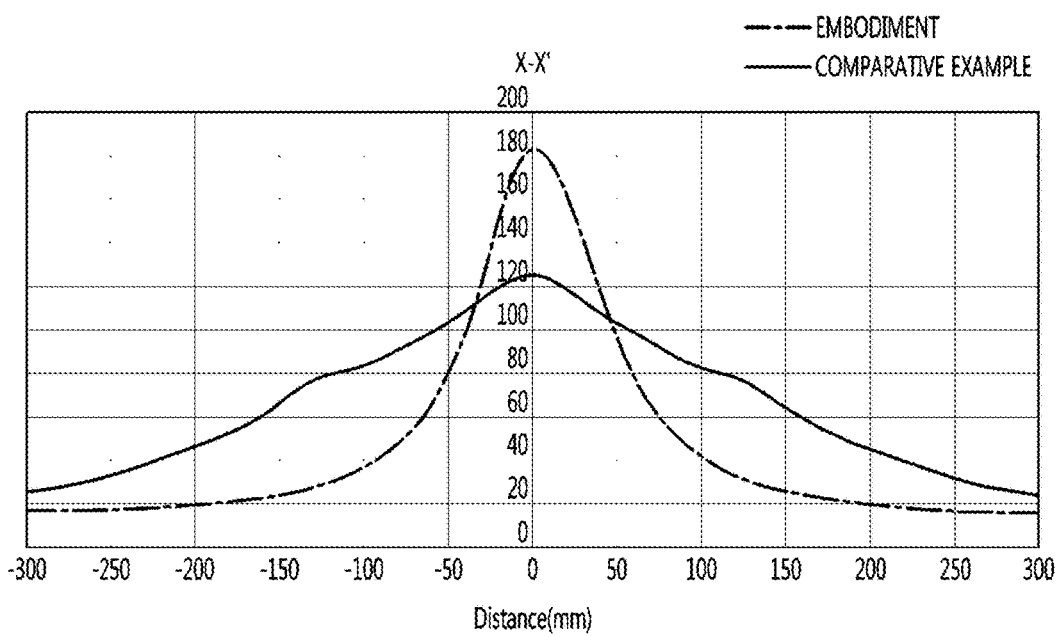
FIG. 54 is a graph showing luminance distributions in a Y-Y' axis direction of FIGS. 51A and 51B.

FIG. 53 is a view illustrating X-X' axis luminance distributions of the optical lenses according to the comparative example and the fifth embodiment, and FIG. 54 is a view illustrating X-X' axis luminance distributions of the optical lenses according to the comparative example and the fifth embodiment. It can be seen that the luminance distribution of the optical lens according to the fifth embodiment is higher in the Y-Y' axis direction of FIG. 51 and is higher within a specific distance in the X-X' axis direction. As illustrated in FIGS. 53 and 54, the Y-Y' axis is an axis direction in which the length of the recess is long and exhibits a relatively high light distribution, and the X-X' axis is an axis direction in which the length of the recess is short and exhibits a relatively narrow light distribution.

Figure 55:
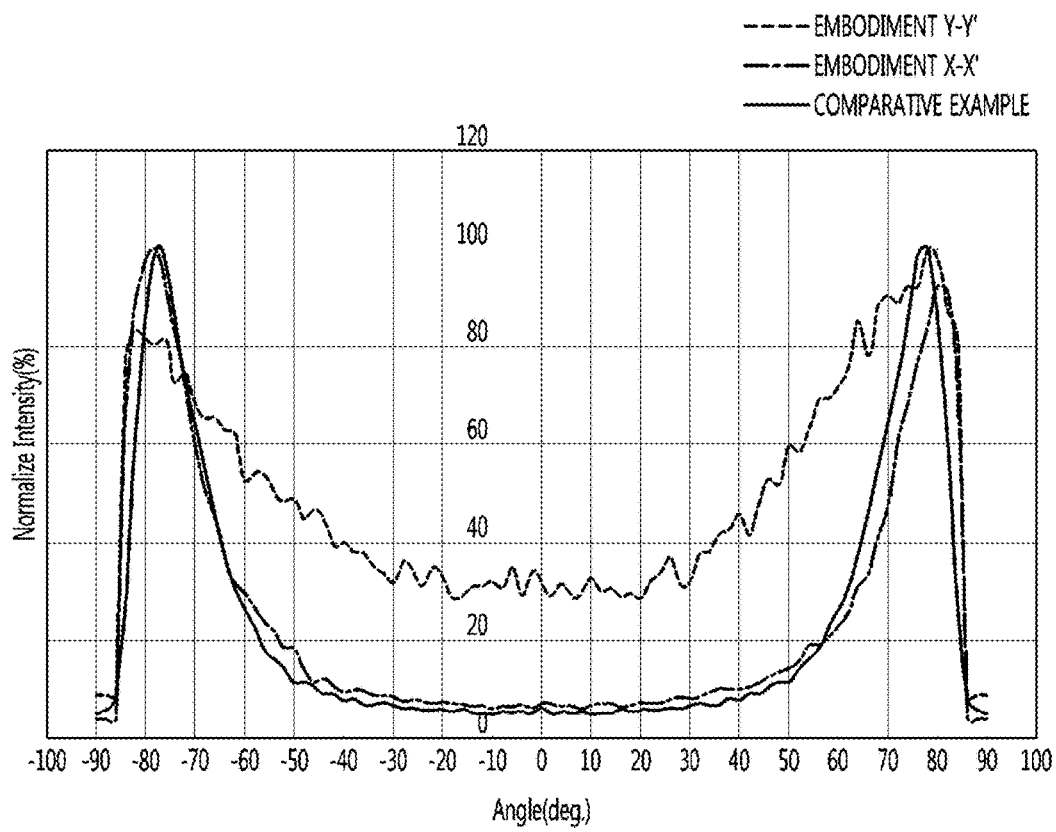
FIG. 55 is a view illustrating a comparison between light intensity of the optical lens according to an embodiment and light intensity of the optical lens according to a comparative example in X-X' and Y-Y' axis directions.

FIG. 55 is a view illustrating a comparison between light intensity of the optical lens according to the fifth embodiment and light intensity of the optical lens according to the comparative example (FIG. 51A) in X-X' and Y-Y' axis directions. It can be seen that the light intensity of the optical lens according to the fifth embodiment in the X-X' axis direction is high and the light intensity thereof in the Y-Y' axis direction is dispersed. Here, it can be seen that the symmetrical radiation pattern is 156 degrees or less, and the radiation pattern of the asymmetrical lens according to the embodiment is 160 degrees or less. Also, it can be seen that the asymmetrical lens exhibits a wider half width at half maximum (FWHM) in a side beam.

Figure 56:
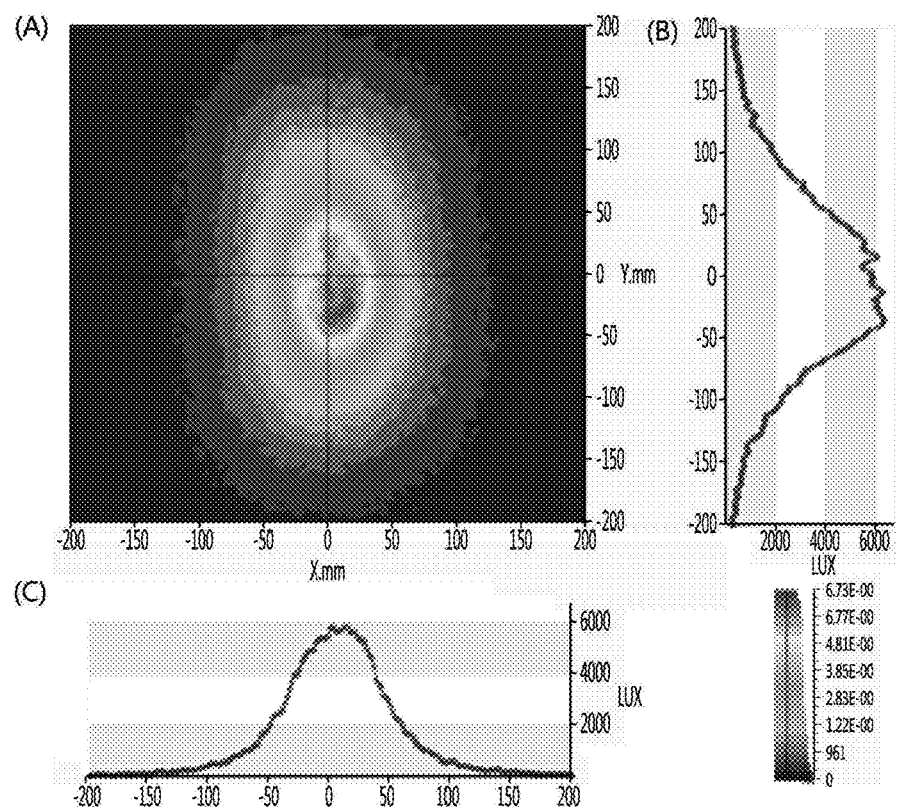
FIG. 56 is a view illustrating a luminance distribution and light intensity in each axis direction in a light emitting module including an optical lens according to another embodiment.
Figure 57:
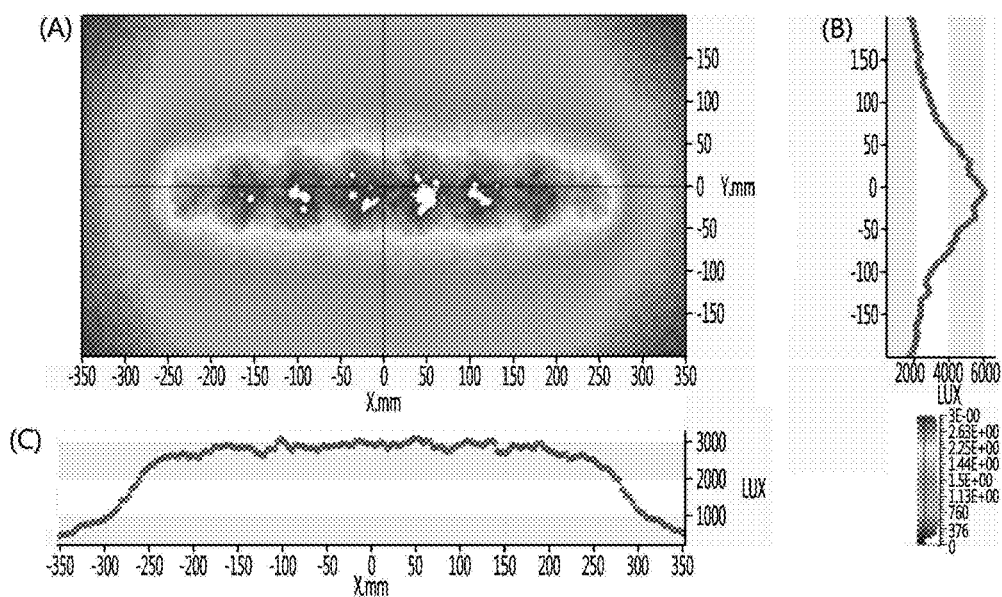
FIG. 57 is view illustrating a luminance distribution and light intensity in each axis direction in the light unit including the optical lens of FIG. 56.

FIG. 56 is a view illustrating a luminance distribution and light intensity in each axis direction in the light emitting module including the optical lens according to the sixth embodiment, and FIG. 57 is view illustrating a luminance distribution and light intensity in each axis direction in the light unit including the optical lens of FIG. 56. Here, the light emitting module in the light unit is realized by 1 bar and light is dispersed in a uniform light distribution over an entire region. 15 or less light emitting devices, for example, 10 or less light emitting devices, may be provided within 1 bar.

Figure 58:
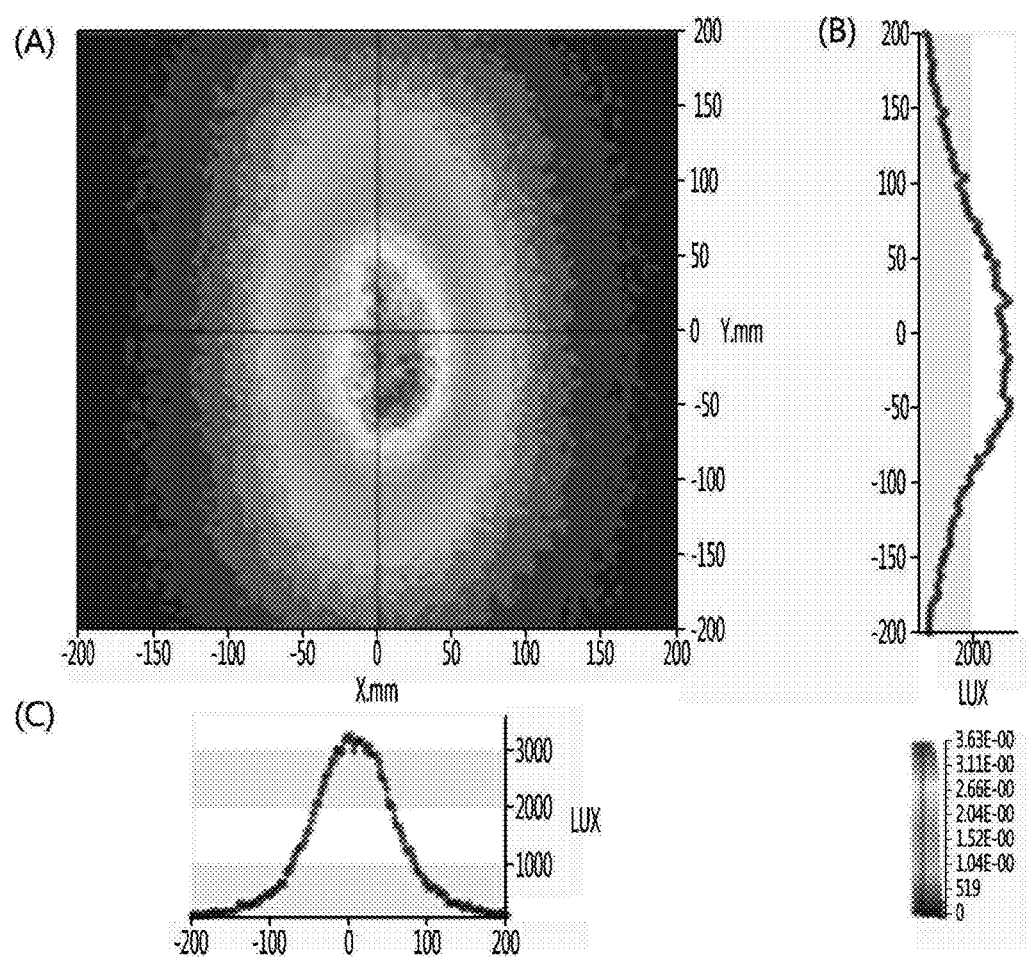
FIG. 58 is a view illustrating a luminance distribution and light intensity in each axis direction in a light emitting module including an optical lens according to another embodiment.
Figure 59:
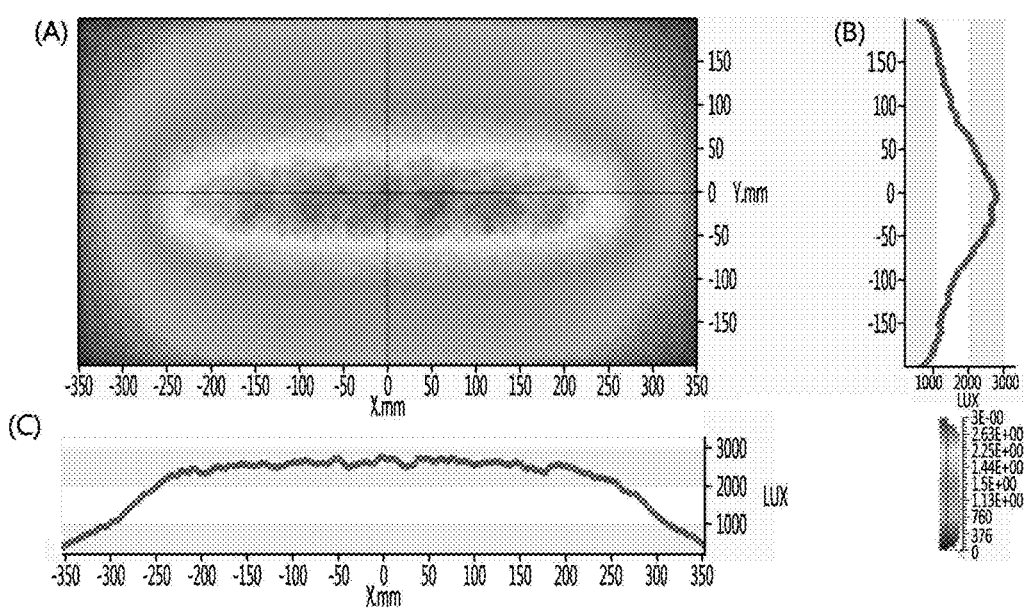
FIG. 59 is view illustrating a luminance distribution and light intensity in each axis direction in the light unit including the optical lens of FIG. 58.

FIG. 58 is a view illustrating a luminance distribution and light intensity in each axis direction in the light emitting module including the optical lens according to the seventh embodiment, and FIG. 59 is view illustrating a luminance distribution and light intensity in each axis direction in the light unit including the optical lens of FIG. 58. Here, the light emitting module in the light unit is realized by 1 bar and light is dispersed in a uniform light distribution over an entire region.

The optical lens according to the embodiment may include one or more lateral protrusions on the second light exit surface 335. As illustrated in FIG. 46, the lateral protrusions 360 and 361 may be provided on a line passing through the bottom center of the recess 315 in the first axis direction. The lateral protrusions 360 and 361 may be provided along a region of the circuit board 400 of FIG. 37. The lateral protrusions 360 and 361 of the plurality of optical lenses may protrude in the same axis direction. The lateral protrusions 360 and 361 may be a gate region.

Figure 47:
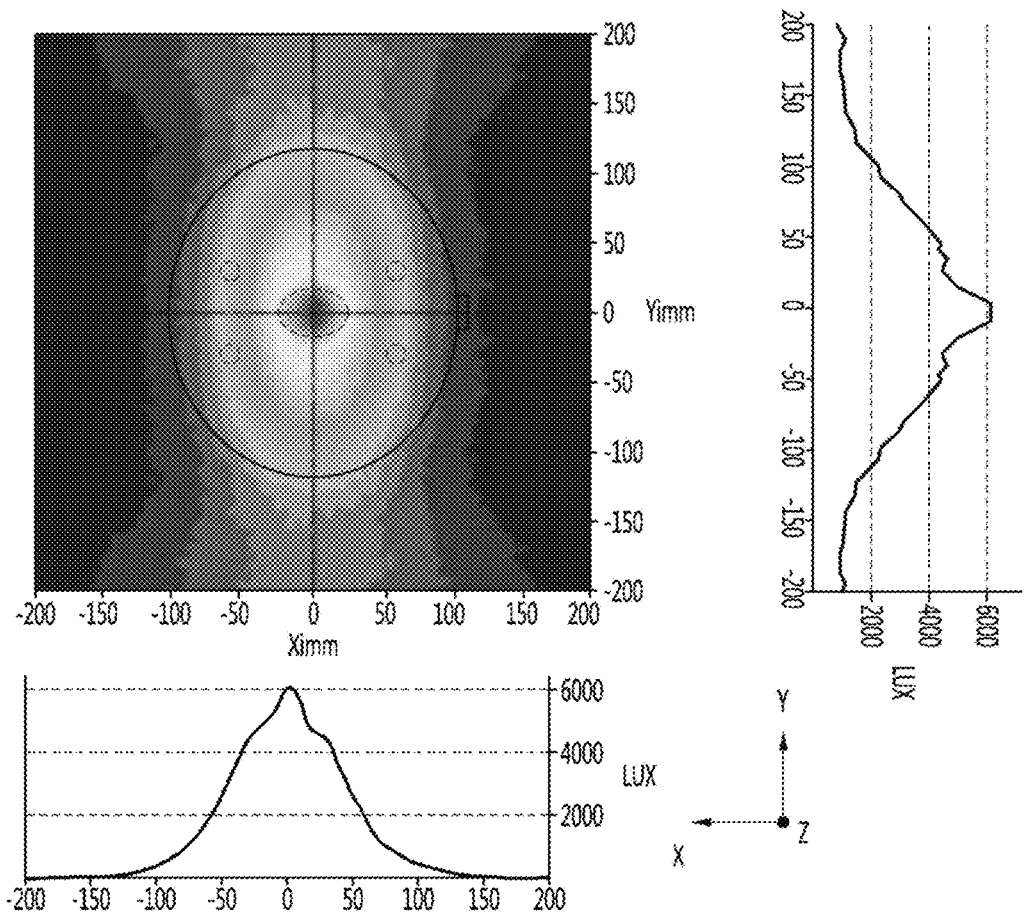
FIG. 47 is a view illustrating luminance distributions of the optical lenses of FIG. 7 and FIG. 8.

As another example, as illustrated in FIG. 47, the lateral protrusions 362 and 363 of the optical lens may protrude in opposite directions of the second light exit surface 335 with respect to the second axis direction. The lateral protrusions 362 and 363 of the optical lens may deviate from the region of the circuit board 400 of FIG. 37. The lateral protrusions 362 and 363 may be a gate region.

Figure 40:
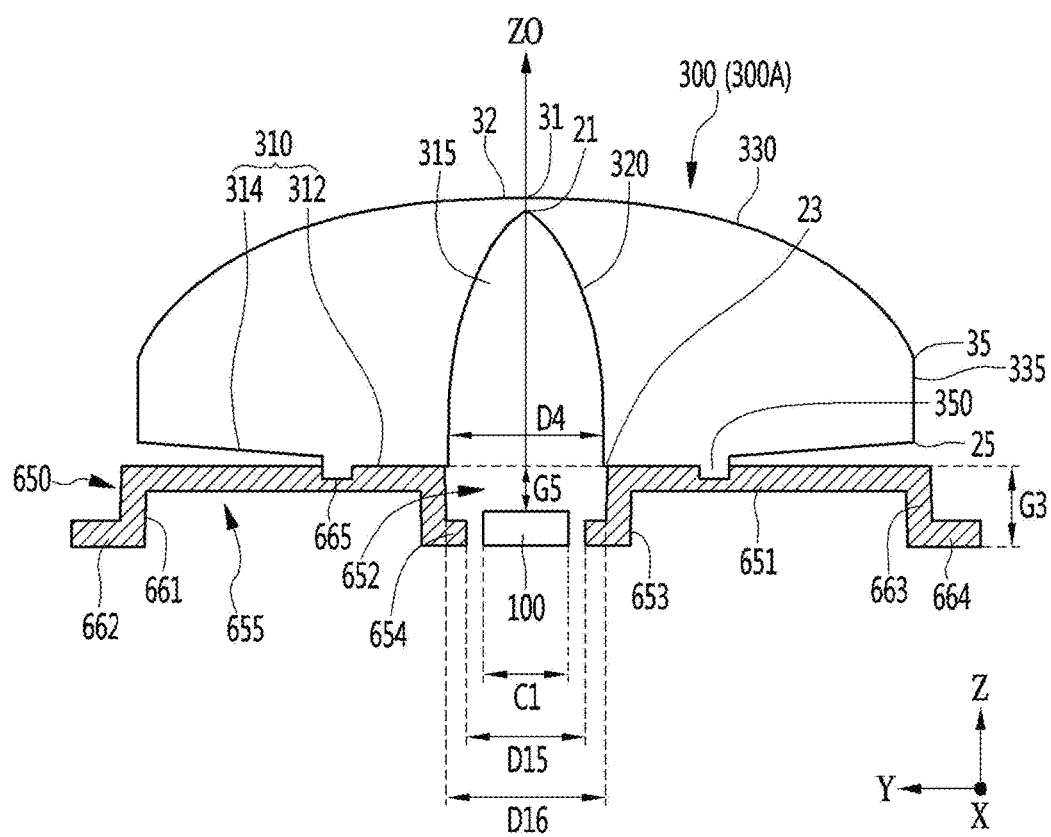
FIG. 40 is a side sectional view illustrating a coupling of an optical lens and a support plate as a light unit, according to another embodiment.

Referring to FIG. 40, a light unit may include a light emitting device 100, a fixing plate 650, and an optical lens 300. The fixing plate 650 may be a plate made of a metal material. The metal material may be one selected from Ag, Al, Au, Cr, Co, Cu, Fe, Hf, In, Mo, Ni, Si, Sn, Ta, Ti, W, and alloys thereof. The fixing plate 650 may be a single layer or a multi-layer.

Since the fixing plate 650 is equal to or greater than the width of the optical lens 300, for example, the length of the oval shape, light leakage can be prevented. The fixing plate 650 may include an opening 652, and a lower width D15 of the opening 652 may be narrower than an upper width D16 thereof. A bottom area of the opening 652 may be narrower than an upper area thereof. A height of the opening 652 may be greater than a thickness of the fixing plate 650. The thickness of the fixing plate 650 may be 0.35 mm or less, for example, in a range of 0.2 mm to 0.3 mm. When the thickness of the fixing plate 650 is thicker than the above range, the waste of materials is great. When the thickness of the fixing plate 650 is smaller than the above range, the function as a support member may be reduced.

The fixing plate 650 may be physically spaced apart from the light emitting device 100. The fixing plate 650 may be electrically separated from the light emitting device 100. The fixing plate 650 is provided around the light emitting device 100. The fixing plate 650 reflects light emitted from the light emitting device 100, protects the light emitting device 100, and supports the optical lens 300. An area of the top surface of a support portion 651 of the fixing plate 650 may be larger than a bottom area of the optical lens 300, thereby preventing leakage of light traveling from the optical lens 300 toward the top surface of the fixing plate 650.

The opening 652 of the fixing plate 650 may include a sidewall 653 bent from the support portion 651, and an extension portion 654 bent from the sidewall 653. The sidewall 653 is bent from the support portion 651 of the fixing plate 650 in a downward direction or a vertical direction. The extension portion 654 protrudes from the sidewall 653 in a direction of the light emitting device 100 or a direction of the center of the opening 652, that is, a horizontal direction.

A top view shape of the opening 652 may be a polygonal shape, for example, a rectangular shape. The top view shape of the opening 652 may be the same as the shape of the light emitting device 100. The top view shape of the opening 652 may be another shape, for example, a circular shape or an oval shape, but is not limited thereto. The upper and lower portions of the opening 652 are opened. The bottom view shape of the opening 652 may be a polygonal shape, for example, a rectangular shape. The bottom view shape of the opening 652 may be the same as the shape of the light emitting device 100. When the extension portion 654 is not present, the bottom length D15 of the opening 652 may be equal to or less than the upper width D16 thereof and may be greater than the width C1 of the light emitting device 100.

The upper width D16 of the opening 652 may be equal to or greater than one time the bottom length D15, for example, in a range of 1.2 to 1.5 times the bottom length D15. When a difference between the upper width D16 and the bottom length D16 is less than the above range, light extraction efficiency may be reduced. When a difference between the upper width D16 and the bottom length D16 is greater than the above range, the bottom length of the recess 315 of the optical lens 300 may be increased. The upper width D16 of the opening 652 may be 2 mm or less, for example, in a range of 1.4 mm to 1.8 mm. When the upper width D16 of the opening 652 is less than the above range, the area of the extension portion 654 of the opening 652 is reduced to deteriorate the support function of the opening 652. When the upper width D16 of the opening 652 is greater than the above range, the bottom area of the recess 315 of the optical lens 300 may be increased.

The bottom length of the recess 315 of the optical lens 300 may be equal to or less than the upper width D16 of the opening 652 of the fixing plate 650. Accordingly, light emitted through the opening 652 of the fixing plate 650 may be incident on the recess 315 of the optical lens 300 and a part of the light may be incident through a first bottom portion of the bottom surface. A part of the first bottom portion 312 of the bottom surface 310 of the optical lens 300 may overlap the opening 652 of the fixing plate 650 in a vertical direction.

A top surface position of the extension portion 654 of the opening 652 may be provided at a lower position than an active layer in the light emitting device 100, thereby reducing loss of light emitted through a side of the active layer. The top surface position of the extension portion 654 of the opening 652 may be provided at a position corresponding to ⅓ of the thickness of the light emitting device 100. When the top surface position of the extension portion 654 of the opening 652 is higher than the above range, loss of light emitted through the side of the light emitting device 100 may be increased.

The fixing plate 650 may include a fixing groove 665 or a support protrusion 350 as a coupling means. When the fixing groove 665 is provided as the coupling means of the fixing plate 650, the fixing groove 665 may be provided at a depth corresponding to ½ or less of the thickness of the fixing plate 650. A top view shape of the fixing groove 665 may be a circular shape, a polygonal shape, or an oval shape. A side sectional shape of the fixing groove 665 may be a polygonal shape or a hemispherical shape, but is not limited thereto. When the side sectional shape of the fixing groove 665 is a polygonal shape or a hemispherical shape, the coupling to the support protrusion 350 of the optical lens 300 may be facilitated. The side sectional shape of the support protrusion 350 of the optical lens 300 may be a shape coupled to the fixing groove 665, for example, a polygonal or a hemispherical shape. The support protrusion 350 of the optical lens 300 may be attached to the fixing groove 665 of the fixing plate 650 by an adhesive (not illustrated).

A top view shape of the fixing 665 and the support protrusion 350 may be a continuous shape or a discontinuous shape. The discontinuous shape may be provided so that two or more fixing grooves 665 or support protrusions 350 are spaced apart from each other along a circle. As another example, the support protrusion 350 may be provided in the fixing plate 650 and the fixing groove 665 may be provided in the optical lens 300.

The fixing plate 650 may include leg portions 661 and 663 bent downward from the support portion 651 supporting the optical lens 300, and the leg portions 661 and 663 may increase the position of the fixing plate 650. The leg portions 661 and 663 may include first and second leg portions 661 and 663 provided on opposite sides of the fixing plate 650, and the first and second leg portions 661 and 663 may be bent downward from the fixing plate 650. The first and second leg portions 661 and 663 may be bent to be inclined from the fixing plate 650 in a vertical direction or in a range of 90±10 degrees.

The fixing plate 650 may include fixing portions 662 and 664 bent from the leg portions 661 and 663. The fixing portions 662 and 664 include a first fixing portion 662 bent from the first leg portion 661 in a horizontal direction, and a second fixing portion 664 bent from the second leg portion 663 in a horizontal direction. The first and second fixing portions 662 and 664 are bent outward from the first and second leg portions 661 and 663, thereby providing a flat bottom surface. The first and second fixing portions 662 and 664 may be attached to another structure (for example, the circuit board) by an adhesive member. The first and second fixing portions 662 and 664 may be provided in a direction parallel to the fixing plate 650. The first and second fixing portions 662 and 664 fix both bottoms of the fixing plate 650, thereby preventing the movement of the fixing plate 650.

In the fixing plate 650, the first and second fixing portions 662 and 664 may be provided on both ends of the first axis direction. The fixing portions 662 and 664 and the leg portions 661 and 663 may not be provided on both ends of the second axis direction perpendicular to the first axis direction. As another example, the first and second fixing portions 662 and 664 may be bent from the first and second leg portions 661 and 663 in an inward direction or a inside/outside direction. When the first and second fixing portions 662 and 664 are bent from the first and second leg portions 661 and 663 in the inward direction, it may be possible to prevent the fixing plate 650 from drooping downward. When the first and second fixing portions 662 and 664 are bent from the first and second leg portions 661 and 663 in the inside or outside direction, a part of the first and second fixing portions 662 and 664 may be bent in the inside direction, and another part is bent in the outside direction, thereby preventing the fixing plate 650 from drooping. The bent portion in the fixing plate 650 may be bent to have an angled structure or a curved surface, but is not limited thereto. In the fixing plate 650, a gap region 655 may be provided between the sidewall 654 of the opening 652 and the first and second leg portions 661 and 663. The gap region 655 may space the fixing plate 650 apart by a certain interval.

The top surface height of the fixing plate 650 may be 1 mm or less, for example, in a range of 0.6 mm to 0.9 mm. When the height of the fixing plate 650 is less than the above range, the thickness of the fixing plate 650 is reduced and thus the function as the fixing plate 650 may be deteriorated. When the height of the fixing plate 650 is greater than the above range, the height of the light emitting unit may be increased. The top surface height of the fixing plate 650 may be provided to be higher than the top surface of the light emitting device 100, thereby supporting the light emitting device 100 provided in the fixing plate 650 and guiding the light emitted from the light emitting device 100 toward the optical lens 300.

A white layer may be formed on the top surface of the fixing plate 650. The white layer may be a layer in which metal oxide, for example, $SiO_2$, $Al_2O_3$, or $TiO_2$, is added to a resin material. The white layer may contact the first bottom portion 312 on the bottom surface 310 of the optical lens 300. The white layer may reflect light leaking from the bottom surface 310 of the optical lens 300.

Regarding the bottom surface 310 of the optical lens 300, the first bottom portion 312 may be provided on a region between the fixing groove 665 and the opening 652 of the fixing plate 650, and the second bottom portion 314 may be spaced apart from the top surface of the fixing plate 650. The configuration of the optical lens 300 according to the embodiment may be understood by referring to the configuration of the first embodiment. Since most of light emitted from the light emitting device 100 may be guided to the recess 315 of the optical lens 300 through the opening 652 of the fixing plate 650, it is possible to reduce lost light due to traveling toward only the bottom surface 310 of the optical lens 300. Accordingly, the width of the optical lens 300 may be made to be greater than the top surface of the fixing plate 650. The light emitting device 100 may be provided in the opening 652 of the fixing plate 650. Since the sidewall 654 of the opening 652 is provided around the light emitting device 100, it is possible to reflect light emitted from the light emitting device 100. A distance G5 between the light emitting device 100 and the bottom of the recess 315 of the optical lens 300 may be 1 mm or less, for example, 0.7 mm or less. Accordingly, the light emitted from the light emitting device 100 may be effectively incident on the recess 315 of the optical lens 300.

One or more fixing plates 650 may be provided on the circuit board 400 of FIG. 37. The fixing plates 650 may be provided with one or more rows. The light emitting device 100 may be connected to the circuit board 400. The fixing plate 650 may not be electrically connected to the circuit board 400. The first and second fixing portions 662 and 664 of the fixing plate 650 may be attached to the circuit board 400 by an adhesive member. The adhesive member may include a material such as a solder.

A phosphor film may be provided on the surface of the light emitting device 100. The phosphor film may include at least one of a blue phosphor, a cyan phosphor, a green phosphor, a yellow phosphor, and a red phosphor and may be provided with a single layer or a multi-layer. In the phosphor film, a phosphor is added to a light-transmitting resin material. The light-transmitting resin material may include a material such as silicon or epoxy, and the phosphor may be made of YAG, TAG, silicate, nitride, or oxynitride-based material. The phosphor film may include a phosphor such as a quantum dot. The quantum dot may include a group II-VI compound semiconductor or a group III-V compound semiconductor and may include at least one of blue, green, yellow, and red phosphors. The quantum dot is a nanoscale particle which may have optical characteristics generated from quantum confinement. Specific composition (s), structure, and/or size of the quantum dot may be selected so that light having a desired wavelength is emitted from the quantum dot at the time of stimulation using a specific excitation source. By changing the size of the quantum dot, light may be emitted over an entire visible spectrum. The quantum dot may include at least one semiconductor material. Examples of the semiconductor material may include a group IV element, a group II-VI compound, a group II-V compound, a group III-VI compound, a group III-V compound, a group IV-VI compound, a group I-III-VI compound, a group II-IV-VI compound, a group II-IV-V compound, an alloy thereof, and/or 3-membered and 4-membered mixtures or alloys thereof, and mixtures thereof. Examples of the quantum dot may be ZnS, ZnSe, ZnTe, CdS, CdSe, CdTe, GaN, GaP, GaAs, GaSb, InP, InAs, InSb, AlS, AlP, AlAs, PbS, PbSe, Ge, Si, CuInS$_2$, CuInSe$_2$, MgS, MgSe, MgTe, and combinations thereof.

Figure 41:
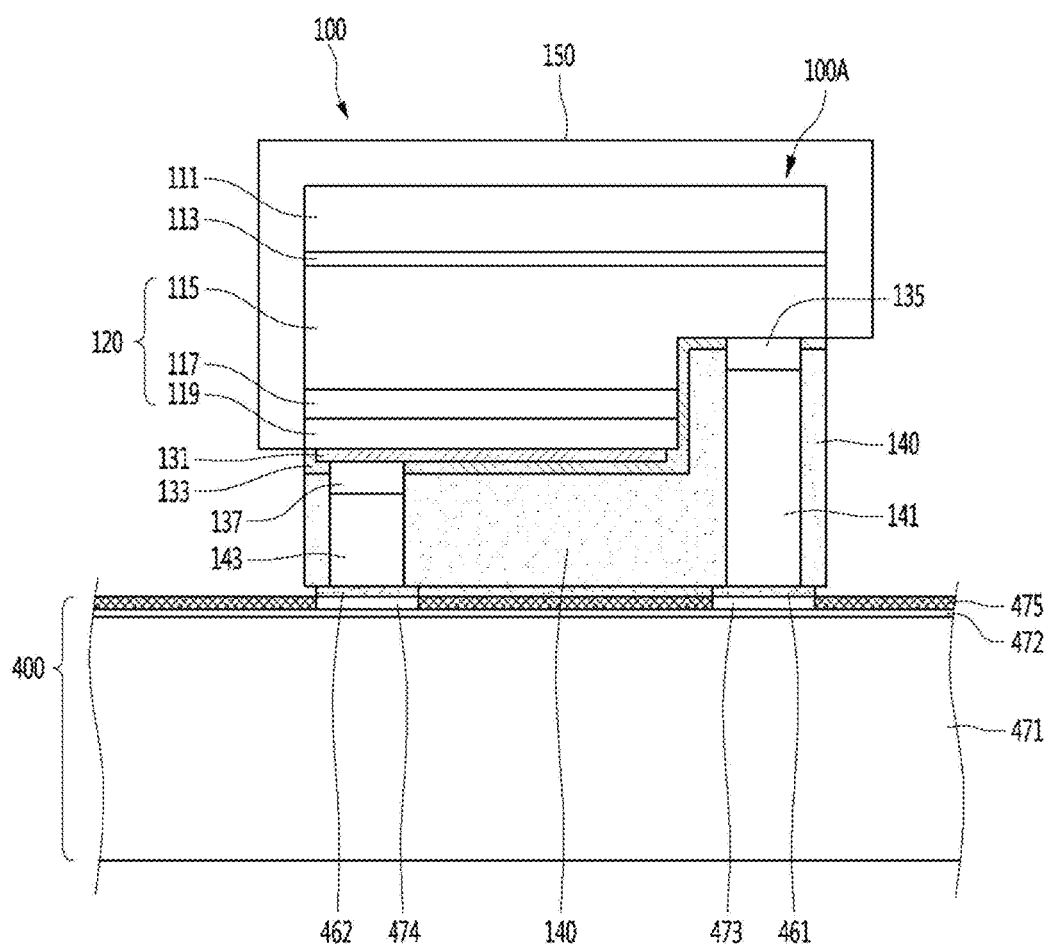
FIG. 41 is a view of a light emitting device of a light emitting module, according to an embodiment.

The light emitting device according to an embodiment will be described with reference to FIGS. 41 to 43. FIG. 41 is a view illustrating a first example of the light emitting device according to the embodiment. An example of the light emitting device and the circuit board will be described with reference to FIG. 41. Referring to FIG. 41, the light emitting device 100 may include a light emitting chip 100A. The light emitting device 100 may include the light emitting chip 100A and a phosphor layer 150 provided on the light emitting chip 100A. The phosphor layer 150 may include at least one of a blue phosphor, a green phosphor, a yellow phosphor, and a red phosphor and may be provided with a single layer or a multi-layer. In the phosphor layer 150, a phosphor is added to a light-transmitting resin material. The light-transmitting resin material may include a material such as silicon or epoxy, and the phosphor may be made of YAG, TAG, silicate, nitride, or oxynitride-based material.

The phosphor layer 150 may be provided on the top surface of the light emitting chip 100A, or may be provided on the top surface and the side surface of the light emitting chip 100A. The phosphor layer 150 may be provided on a region where light is emitted on the surface of the light emitting chip 100A, and may convert a wavelength of light.

The phosphor layer 150 may include a single phosphor layer or different phosphor layers. A first layer of the different phosphor layers may include at least one of a red phosphor, a yellow phosphor, and a green phosphor. A second layer of the different phosphor layers is formed on the first layer and may include a phosphor different from the first layer among the red phosphor, the yellow phosphor, and the green phosphor. The different phosphor layers may include phosphor layers of three layers or more, but is not limited thereto. The phosphor layer 150 may include a film type phosphor layer. Since the film type phosphor layer provides a uniform thickness, a color distribution according to a wavelength conversion may be uniform.

The light emitting chip 100A may include a substrate 111, a first semiconductor layer 113, a light emitting structure 120, an electrode layer 131, an insulating layer 133, a first electrode 135, a second electrode 137, a first connection electrode 141, a second connection electrode 143, and a support layer 140. The substrate 111 may be a light-transmitting substrate, an insulating substrate, or a conductive substrate and may use at least one of sapphire (Al$_2$O$_3$), SiC, Si, GaAs, GaN, ZnO, Si, GaP, InP, Ge, and Ga$_2$O$_3$. A plurality of convex portions (not illustrated) are formed on either or both of the top surface and the bottom surface of the substrate 111 to thereby improve light extraction efficiency. A side sectional shape of each convex portion may include at least one of a hemispherical shape, a semi-oval shape, and a polygonal shape. The substrate 111 may be removed from the light emitting chip 100A. In this case, the first semiconductor layer 113 or a first conductive semiconductor layer 115 may be provided as a top layer of the light emitting chip 100A.

The first semiconductor layer 113 may be formed under the substrate 111. The first semiconductor layer 113 may be formed using a compound semiconductor of group II to V elements. The first semiconductor layer 113 may be formed with a single layer or a plurality of layers using a compound semiconductor of group II to V elements. The first semiconductor layer 113 may include a semiconductor layer using a compound semiconductor of group III-V elements. For example, the first semiconductor layer 113 may include at least one of GaN, InN, AlN, InGaN, AlGaN, InAlGaN, AlInN, AlGaAs, GaP, GaAs, GaAsP, AlGaInP, and GaP. The first semiconductor layer 113 may have an empirical formula of In$_x$Al$_y$Ga$_{1-x-y}$N (0≤x≤1, 0≤y≤1, 0≤x+y≤1) and may include at least one of a buffer layer and an undoped semiconductor layer. The buffer layer may reduce a difference of a lattice constant between the substrate 111 and the nitride semiconductor layer, and the undoped semiconductor layer may improve the crystal quality of the semiconductor. Here, the first semiconductor layer 113 may not be formed.

The light emitting structure 120 may be formed under the first semiconductor layer 113. The light emitting structure 120 may be selectively formed using a compound semiconductor of group II to V elements and group III-V elements and may emit light of a certain peak wavelength in a wavelength range from an ultraviolet band to a visible band. The light emitting structure 120 may include a first conductive semiconductor layer 115, a second conductive semiconductor layer 119, and an active layer 117 between the first conductive semiconductor layer 115 and the second conductive semiconductor layer 119. Another semiconductor layer may be further provided above and/or under the respective layers 115, 117, and 119, but embodiments are not limited thereto.

The first conductive semiconductor layer 115 may be provided under the first semiconductor layer 113 and may be implemented by a semiconductor doped with a first conductive dopant, for example, an n-type semiconductor layer. The first conductive semiconductor layer 115 may have an empirical formula of In$_x$Al$_y$Ga$_{1-x-y}$N (0≤x≤1, 0≤y≤1, 0≤x+y≤1). The first conductive semiconductor layer 115 may be selected from compound semiconductors of group III-V elements, for example, GaN, AlN, AlGaN, InGaN, InN, InAlGaN, AlInN, AlGaAs, GaP, GaAs, GaAsP, and AlGaInP. The first conductive dopant is an n-type dopant and may include a dopant such as Si, Ge, Sn, Se, and Te.

The active layer 117 may be provided under the first conductive semiconductor layer 115 and may have a single quantum well (SQM) structure, a multiple quantum well (MQW) structure, a quantum wire structure, or a quantum dot structure and include a cycle of a well layer and a barrier layer. The cycle of the well layer and the barrier layer includes at least one of pairs of InGaN/GaN, GaN/AlGaN, AlGaN/AlGaN, InGaN/AlGaN, InGaN/InGaN, AlGaAs/ GaA, InGaAs/GaAs, InGaP/GaP, AlInGaP/InGaP, and InP/ GaAs The second conductive semiconductor layer 119 may be provided under the active layer 117. The second conductive semiconductor layer 119 may include a semiconductor doped with a second conductive dopant, for example, an empirical formula of $In_xAl_yGa_{1-x-y}N$ ($0 \leq x \leq 1$, $0 \leq y \leq 1$, $0 \leq x+y \leq 1$). The second conductive semiconductor layer 119 may include at least one of compound semiconductors, such as GaN, InN, AlN, InGaN, AlGaN, InAlGaN, AlInN, AlGaAs, GaP, GaAs, GaAsP, and AlGaInP. The second conductive semiconductor layer 119 may be a p-type semiconductor layer, and the first conductive dopant may include a p-type dopant such as Mg, Zn, Ca, Sr, and Ba.

As another example of the light emitting structure 120, the first conductive semiconductor layer 115 may be implemented by a p-type semiconductor layer, and the second conductive semiconductor layer 119 may be implemented by an n-type semiconductor layer. A third conductive semiconductor layer having an opposite polarity to the second conductive semiconductor layer may be formed above the second conductive semiconductor layer 119. Also, the light emitting structure 120 may have any one structure selected from an n-p junction structure, a p-n junction structure, an n-p-n junction structure, and a p-n-p junction structure.

The electrode layer 131 may be provided under the second conductive semiconductor layer 119. The electrode layer 131 may include a reflection layer. The electrode layer 131 may include an ohmic contact layer contacting the second conductive semiconductor layer 119 of the light emitting structure 120. The reflection layer may include a material having a reflectivity of 70% or more, for example, metals such as Al, Ag, Ru, Pd, Rh, Pt, and Ir, and alloys including two or more of the metals. The metal of the reflection layer may contact a lower portion of the second conductive semiconductor layer 119. The ohmic contact layer may include a light-transmitting material, a metal material, or a non-metal material.

The electrode layer 131 may include a stacked structure of a light-transmitting electrode layer and a reflection layer. The light-transmitting electrode layer may include indium tin oxide (ITO), indium zinc oxide (IZO), indium zinc tin oxide (IZTO), indium aluminum zinc oxide (IAZO), indium gallium zinc oxide (IGZO), indium gallium tin oxide (IGTO), aluminum zinc oxide (AZO), antimony tin oxide (ATO), gallium zinc oxide (GZO), Ag, Ni, Al, Rh, Pd, Ir, Ru, Mg, Zn, Pt, Au, Hf, or selective combinations thereof. A reflection layer made of a metal material may be provided under the light-transmitting electrode layer and may include Ag, Ni, Al, Rh, Pd, Ir, Ru, Mg, Zn, Pt, Au, Hf, or selective combinations thereof. As another example, the reflection layer may have a distributed Bragg reflector (DBR) structure in which two layers having different refractive indices are alternately provided.

A light extraction structure such as roughness may be provided on at least one of the second conductive semiconductor layer 119 and the electrode layer 131. The light extraction structure changes a critical angle of incident light to improve light extraction efficiency. The insulating layer 133 may be provided under the electrode layer 131 and may be provided on a bottom surface of the second conductive semiconductor layer 119, side surfaces of the second conductive semiconductor layer 119 and the active layer 117, and a portion of the first conductive semiconductor layer 115. The insulating layer 133 is formed in a lower portion of the light emitting structure 120, except for the electrode layer 131, the first electrode 135, and the second electrode 137 and electrically protect the lower portion of the light emitting structure 120.

The insulating layer 133 may include an insulating material or an insulating resin made of at least one of oxide, nitride, fluoride, and sulfide including at least one of Al, Cr, Si, Ti, Zn, and Zr. The insulating layer 133 may be selectively made of $SiO_2$, $Si_3N_4$, $Al_2O_3$, and $TiO_2$. The insulating layer 133 may be formed with a single layer or a multi-layer, but is not limited thereto. When a metal structure for flip bonding is formed under the light emitting structure 120, the insulating layer 133 is formed for preventing the inter-layer short of the light emitting structure 120.

The insulating layer 133 may have a DBR structure in which a first layer and a second layer having different refractive indices are alternately provided. The first layer may be made of any one of $SiO_2$, $Si_3N_4$, $Al_2O_3$, and $TiO_2$, and the second layer may be made of any one of $SiO_2$, $Si_3N_4$, $Al_2O_3$, and $TiO_2$ except for the material of the first layer, but embodiments are not limited thereto. Alternatively, the first layer and the second layer may be made of the same material or may be made of a pair having three or more layers. In this case, the electrode layer may not be formed.

The first electrode 135 may be provided under a portion of the first conductive semiconductor layer 115, and the second electrode 137 may be provided under a portion of the electrode layer 131. The first connection electrode 141 is provided under the first electrode 135, and the second connection electrode 143 is provided under the second electrode 137. The first electrode 135 may be electrically connected to the first conductive semiconductor layer 115 and the first connection electrode 141, and the second electrode 137 may be electrically connected to the second conductive semiconductor layer 119 and the second connection electrode 143 through the electrode layer 131.

The first electrode 135 and the second electrode 137 may be made of at least one of Cr, Ti, Co, Ni, V, Hf, Ag, Al, Ru, Rh, Pt, Pd, Ta, Mo, W, and alloys thereof and may be formed with a single layer or a multi-layer. The first electrode 135 and the second electrode 137 may be formed with the same stacked structure or different stacked structures. At least one of the first electrode 135 and the second electrode 137 may further include a current diffusion pattern such as an arm or finger structure. Also, one or more first electrodes 135 and one or more second electrodes 137 may be provided, but embodiments are not limited thereto. At least one of the first and second connection electrodes 141 and 143 may be plurally provided, but embodiments are not limited thereto.

The first connection electrode 141 and the second connection electrode 143 may provide a heat dissipation function and a lead function for supplying power. The first connection electrode 141 and the second connection electrode 143 may include at least one of a circular shape, a polygonal shape, a cylindrical shape, and a polyprism shape. The first connection electrode 141 and the second connection electrode 143 may be made of a metal powder, for example, Ag, Al, Au, Cr, Co, Cu, Fe, Hf, In, Mo, Ni, Si, Sn, Ta, Ti, W, or selective alloys thereof. The first connection electrode 141 and the second connection electrode 143 may be plated with any one of In, Sn, Ni, Cu, and selective alloys thereof, so as to improve adhesion with the first electrode 135 and the second electrode 137.

The support layer 140 includes a thermally conductive material and may be provided around the first electrode 135, the second electrode 137, the first connection electrode 141, and the second connection electrode 143. The bottom surfaces of the first and second connection electrodes 141 and 143 may be exposed on the bottom surface of the support layer 140.

The support layer 140 may be used as a layer for supporting the light emitting device 100. The support layer 140 may be made of an insulating material, and the insulating material includes a resin layer such as silicon or epoxy. As another example, the insulating material may include a paste or an insulating ink. Examples of the insulating material may include a polyacrylate resin, an epoxy resin, a phenolic resin, a polyamides resin, a polyimides rein, an unsaturated polyesters resin, a polyphenylene ether resin (PPE), a polyphenylene oxide resin (PPO), a polyphenylenesulfides resin, a cyanate ester resin, a benzocyclobutene (BCB), a polyamido-amine dendrimers (PAMAM), polypropyleneimine dendrimers (PPI), and PAMAM-OS (organosilicon) having an inner structure of PAMAM and an outer structure of organo-silicon, alone or in combination thereof. The support layer 140 may be made of a different material from the insulating layer 133.

At least one of compounds such as oxide, nitride, fluoride, and sulfide including at least one of Al, Cr, Si, Ti, Zn, and Zr may be added to the support layer 140. The compounds added to the support layer 140 may be a heat dispersing agent, and the heat dispersing agent may be used as a powder particle with a certain size, a grain, a filler, or an additive. The heat dispersing agent includes a ceramic material, and the ceramic material includes at least one of low temperature co-fired ceramic (LTCC), high temperature co-fired ceramic (HTCC), alumina, quartz, calcium zirconate, forsterite, SiC, graphite, fused silica, mullite, cordierite, zirconia, beryllia, and aluminum nitride. The ceramic material may be made of metal nitride having higher heat conductivity than nitride or oxide among insulating materials. The metal nitride may include a material having heat conductivity of 140 W/mK or more. The ceramic material may be a ceramic-based material such as $SiO_2$, $Si_xO_y$, $Si_3N_4$, $Si_xN_y$, $SiO_xN_y$, $Al_2O_3$, BN, $Si_3N_4$, SiC(SiC—BeO), BeO, CeO, or AlN. The thermally conductive material may include C (diamond, CNT) compounds.

The light emitting chip 100A may be mounted on the circuit board 400 in a flip manner. The circuit board 400 may include a metal layer 471, an insulating layer 472 provided above the metal layer 471, a circuit layer (not illustrated) having a plurality of lead electrodes 473 and 474 above the insulating layer 472, and a protection layer 475 protecting the circuit layer. The metal layer 471 may be a heat dissipation layer, may include a metal having high heat conductivity, such as Cu or Cu alloy, and may be formed with a single-layered structure or a multi-layered structure.

The insulating layer 472 may insulate the metal layer 471 from the circuit layer. The insulating layer may include at least one of resin materials, such as epoxy, silicon, glass fiber, prepreg, polyphthalamide (PPA), liquid crystal polymer (LCP), and polyamide9T (PA9T). Also, an additive such as metal oxide, for example, $TiO_2$, $SiO_2$, and $Al_2O_3$, may be added to the insulating layer 472, but is not limited thereto. As another example, the insulating layer 472 may be used by adding graphene or the like to an insulating material such as silicon or epoxy, but is not limited thereto. The insulating layer 472 may be an anodized region which is formed by a process of anodizing the metal layer 471. The metal layer 471 may be made of aluminum, and the anodized region may be made of a material such as $Al_2O_3$.

The first and second lead electrodes 473 and 474 may be electrically connected to the first and second connection electrodes 141 and 143 of the light emitting chip 100A. Conductive adhesives 461 and 462 may be provided between the first and second lead electrodes 473 and 474 and the first and second connection electrodes 141 and 143 of the light emitting chip 100A. The conductive adhesives 461 and 462 may include a metal material such as a solder material. The first lead electrode 473 and the second lead electrode 474 are circuit patterns and supply power.

The protection layer 475 may be provided above the circuit layer. The protection layer 475 includes a reflective material. The protection layer 475 may be made of a resist material, for example, a white resist material, but is not limited thereto. The protection layer 475 may function as a reflection layer. For example, the protection layer 475 may be made of a material whose reflectivity is higher than absorptivity. As another example, the protection layer 475 may be made of a light-absorbing material, and the light-absorbing material may include a black resist material.

Figure 42:
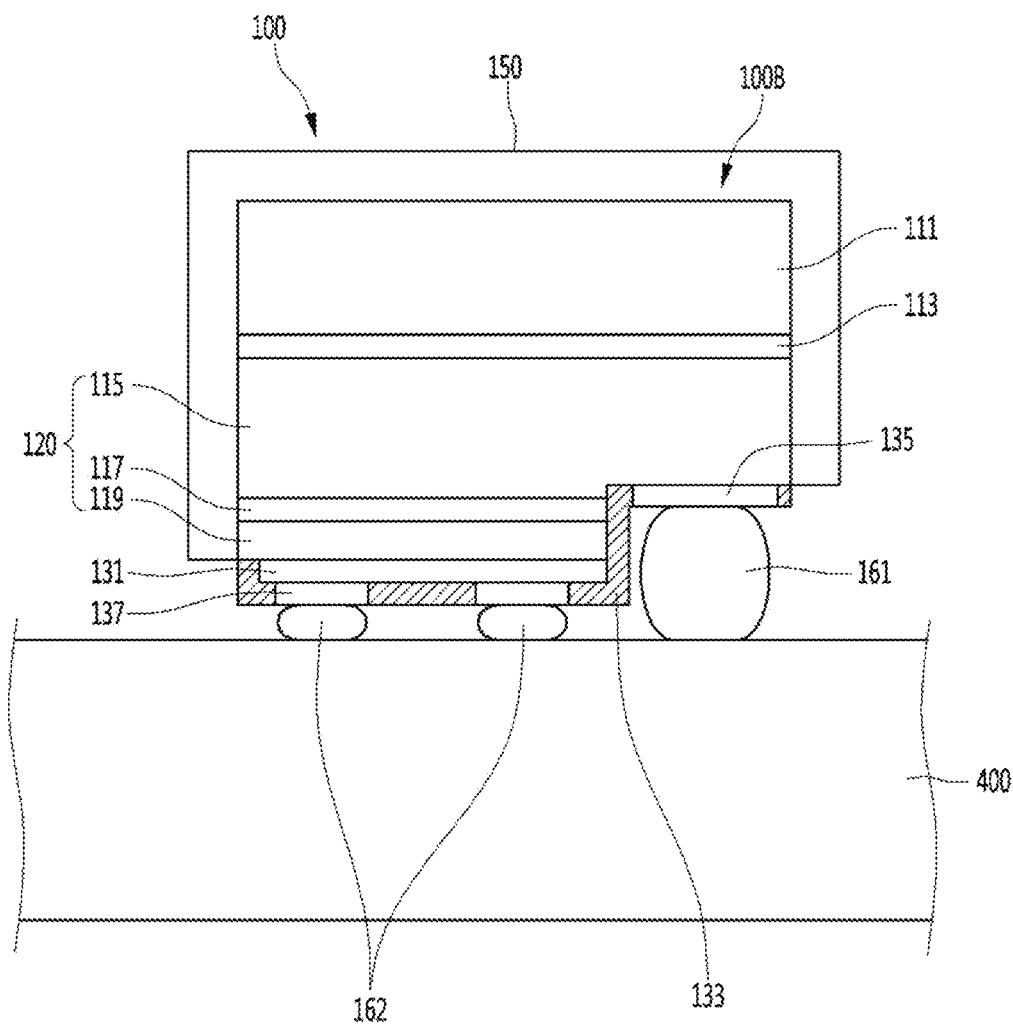
FIG. 42 is a view of another light emitting device of a light emitting module, according to an embodiment.

Referring to FIG. 42, a light emitting device 100 may include a light emitting chip 100B. The light emitting device 100 may include the light emitting chip 100B and a phosphor layer 150 provided on the light emitting chip 100B. The phosphor layer 150 may include at least one of a blue phosphor, a green phosphor, a yellow phosphor, and a red phosphor and may be provided with a single layer or a multi-layer. In the phosphor layer 150, a phosphor is added to a light-transmitting resin material. The light-transmitting resin material may include a material such as silicon or epoxy, and the phosphor may be made of YAG, TAG, silicate, nitride, or oxynitride-based material. The phosphor layer 150 may be provided on the top surface of the light emitting chip 100B, or may be provided on the top surface and the side surface of the light emitting chip 100B. The phosphor layer 150 may be provided on a region where light is emitted on the surface of the light emitting chip 100B, and may convert a wavelength of light.

The light emitting chip 100B may include a substrate 111, a first semiconductor layer 113, a light emitting structure 120, an electrode layer 131, an insulating layer 133, a first electrode 135, a second electrode 137, a first connection electrode 141, a second connection electrode 143, and a support layer 140. The substrate 111 and the first semiconductor layer 113 may be removed. The light emitting chip 100B and the circuit board 400 of the light emitting device 100 may be connected through connection electrodes 161 and 162. The connection electrodes 161 and 162 may include a conductive bump, that is, a solder bump. One or more conductive bumps may be provided under the electrodes 135 and 137, but embodiments are not limited thereto. The insulating layer 133 may expose the first and second electrodes 135 and 137, and the first and second electrodes 135 and 137 may be electrically connected to the connection electrodes 161 and 162.

Figure 4:
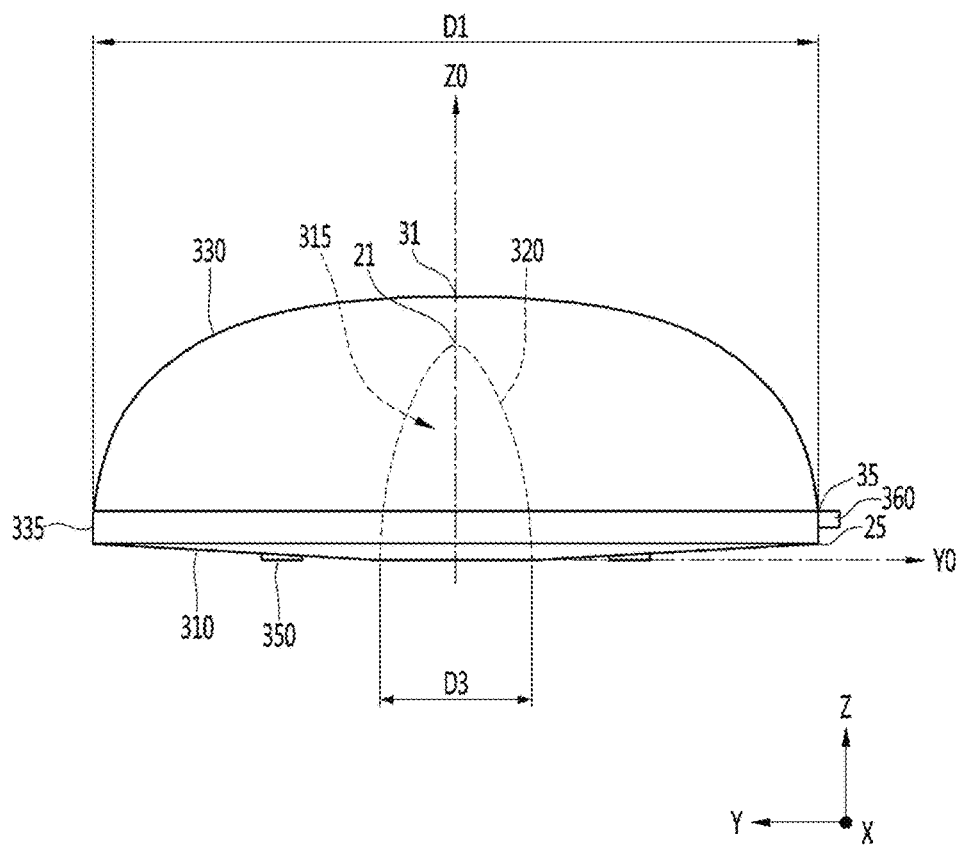
FIG. 4 is a second side view of the optical lens of FIG. 1 in a Y-axis direction.
Figure 43:
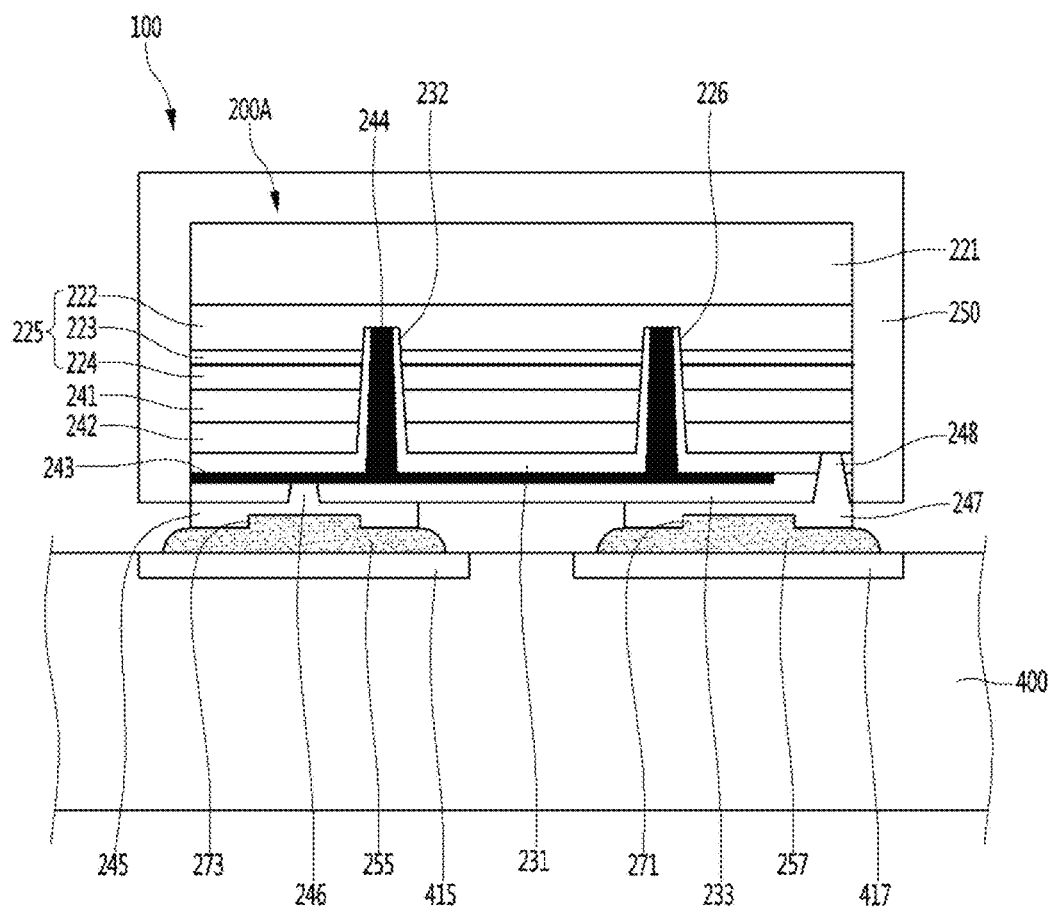
FIG. 43 is a view of another light emitting device of a light emitting module, according to an embodiment.
Figure 44:
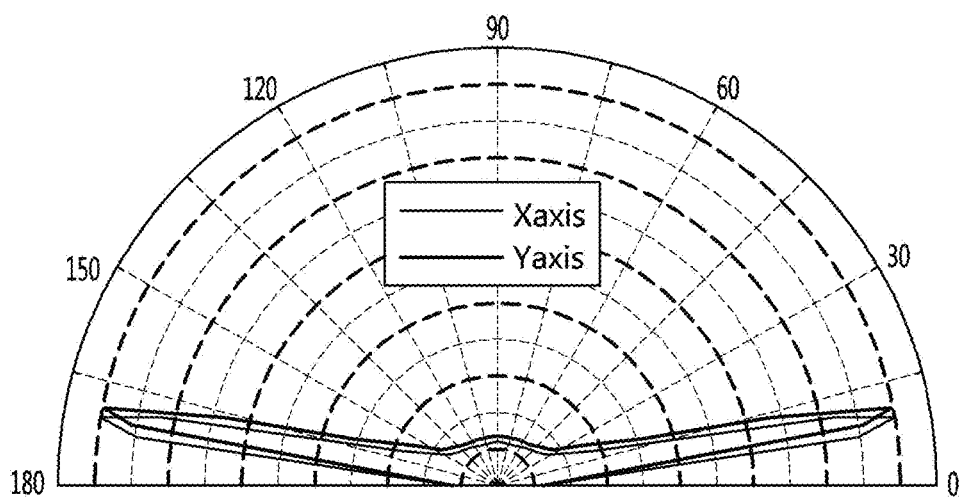
FIG. 44 is a view illustrating a radiation pattern of the optical lens of FIG. 1.
Figure 45:
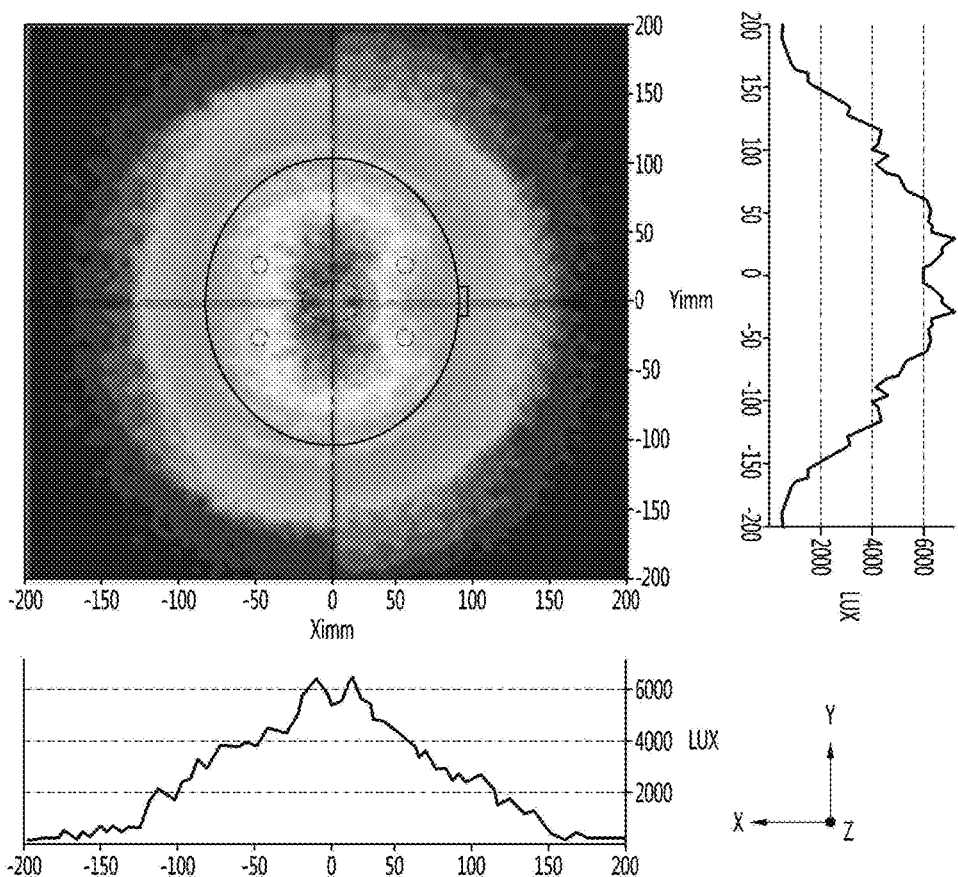
FIG. 45 is a view illustrating a luminance distribution of the optical lens of FIG. 1.

Referring to FIG. 43, a light emitting device 100 may include a light emitting chip 200A connected to a circuit board 400. The light emitting device 100 may include a phosphor layer 250 provided on the surface of the light emitting chip 200A. The phosphor layer 250 converts a wavelength of incident light. As illustrated in FIG. 4, the optical lens (300 of FIG. 4) is provided above the light emitting device 100 to adjust orientation characteristics of light emitted from the light emitting chip 200A.

The light emitting chip 200A may include a light emitting structure 225 and a plurality of pads 245 and 247. The light emitting structure 225 may include compound semiconductor layers of group II to VI elements, for example, a compound semiconductor layer of group III-V elements or a compound semiconductor layer of group II-VI elements.

The plurality of pads 245 and 247 are selectively connected to the semiconductor layer of the light emitting structure 225 and supply power.

The light emitting structure 225 may include a first conductive semiconductor layer 222, an active layer 223, and a second conductive semiconductor layer 224. The light emitting chip 200A may include a substrate 221. The substrate 221 is provided above the light emitting structure 225. The substrate 221 may be a light-transmitting substrate, an insulating substrate, or a conductive substrate. Such a configuration may be understood by referring to the descriptions of the light emitting structure and the substrate with reference to FIG. 4.

The light emitting chip 200A may include pads 245 and 247 at a lower portion, and the pads 245 and 247 include first and second pads 245 and 247. The first and second pads 245 and 247 may be spaced apart from each other under the light emitting chip 200A. The first pad 245 may be electrically connected to the first conductive semiconductor layer 222, and the second pad 247 may be electrically connected to the second conductive semiconductor layer 224. Bottom shapes of the first and second pads 245 and 247 may be a polygonal shape or a circular shape, or may correspond to shapes of the first and second lead electrodes 415 and 417 of the circuit board 400. An area of a bottom surface of each of the first and second pads 245 and 247 may correspond to an area of a top surface of each of the first and second lead electrodes 415 and 417.

The light emitting chip 200A may include at least one of a buffer layer and an undoped semiconductor layer between the substrate 221 and the light emitting structure 225. The buffer layer may be a layer for reducing a difference of lattice constant between the substrate 221 and the semiconductor layer and may be selectively made of group II to VI compound semiconductors. An undoped group III-V compound semiconductor layer may be further formed under the buffer layer, but embodiments are not limited thereto. The substrate 221 may be removed. When the substrate 221 is removed, the phosphor layer 250 may contact the top surface of the first conductive semiconductor layer 222 or the top surface of another semiconductor layer.

The light emitting chip 200A may include first and second electrode layers 241 and 242, a third electrode layer 243, and insulating layers 231 and 233. Each of the first and second electrode layers 241 and 242 may be formed with a single layer or a multi-layer and may function as a current diffusion layer. The first and second electrode layers 241 and 242 may include a first electrode layer 241 provided under the light emitting structure 225, and a second electrode 242 provided under the first electrode layer 241. The first electrode layer 241 may diffuse a current, and the second electrode layer 242 may reflect incident light.

The first and second electrodes 241 and 242 may be made of different materials. The first electrode layer 241 may be made of a light-transmitting material, for example, metal oxide or metal nitride. The first electrode layer may be selectively made of indium tin oxide (ITO), ITO nitride (ITON), indium zinc oxide (IZO), IZ0 nitride (IZON), indium zinc tin oxide (IZTO), indium aluminum zinc oxide (IAZO), indium gallium zinc oxide (IGZO), indium gallium tin oxide (IGTO), aluminum zinc oxide (AZO), antimony tin oxide (ATO), and gallium zinc oxide (GZO). The second electrode layer 242 may contact the bottom surface of the first electrode layer 241 and function as a reflection electrode layer. The second electrode layer 242 may include a metal such as Ag, Au, or Al. When a portion of the first electrode layer 241 is removed, the second electrode layer 242 may partially contact the bottom surface of the light emitting structure 225.

As another example, the first and second electrode layers 241 and 242 may be stacked in an Omni Directional Reflector layer (ODR) structure. The ODR structure may be a stacked structure of the first electrode layer 241 having low reflectivity and the second electrode layer 242 contacting the first electrode layer 241 and made of a metal material having high reflectivity. The electrode layers 241 and 242 may have a stacked structure of ITO/Ag. An omnidirectional reflection angle may be improved at an interface between the first electrode layer 241 and the second electrode layer 242.

As another example, the second electrode layer 242 may be removed and may be a reflection layer made of another material. The reflection layer may be formed to have a DBR structure. The DBR structure may include a structure in which two dielectric layers having different refractive indices are alternately provided. For example, the two dielectric layers may include different layers selected from a $SiO_2$ layer, a $Si_3N_4$ layer, a $TiO_2$ layer, an $Al_2O_3$ layer, and a MgO layer. As another example, the electrode layers 241 and 242 may include both the DBR structure and the ODR structure. In this case, the light emitting device 200A may have light reflectivity of 98% or more. In the light emitting chip 200A mounted in the flip manner, light reflected from the second electrode layer 242 is emitted through the substrate 221. Thus, most of light may be emitted in a vertically upward direction. Also, light emitted to the side surface of the light emitting chip 200A may be reflected to a light incidence surface of an optical lens by a reflection sheet 600.

The third electrode layer 243 may be provided under the second electrode layer 242 and is electrically insulated from the first and second electrode layers 241 and 242. The third electrode layer 243 may include a metal, for example, at least one selected from titanium (Ti), copper (Cu), nickel (Ni), gold (Au), chromium (Cr), tantalum (Ta), platinum (Pt), tin (Sn), silver (Ag), and phosphorus (P). The first pad 245 and the second pad 247 are provided under the third electrode layer 243. The insulating layers 231 and 233 prevent unnecessary interlayer contact of the first and second electrode layers 241 and 242, the third electrode layer 243, the first and second pads 245 and 247, and the light emitting structure 225. The insulating layers 231 and 233 include first and second insulating layers 231 and 233. The first insulating layer 231 is provided between the third electrode layer 243 and the second electrode layer 242. The second insulating layer 233 is provided between the third electrode layer 243 and the first and second pads 245 and 247. The first and second pads 245 and 247 may include the same material as the first and second lead electrodes 415 and 417.

The third electrode layer 243 may be connected to the first conductive semiconductor layer 222. A connection portion 244 of the third electrode layer 243 may protrude in a via structure through a lower portion of the first and second electrode layers 241 and 242 and the light emitting structure 225 and contacts the first conductive semiconductor layer 222. The connection portion 244 may be plurally provided. A portion 232 of the first insulating layer 231 may extend around the connection portion 244 of the third electrode layer 243 to prevent electrical connection of the third electrode layer 243 to the first and second electrode layers 241 and 242, the second conductive semiconductor layer 224, and the active layer 223. An insulating layer may be provided on a side surface of the light emitting structure 225 so as to protect the side surface of the light emitting structure 225, but embodiments are not limited thereto.

The second pad 247 may be provided under the second insulating layer 233, and contact or connect to at least one of the first and second electrode layers 241 and 242 through an open region of the second insulating layer 233. The first pad 245 may be provided under the second insulating layer 233 and may be connected to the third electrode layer 243 through the open region of the second insulating layer 233. Accordingly, a protrusion 248 of the first pad 245 may be electrically connected to the second conductive semiconductor layer 224 through the first and second electrode layers 241 and 242, and a protrusion 246 of the second pad 245 may be electrically connected to the first conductive semiconductor layer 222 through the third electrode layer 243.

The first and second pads 245 and 247 may be spaced apart from each other under the light emitting chip 200A and face the first and second lead electrodes 415 and 417 of the circuit board 400. The first and second pads 245 and 247 may include polygonal recesses 271 and 273, and the recesses 271 and 273 may be formed convexly toward the light emitting structure 225. The recesses 271 and 273 may be formed to have a depth equal to or less than a thickness of the first and second pads 245 and 247. The depth of the recesses 271 and 273 may increase a surface area of the first and second pads 245 and 247.

Bonding members 255 and 257 may be provided in a region between the first pad 245 and the first lead electrode 415 and a region between the second pad 247 and the second lead electrode 417. The bonding members 255 and 257 may include an electrically conductive material and a portion thereof may be provided in the recesses 271 and 273. Since the bonding members 255 and 257 are provided in the recesses 271 and 273, a bonding area between the bonding members 255 and 257 and the first and second pads 215 and 217 may be increased. Accordingly, since the first and second pads 245 and 247 are bonded to the first and second lead electrodes 415 and 417, it may be possible to improve electrical reliability and heat dissipation efficiency of the light emitting chip 200A.

The bonding members 255 and 257 may include a solder paste material. The solder paste material includes at least one of gold (Au), tin (Sn), lead (Pb), copper (Cu), bismuth (Bi), indium (In), and silver (Ag). Since the bonding members 255 and 257 directly transfer heat to the circuit board 400, heat transfer efficiency may be further improved than a structure using a package. Also, since the bonding members 255 and 257 are materials having a small difference in thermal expansion coefficient with respect to the first and second pads 245 and 247 of the light emitting chip 200A, heat transfer efficiency may be improved.

As another example, the bonding members 255 and 257 may include a conductive film, and the conductive film may include one or more conductive particles in the insulating film. The conductive particle may include at least one of a metal, a metal alloy, and carbon. The conductive particle may include at least one of nickel, silver, gold, aluminum, chromium, copper, and carbon. The conductive film may include an anisotropic conductive film or an anisotropic conductive adhesive.

An adhesive member, for example, a thermally conductive film, may be included between the light emitting chip 200A and the circuit board 400. The thermally conductive film may include: a polyester resin such as polyethylene terephthalate, polybutylene terephthalate, polyethylene naphthalate, or polybutylene naphthalate; a polyimide resin; an acrylic resin; a styrene-based resin such as polystyrene and acrylonitrile styrene; a polycarbonate resin; a polylactic acid resin; and a polyurethane resin. Also, the thermally conductive film may include: a polyolefin resin such as polyethylene, polypropylene, and ethylene-propylene copolymer; a vinyl resin such as polyvinyl chloride and polyvinylidene chloride; a polyamide resin; a sulfonic resin; a polyether-ether ketone resin; arylate-based resin; or blend of the resins.

The light emitting chip 200A may emit light through the surface of the circuit board 400 and the side surface and top surface of the light emitting structure 225, thereby improving light extraction efficiency. Since the light emitting chip 200A can be directly bonded on the circuit board 400, the process can be simplified. Also, sine the heat dissipation of the light emitting chip 200A is improved, it can be usefully used in illumination fields.

Figure 48:
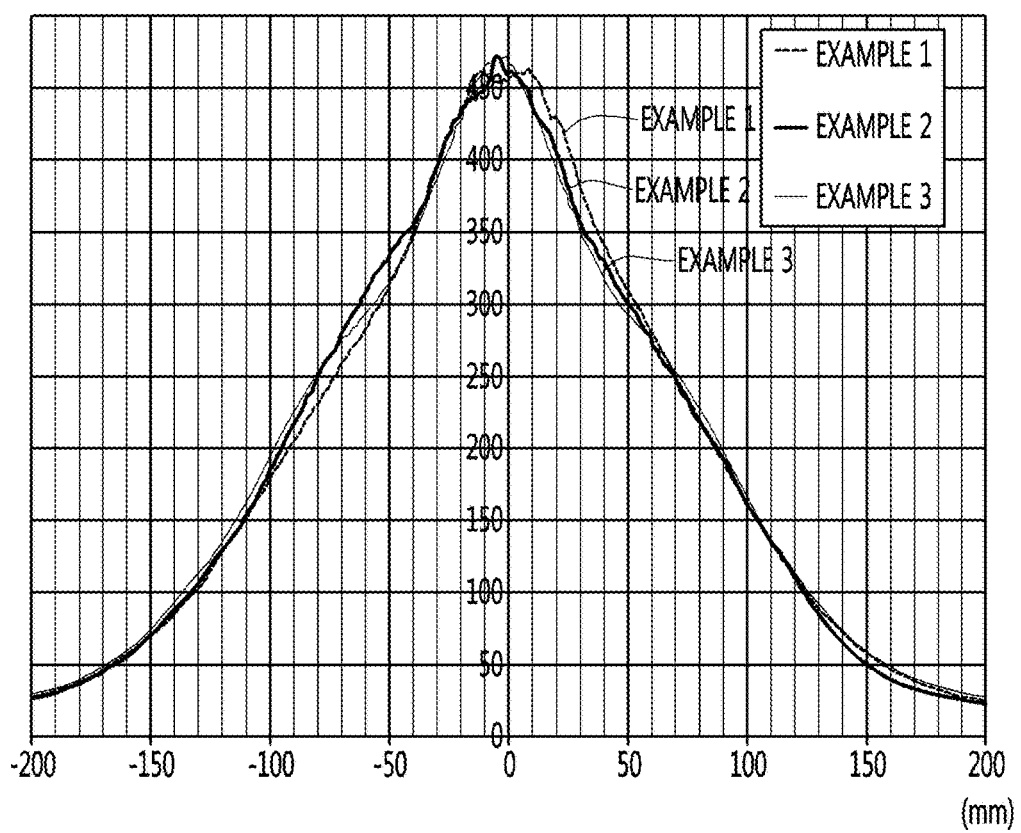
FIG. 48 is a view illustrating a luminance distribution in a second axis direction according to a change in a depth of a recess of the optical lens of FIG. 1.
Figure 49:
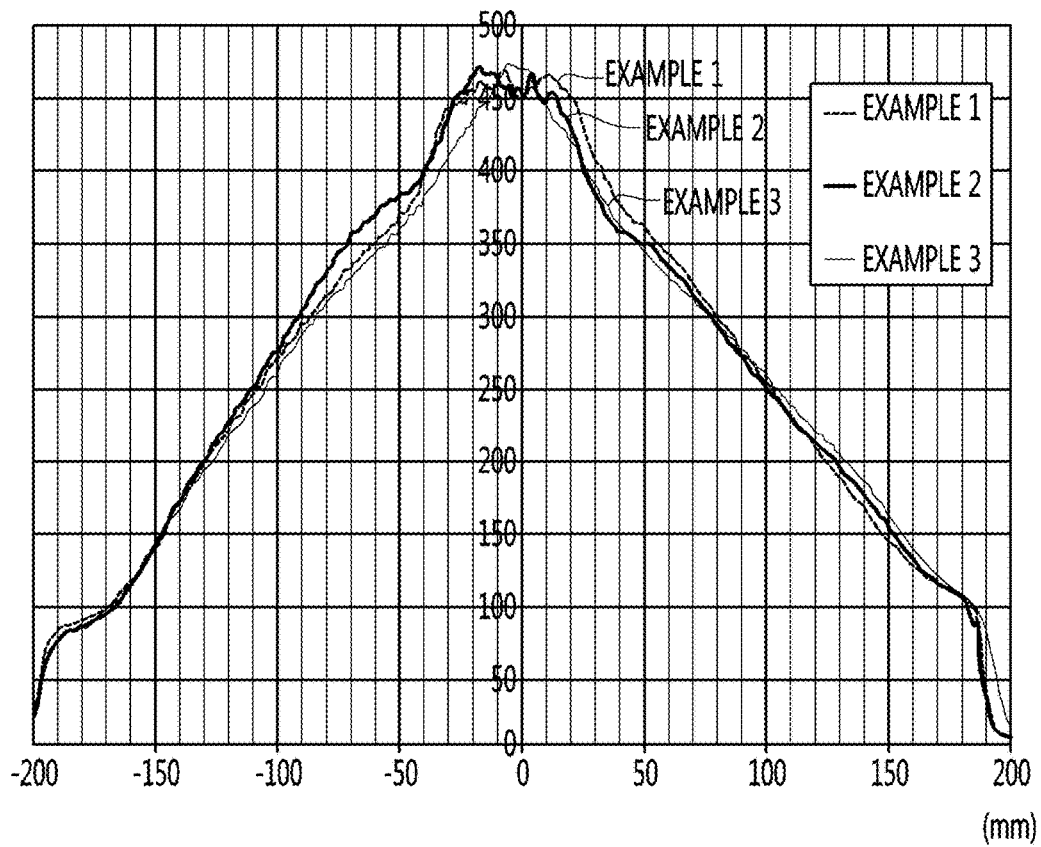
FIG. 49 is a view illustrating a luminance distribution in a first axis direction according to a change in a depth of a recess of the optical lens of FIG. 1.

FIGS. 48 and 49 are views illustrating luminance distributions in the X-axis direction and the Y-axis direction according to the depth of the recess in the optical lens according to the fifth embodiment, and FIG. 50 is a view illustrating a color difference distribution in the Y-axis direction. Referring to FIGS. 48 to 50, example 1, example 2, and example 3 of the optical lens have a structure in which the bottom length of the recess has a relationship of D3>D4 in a range of 7 mm to 7.5 mm, and the depth of the recess is gradually reduced. By reducing the depth of the recess, a half width at half maximum (FWHM) becomes more narrower and is distributed widely in a lateral direction as illustrated in FIG. 50.

An embodiment may provide an optical lens having different luminance distributions in different axis directions. An embodiment may reduce the number of optical lenses. An embodiment may reduce a noise such as hot spot due to light extracted from an optical lens. An embodiment may reduce interference between optical lenses provided on a circuit board. An embodiment may reduce the number of light emitting devices and optical lenses provided in a light unit. An embodiment may produce a light unit for a display device including one bar-shaped light emitting module. An embodiment may improve reliability of a light emitting module including an optical lens and a light unit. An embodiment may improve the quality of an image by minimizing interference between adjacent optical lenses. An embodiment may improve reliability of a lighting system including a light emitting module. An optical lens and a display device with a light emitting module including the same, according to embodiments, may be applied to various portable terminals, a monitor of a notebook computer, a monitor of a laptop computer, televisions, and the like. A light emitting module according to an embodiment may be applied to a light unit. The light unit may have a structure including one or more light emitting modules and may be applied to three-dimensional displays, various lamps, signal lamps, vehicle headlamps, electronic displays, and the like.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

An embodiment may provide an anisotropic optical lens. An embodiment may provide an optical lens in which a length is different according to axis directions. An embodiment may provide an optical lens in which a length of a bottom surface is different according to an axis direction. An embodiment may provide an optical lens in which a length of a light exit surface is different according to an axis direction. An embodiment may provide an optical lens in which lengths of a recess in two axis directions are different from each other, and lengths of a bottom surface in two axis directions are different from each other.

An embodiment may provide an optical lens in which lengths of a recess in two axis directions are different from each other, and lengths of a bottom surface and a light exit surface in two axis directions are different from each other. An embodiment may provide an optical lens in which a length of a concave recess in a center of a bottom surface is different according to an axis direction. An embodiment may provide an optical lens in which a major axis of a bottom of a recess in a first axis direction corresponds to a minor axis of a bottom surface and/or a light exit surface, and a minor axis of the bottom of the recess in a second axis direction corresponds to a major axis of the bottom surface and/or the light exit surface.

An embodiment may provide an optical lens in which a length ratio of a bottom surface in two axis directions is different from a length ratio of a recess in the two axis directions. An embodiment may provide an optical lens having a recess and a light incidence surface having an asymmetrical shape. An embodiment may provide an optical lens having a recess and a bottom surface having an asymmetrical shape with respect to a bottom center of the recess.

An embodiment may provide an optical lens in which a vertex of a light exit surface is flat or convex. An embodiment may provide an optical lens in which a vertex of a light incidence surface is closer to a vertex of a light exit surface than a bottom of a light incidence surface. An embodiment may provide an optical lens in which a bottom surface having an inclined or curved surface is provided. An embodiment may provide an optical lens having a curved first light exit surface and a flat second light exit surface around a light incidence surface. An embodiment may provide an optical lens in which a vertex of a light incidence surface is closer to a vertex of a first light exit surface than a bottom of a light incidence surface.

An embodiment may provide an optical lens in which an inclined bottom surface is provided around a light emitting device. An embodiment provides an optical lens which changes an exit angle of light incident from a light emitting device emitting light through at least five surfaces. An embodiment provides a light emitting module in which an optical lens is provided on a light emitting device.

An embodiment may provide a light emitting module in which light emitted from a top surface and a side surface of a light emitting device can be incident on a light incidence surface of an optical lens. An embodiment may provide a light emitting module which can control a luminance distribution by changing an exit angle of light emitted to different light exit surfaces of an optical lens. An embodiment may provide a light emitting module which can prevent light loss because a bottom surface of an optical lens is provided around a light emitting device. An embodiment may provide a light emitting module in which a bottom surface of an optical lens has an inclined surface or a curved surface, thereby improving a luminance distribution in a center region. An embodiment may provide an optical lens capable of controlling a luminance distribution of emitted light, and a light emitting module including the optical lens.

An embodiment may provide a light emitting module in which a lateral protrusion of an optical lens protrudes more outward than a light exit surface of the optical lens. An embodiment may provide a light emitting module in which a lateral protrusion of an optical lens protrudes to the outside of a light exit surface of the optical lens in a major axis direction. An embodiment may provide a light unit including a light emitting module for removing a dark spot of a corner region of a bottom cover.

According to embodiments disclosed herein, an optical lens may include: a bottom surface; a concave recess provided in a center region of the bottom surface; a first light exit surface having a convexly curved surface on a side opposite to the bottom surface and the recess; and a second light exit surface between the bottom surface and the first light exit surface, wherein a length in a first axis direction on the bottom surface is D1, and a length in a second axis direction perpendicular to the first axis direction is D2, a length in the first axis direction on the bottom of the recess is D3, and a length in the second axis direction on the bottom of the recess is D4, a length of the bottom surface has a relationship of D1<D2, and a bottom length of the recess has a relationship of D3>D4.

According to embodiments disclosed herein, a light emitting module may include: a circuit board; a plurality of light emitting devices provided on the circuit board in a first axis direction; and a plurality of optical lenses respectively provided above the plurality of light emitting devices, wherein the optical lens includes: a bottom surface facing a top surface of the circuit board; a concave recess provided in a center region of the bottom surface; a first light exit surface having a convexly curved surface on a side opposite to the bottom surface and the recess; a second light exit surface between the bottom surface and the first light exit surface; and a plurality of support protrusions protruding from the bottom surface toward the circuit board, a length in a first axis direction on the bottom surface is D1, and a length in a second axis direction perpendicular to the first axis direction is D2, a length in the first axis direction on the bottom of the recess is D3, and a length in the second axis direction on the bottom of the recess is D4, the length of the bottom surface has a relationship of D1<D2, and a bottom length of the recess has a relationship of D3>D4.

A light unit according to an embodiment may include at least one of the optical lens and the light emitting module. According to embodiments disclosed herein, a light unit may include: a bottom cover having an accommodation region; a circuit board provided elongatedly on the bottom cover in a first axis direction; a plurality of light emitting devices provided in the first axis direction of the circuit board; and a plurality of optical lenses provided in the light emitting devices, wherein the plurality of optical lenses are provided in one row in the first axis direction in the bottom cover, each of the optical lenses includes: a bottom surface on the circuit board; a concave recess in a center region of the bottom surface; and a first light exit surface having a convexly curved surface on a side opposite to the bottom surface and the recess, the length of the bottom surface in the first axis direction is D1, the length thereof in the second axis direction perpendicular to the first axis direction is D2, the length of the bottom of the recess in the first axis direction is D3, and the length thereof in the second axis direction is D4, the length of the bottom surface has a relationship of D1<D2, the bottom length of the recess has a relationship of D3>D4, and the length ratio of the bottom surface and the length ratio of the recess have a relationship of D2/D1<D3/D4.

According to embodiments disclosed herein, a length ratio of D2/D1 on the bottom surface may be less than a length ratio of D3/D4 on the bottom of the recess. When a maximum length of the first light exit surface in the first axis direction is D1 and a maximum length thereof in the second axis direction is D2, the length ratio of D2/D1 may be in a range of 1.2 to 1.6 times the length ratio of D3/D4. Bottom view shapes of the bottom surface and the recess may be different oval shapes. The second light exit surface may have a vertical plane or an inclined surface.

The optical lens may further include a lateral protrusion protruding in the first axis direction on the surface of the second light exit surface. The bottom surface may include a first edge adjacent to the recess and a second edge adjacent to the second light exit surface, and a height of the first edge may be less than a height of the second edge. A region between the first edge and the second edge of the bottom surface may have at least one of a curved surface and an inclined surface.

The depth of the recess may be greater than the length in the first axis direction on the bottom of the recess. The depth of the recess may be equal to or greater than twice the thickness of the second light exit surface. The thickness of the second light exit surface in the first axis direction may be equal to or less than the thickness thereof in the second axis direction. The thickness of the second light exit surface may become gradually thicker as being closer from the first axis direction to the second axis direction. A first vertex of the recess may be closer to a second vertex of the first light exit surface than the bottom of the recess, a center region overlapping the recess in a vertical direction on the first light exit surface may have a flat surface or a convexly curved surface, and the depth of the recess may be equal to or greater than 80% of an interval between the bottom of the recess and the second vertex of the first light exit surface.

The optical lens may further include a plurality of support protrusions protruding from the bottom surface, and an interval of the plurality of support protrusions in the first axis may be greater than an interval thereof in the second axis direction. The light emitting device may include an LED chip having a top surface and a plurality of side surfaces through which light is emitted, and at least a portion of the light emitting device may be provided in the recess.

It will be understood that when a layer (or film) is referred to as being "on" another layer or substrate, it may be directly on another layer or substrate, or intervening layers may also be present. Further, it will be understood that when a layer is referred to as being "under" another layer, it may be directly under another layer, and one or more intervening layers may also be present. In addition, it will also be understood that when a layer is referred to as being "between" two layers, it may be the only layer between the two layers, or one or more intervening layers may also be present.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An optical lens comprising:
   a bottom surface;
   a concave recess provided in a center region of the bottom surface;
   a first light exit surface having a convexly curved surface on a side opposite to the bottom surface and the recess;
   a second light exit surface between the bottom surface and the first light exit surface; and
   a plurality of support protrusions protruding from the bottom surface,
   wherein a length in a first axis direction on the bottom surface is D1, and a length in a second axis direction perpendicular to the first axis direction is D2,
   a length in the first axis direction on a bottom of the recess is D3, and a length in the second axis direction on the bottom of the recess is D4,
   a length of the bottom surface has a relationship of D1<D2,
   a bottom length of the recess has a relationship of D3>D4,
   wherein a third axis direction is perpendicular to the first axis direction, and the third axis direction is perpendicular to the second axis direction,
   wherein a center region on the first light exit surface overlapping with the bottom of the recess in the third axis direction has a flat surface or a convexly curved surface,
   wherein the second light exit surface overlapping the recess in the first axis direction has a convexly curved surface,
   wherein the second light exit surface overlapping the recess in the second axis direction has a convexly curved surface,
   wherein a depth of the recess in the third axis direction is greater than the length in the first axis direction on the bottom of the recess,
   wherein the bottom surface includes a first edge adjacent to the recess and a second edge adjacent to the second light exit surface,
   wherein a height of the first edge is less than a height of the second edge with respect to a horizontal straight line passing through a center of the bottom of the recess,
   wherein the plurality of support protrusions overlap the bottom surface in the third axis direction, and
   wherein a top surface of each of the plurality of support protrusions is disposed at a height higher than the horizontal straight line passing through the center of the bottom of the recess, and the top surface of each of the plurality of support protrusions is disposed at a height lower than a straight line horizontal passing through the second edge of the bottom surface.

2. The optical lens of claim 1, wherein a length ratio of D2/D1 on the bottom surface is less than a length ratio of D3/D4 on the bottom of the recess.

3. The optical lens of claim 2, wherein a maximum length of the first light exit surface in the first axis direction is D1, and a maximum length of the first light exit surface in the second axis direction is D2, and the length ratio of D2/D1 is in a range of 1.2 to 1.6 times the length ratio of D3/D4.

4. The optical lens of claim 1, wherein bottom view shapes of the bottom surface and the recess are different oval shapes.

5. The optical lens of claim 1, wherein the second light exit surface has a vertical plane or an inclined surface.

6. The optical lens of claim 1, further comprising a lateral protrusion protruding in the first axis direction on the surface of the second light exit surface.

7. The optical lens of claim 1, wherein a region between the first edge and the second edge of the bottom surface has at least one of a curved surface and an inclined surface.

8. The optical lens of claim 1, wherein the depth of the recess is equal to or greater than twice a thickness of the second light exit surface.

9. The optical lens of claim 1, wherein a thickness of the second light exit surface in the first axis direction is equal to or less than a thickness of the second light exit surface in the second axis direction.

10. The optical lens of claim 1, wherein a thickness of the second light exit surface becomes gradually thicker as being closer from the first axis direction to the second axis direction.

11. The optical lens of claim 1, wherein a first distance from a first vertex of the recess to a second vertex of the first light exit surface is less than a second distance from the first vertex of the recess to the bottom of the recess, and the depth of the recess in the third axis direction is equal to or greater than 80% of an interval between the bottom of the recess and the second vertex of the first light exit surface.

12. The optical lens of claim 1, wherein a first distance between two of the plurality of support protrusions in the first axis direction is greater than a second distance between two of the plurality of support protrusions in the second axis direction.

13. The optical lens of claim 2, wherein the length in the first axis direction on the bottom surface is in range of 16 mm to 25 mm, and wherein the length in the second axis direction on the bottom surface is in range of 17 mm to 30 mm, a difference between the length of the first axis direction and the length of the second axis direction on the bottom surface is in range of 1 mm to 3.5 mm.

14. The optical lens of claim 2, wherein a difference between the length of the first axis direction and the length of the second axis direction on the bottom of the recess is in range of 0.5 mm to 5 mm.

15. A light emitting module comprising:

a circuit board;

a plurality of light emitting devices provided on the circuit board; and a plurality of optical lenses respectively provided above the plurality of light emitting devices, wherein each of the plurality of optical lenses includes:

a bottom surface facing a top surface of the circuit board;

a concave recess provided in a center region of the bottom surface;

a first light exit surface having a convexly curved surface on a side opposite to the bottom surface and the recess;

a second light exit surface between the bottom surface and the first light exit surface; and a plurality of support protrusions protruding from the bottom surface toward the circuit board, a length in a first axis direction on the bottom surface is D1, and a length in a second axis direction perpendicular to the first axis direction is D2, a length in the first axis direction on a bottom of the recess is D3, and a length in the second axis direction on the bottom of the recess is D4, the length of the bottom surface has a relationship of D1<D2, a bottom length of the recess has a relationship of D3>D4, wherein a third axis direction is perpendicular to the first axis direction, and the third axis direction is perpendicular to the second axis direction, wherein a center region on the first light exit surface overlapping with the bottom of the recess in the third axis direction has a flat surface or a convexly curved surface, wherein the second light exit surface overlapping the recess in the first axis direction has a convexly curved surface, wherein the second light exit surface overlapping the recess in the second axis direction has a convexly curved surface, wherein a depth of the recess in the third axis direction is greater than the length in the first axis direction on the bottom of the recess, wherein the bottom surface includes a first edge adjacent to the recess and a second edge adjacent to the second light exit surface, wherein a height of the first edge is less than a height of the second edge with respect to a horizontal straight line passing through a center of the bottom of the recess, wherein the plurality of support protrusions overlap the bottom surface in the third axis direction, wherein a top surface of each of the plurality of support protrusions is disposed at a height higher than the horizontal straight line passing through the center of the bottom of the recess, and the top surface of each of the plurality of support protrusions is disposed at a height lower than a straight line horizontal passing through the second edge of the bottom surface, and wherein each of the light emitting devices disposed in the recess has a length in the second axis direction that is greater than a length in the first axis direction.

16. The light emitting module of claim 15, wherein each of the plurality of light emitting devices includes an LED chip having a top surface and a plurality of side surfaces through which light is emitted, and at least a portion of the light emitting device is provided in the recess.

17. The light emitting module of claim 15, wherein a maximum length of each of the plurality of optical lens in the first axis direction is D1, and a maximum length of each of the plurality of optical lens in the second axis direction is D2, a maximum length of the first light exit surface in the first axis direction is D1, and a maximum length of the first light exit surface in the second axis direction is D2, and a length ratio of D2/D1 on the bottom surface is less than a length ratio of D3/D4 on the bottom of the recess.

18. The light emitting module of claim 16, wherein bottom view shapes of the bottom surface and the recess are different oval shapes, and the length ratio of D2/D1 is in a range of 1.2 to 1.6 times the length ratio of D3/D4.

19. The light emitting module of claim 15, wherein the second light exit surface has a vertical plane or an inclined surface, and the light emitting module comprises a lateral protrusion protruding in the first axis direction on the surface of the second light exit surface.

20. The light emitting module of claim 15, wherein the depth of the recess is greater than the length in the first axis direction on the bottom of the recess, and the depth of the recess is equal to or greater than twice the thickness of the second light exit surface.

* * * * *